(12) United States Patent
Hartlmueller et al.

(10) Patent No.: US 9,882,667 B2
(45) Date of Patent: Jan. 30, 2018

(54) INTERFACE DEVICE AND METHOD FOR EXCHANGING USER DATA

(71) Applicant: Airbus Defence and Space GmbH, Ottobrunn (DE)

(72) Inventors: Peter Hartlmueller, Munich (DE); Helmut Plankl, Ingolstadt (DE); Christoph Schulte, Arnsberg (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 8 days.

(21) Appl. No.: 15/219,082

(22) Filed: Jul. 25, 2016

(65) Prior Publication Data

US 2017/0149518 A1  May 25, 2017

Related U.S. Application Data

(62) Division of application No. 14/647,846, filed as application No. PCT/DE2013/000704 on Nov. 26, 2013, now Pat. No. 9,432,135.

(30) Foreign Application Priority Data

Nov. 29, 2012  (DE) .................. 10 2012 023 395

(51) Int. Cl.
*H04L 12/04* (2006.01)
*H04J 3/06* (2006.01)
(Continued)

(52) U.S. Cl.
CPC ...... *H04J 3/0697* (2013.01); *H04L 12/40032* (2013.01); *H04L 67/12* (2013.01); *H04L 2012/4028* (2013.01)

(58) Field of Classification Search
CPC .............................. H04J 3/0647; H04L 12/40
See application file for complete search history.

(56) References Cited

U.S. PATENT DOCUMENTS 5,367,641 A * 11/1994 Pressprich ............ G06F 13/385
                                                           710/305
6,122,747 A   9/2000 Krening et al.
(Continued)

FOREIGN PATENT DOCUMENTS

DE   10 2005 048 584 A1   1/2007
EP        1 265 160 A2   12/2002

OTHER PUBLICATIONS

AIM GmbH: "MIL-STD-1553 Tutorial," v1.3, AIM GmbH, Sasbacher Str. 2, 79111 Freiburg, Germany, Dec. 2002, Firmenschrift (eighty (80) pages).

(Continued)

*Primary Examiner* — Jaison Joseph
(74) *Attorney, Agent, or Firm* — Crowell & Moring LLP

(57) ABSTRACT

An interface apparatus is provided for exchange of different time-critical user data between a host device and a divided medium, by way of a first interface and by way of a second interface, having a resource management device and a temporary memory device. The first interface works with a first clock pulse and the second interface works with a second clock pulse. The first interface and the second interface are connected with the temporary memory device. The resource management device is set up for controlling the exchange of the different time-critical user data between the first interface and the second interface, in such a manner that collisions of the different time-critical user data within the interface apparatus and/or on the divided medium are avoided, in order to allow deterministic behavior during exchange of the different time-critical user data.

15 Claims, 6 Drawing Sheets

(51) Int. Cl.
  *H04L 12/40* (2006.01)
  *H04L 29/08* (2006.01)

(56) References Cited

U.S. PATENT DOCUMENTS

| | | | |
|---|---|---|---|
| 6,161,160 A | | 12/2000 | Niu et al. |
| 6,539,488 B1* | | 3/2003 | Tota .......................... G06F 5/06 |
| | | | 710/305 |
| 7,120,713 B2* | | 10/2006 | Kinstler .............. G06F 13/4027 |
| | | | 370/467 |
| 2006/0120498 A1 | | 6/2006 | Wong et al. |
| 2009/0175290 A1 | | 7/2009 | Newald et al. |
| 2009/0260041 A1 | | 10/2009 | McGinn et al. |
| 2013/0254442 A1* | | 9/2013 | Robillard ................ G06F 21/85 |
| | | | 710/107 |

OTHER PUBLICATIONS

A. Mifdaoui, "Real-time characteristics of Switched Ethernet for 1553B-Embedded Applications: Simulation and Analysis," Industrial Embedded Systems, 2007, pp. 33-40.

International Search Report (PCT/ISA/210) dated Jul. 9, 2014 with English-language translation (nine (9) pages).

German-language Written Opinion (PCT/ISA/237) dated Jul. 9, 2014 (twelve (12) pages).

\* cited by examiner

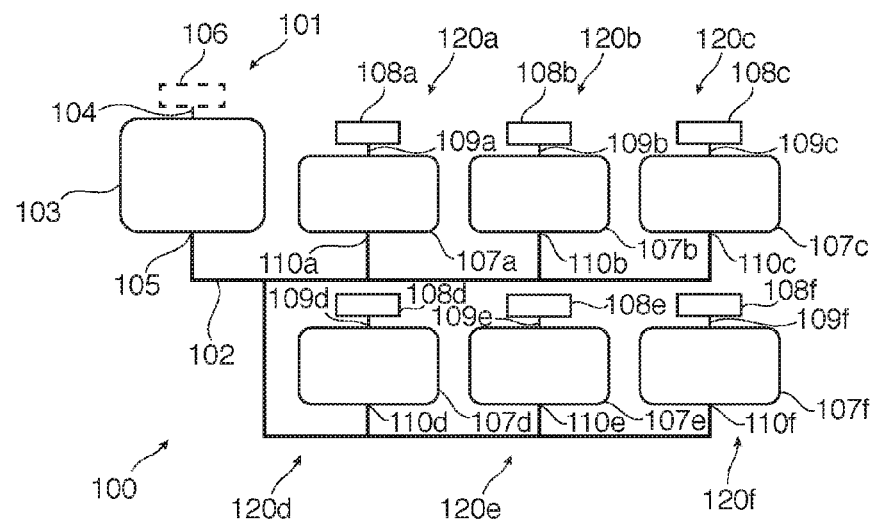
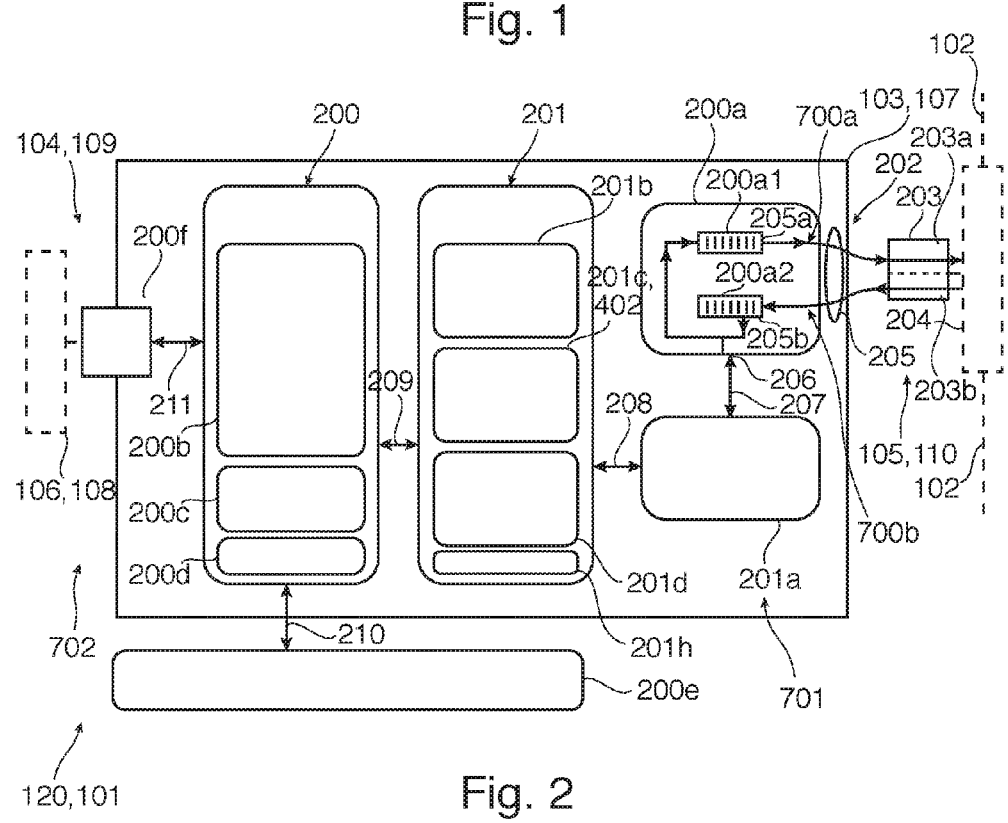

INTERFACE DEVICE AND METHOD FOR EXCHANGING USER DATA

CROSS-REFERENCE TO RELATED APPLICATIONS

This application is a divisional of U.S. application Ser. No. 14/647,846, filed May 28, 2015, which is a national stage of PCT/DE2013/000704, filed Nov. 26, 2013, and claims priority of German patent application no. 10 2012 023 395.7, filed Nov. 29, 2012 the entire disclosures of which are herein expressly incorporated by reference.

FIELD OF THE INVENTION

The present invention relates to the technical field of aerospace technology. In particular, the present invention relates to an interface apparatus for exchange of different time-critical user data, to an avionics component, to a collision avoidance system, to a method for exchange of different time-critical user data, and to a memory medium.

BACKGROUND OF THE INVENTION

Highly agile aircraft, such as military aircraft, move at very high speeds. Without technical components that regulate the flight attitude and support the pilots so that they can react to changes with a short reaction time, it is almost impossible to allow stable and ecological flight. For this purpose, flight attitude parameters and environmental parameters are constantly determined by avionics components during flight, and converted by the flight control system, together with the control parameters input by the pilot, into regulation parameters, or displayed on display devices in the cockpit, in processed form. For flight support, strict time requirements are set for the avionics components and, in particular, for the network of different avionics, in particular with regard to the latency and cycle times in the regulation circuit when querying and distributing measurement variables and control parameters within the flight control system.

An example of a network of avionics components that forms a flight control system can be a GPS system, which, together with the air data (pressures, temperatures, and angles) and different inertia sensors constantly calculates the new setting variables for the different actuators, on the basis of the control parameters input by the pilot into the evaluation computers of the flight control system. Other examples are signal networking in a radar system, control of the landing gear, or also a distributed air conditioning device for the cabin with its distributed sensors or actuators for regulating temperature and pressure.

This high requirement for the response behavior of the avionics components, as described, which is connected with a very rapid response time or reaction time of the individual avionics components, is summarized with the term real-time capability. Systems that meet specific time requirements, particularly that guarantee a response within a specific period of time after a command or a message is issued, are referred to as real-time systems or real-time-capable systems.

As already described, avionics systems can be distributed real-time systems, the components of which are positioned in different locations of an aircraft. Because of the installation of the components in different locations, a network or a transmission medium is required in order to join the avionics components into an overall system. Because of increased robustness requirements, particularly with regard to the physical layer of a network protocol when used in aircraft construction, it is generally not possible to use standard network components, which usually provide for collisions in their concepts, because of the simpler management and simpler design of the network, and thereby do not make the behavior of the overall system deterministic.

However, the production costs of standard network components can be lower, because of significantly higher unit numbers and lower real-time requirements, than those of network components to be used in avionics systems to ensure real-time behavior, and, in particular, their physical layer. It would be desirable, for example, to use Ethernet components for transmission. However, an infrastructure based on Ethernet IEEE 802.3 (Institute of Electrical and Electronics Engineers) specifically provides for collisions during joint network access of different components. Ethernet is based primarily on correcting collisions instead of providing for avoiding collisions.

Network systems that can adhere to the determinism that is demanded for avionics systems, on the physical layer and on higher layers, are, for example, the hardwired MILBUS protocol, the EFABUS (European Fighter Aircraft Bus Protocol) protocol, or the EFEx (EFABus Express) protocol on the basis of a glass fiber network.

Aside from the high costs, the network infrastructures used for avionics components have the disadvantage that they are too slow for some future concepts of new avionics applications or possible future avionics applications. For example, the MIL-STD-1553B protocol may be able to deliver a transmission rate of 1 Mbit/s, which appears "slow" in comparison with other commercial networks, but it is nevertheless always still preferred because of the high level of data security and the determinism.

From the article by Wang et al. "A Hard Real-Time Communication Control Protocol Based on the Ethernet," Proceedings 7th Australasian Conference on parallel and Real-Time Systems (Part 2000), pages 161 to 170, Sydney, Australia, November 2000, Springer Verlag, ISBN 962-430-134-4, it is known to operate an Ethernet-based communication protocol, called the Real-Time Communication Control (RTCC) protocol, on an Ethernet MAC (Medium Access Control) protocol.

The article by A. Mifdaoui, et al., "Real-Time characteristics of Switched Ethernet for "1553B"-Embedded Applications: Simulation and Analysis," 1-4244-0840-7/07, IEEE 2007, analyzes real-time traffic by analogy to the MIL-STD-1553B databus in a military aircraft, where the traffic shaping methods First-Come First-Served (FCFS), Static Priority (SP), and Weighted Fair Queueing (WFQ) are utilized.

It is possible that there is a demand for determinism in communication on the part of a large number of existing avionics applications.

SUMMARY OF THE INVENTION

According to one aspect of the present invention, an interface apparatus for exchange of different time-critical user data, an avionics component, a collision avoidance system, a method for exchange of different time-critical user data, and a memory medium are made available. The memory medium can be readable by a computer. An interface apparatus can be made available for every subscriber of a communication system.

According to one aspect of the present invention, the communication system can logically have a bus topology, but physically, a different topology can be used, such as, for example, a star topology or a tree topology.

By means of the invention, it can not only be possible to use standard network components in new installations of avionics systems in aircraft, but also to connect avionics components with one another and, in this connection, to set them onto an already existing network structure, independent of the protocol used on it.

According to one aspect of the present invention, an interface apparatus for exchange of different time-critical user data between a host device and a divided medium is made available. The interface apparatus has a first interface for exchange of the different time-critical user data with the host device, and a second interface for exchange of the different time-critical user data with the divided medium. Furthermore, the interface apparatus has a resource management device. In one example, the combination of an interface apparatus and a host device and/or the interface apparatus alone can be referred to as subscribers.

The first interface works with a first clock pulse, and the second interface works with a second clock pulse, which can differ from the first clock pulse. The first clock pulse can therefore be equal to the second clock pulse, or the two clock pulses can be different. The host device can therefore work asynchronously relative to the remaining components of the interface device, when using different clock pulses. In one example, the second interface can work with different clock pulses for receiving and transmitting signals, so that the second interface transmits signals with the second clock pulse, and receives signals with the third clock pulse. The transmission clock pulse domain and the reception clock pulse domain can work with different clock pulses in this case.

Furthermore, the interface apparatus has a resource management device and a temporary memory device. The first interface and the second interface are connected with the temporary memory device. The exchange of the different time-critical user data between the first interface and the second interface can be made possible by way of the temporary memory device.

The resource management device is set up in such a manner that it can control the exchange of the different time-critical user data between the first interface and the second interface in such a manner that collisions of the different time-critical user data within the interface apparatus and/or on the divided medium are avoided. Avoidance of collisions of the different time-critical user data guarantees deterministic behavior during the exchange of the different time-critical user data. Furthermore, the resource management device is set up for controlling the temporary memory device in such a manner that the different time-critical user data can be temporarily stored, using the temporary memory device, in such a manner that a clock pulse difference between the first clock pulse and the second clock pulse is balanced out.

Examples of different user data can be counter-current data streams or data streams that spread out in the same direction, in terms of time. In one example, the different time-critical user data can be user data that are essentially transmitted at the same time, in two different transmission directions. Essentially simultaneous transmission in different directions can be referred to as bidirectional transmission. Aside from preventing collisions of these user data, which spread out in different transmission directions, collisions of different user data that move in the same transmission direction but take place one after the other, in terms of time, can be avoided. In other words, a temporal sequence or a temporal determinism of the user data can be adhered to. Reciprocal passing of user data within the interface apparatus can be avoided by means of rules regarding access to the temporary memory. Adherence to the access rules can be monitored by means of the resource management device or by parts of the resource management device. In one example, the resource management device can have a Finite State Machine (FSM) or a sequential one-dimensional FSM. A FSM can be described by its states and status change. In the case of a one-dimensional and sequential FSM, most of the status changes of the FSM can be static. The status that the FSM assumes at a point in time t1, for example, can essentially be solely a function of the previously assumed status at a point in time t0, and not be dependent on other parameters. If a signal sequence plan, a layout or a control path of such a FSM were to be displayed graphically, then it would show few branches and therefore be essentially one-dimensional. The only statuses are assumed sequentially, cycled through one after the other, and in the sequence predetermined by the control path. Cycling through can refer to a process in which a jump from one state to the next takes place.

In one example, the different time-critical user data can be arranged temporally and spatially in the temporary memory device, taking into consideration their time parameters, in such a manner that they do not reciprocally block one another. In another example, merely a register logic can essentially be used for arranging them, in order to ensure the required determinism. In a further example, the resource management device can be connected with the first interface and/or with the temporary memory device. The resource management device can be implemented by means of a control logic or register logic. The resource management device, particularly the control logic, can also be utilized as a temporary memory. The control logic can also be implemented as a coupling matrix or as a switch.

Equalization of the different clock pulses can make it possible for a plurality of interface devices that are operated on the same medium to work synchronously, but the respective host devices can work with different clock pulses and thereby perform different avionics applications.

According to a further aspect of the invention, an avionics component is described, which has a host device, a media connection device or a network controller, and the interface apparatus according to the invention. The host device is set up for implementing an avionics application, which generates and/or evaluates user data. The host device is connected with the interface apparatus for exchange of the user data, where the interface apparatus is also connected with the media connection device for exchange of the user data.

The host device can control an avionics application that is not concerned with the manner of data transmission. For example, an avionics application can be assigned to the layers 4 to 7 of the OSI model (Open Systems Interconnection Reference Model). The interaction of the individual distributed real-time application can lead to an overall system that is real-time-capable. This overall system can perform tasks that are required to operate an aircraft. For example, the avionics components working together or the overall avionics system can perform tasks that support navigation, control of air-conditioning devices and/or speed measurement. This interaction of different real-time applications can be referred to as a distributed real-time application.

The media connection device can produce a connection between the interface apparatus and a physical, divided medium. For example, signal levels can be produced within the media connection device, which allow transfer of data generated by the host device to the physical medium. The data generated by the host device are transported to the media connection device by way of the interface apparatus. During this transport, the user data can already be provided with additional data such as a transmission frame, in such a manner that the media connection device essentially merely has to convert the delivered user data into signal levels. Often, the media connection device can be set up as a MAU (Medium Attachment Unit). The media connection device can have a network controller. Furthermore, in one example the media connection device can have a media-independent interface (Media Independent interface), for example MII or GMII (Gigabit MII), by way of which it can receive and/or send the user data.

According to yet another aspect of the present invention, a collision avoidance system is described, which has at least two interface apparatuses and at least two media connection devices. The media connection devices connect the at least two interface apparatuses by way of a divided medium, and each work with a collision recognition protocol. The at least two interface apparatuses use a command/response protocol and monitor the time behavior of the command/response protocol by means of a time monitoring device, in such a manner that the time behavior of the command/response protocol is adhered to, in order to avoid collisions of the collision recognition protocol.

For monitoring of the time behavior of the command/response protocol (Command/Response protocol), a central control device, a director or a bus controller can be used, which prescribes at what points in time individual actions are supposed to take place on the divided medium. This central control device can ensure that not more than a single subscriber accesses the divided medium, for example in that messages that are prematurely present because of having passed through the interface apparatus too quickly are held back until the data transmission was requested by the bus controller.

According to another aspect of the present invention, a method for exchange of different time-critical user data between a host device and a divided medium is described. This method has the step of operation of a first interface of an interface apparatus with a first clock pulse and operation of a second interface of the interface apparatus with a second clock pulse, wherein the first clock pulse can differ from the second clock pulse. In one example, the first clock pulse and the second clock pulse can be essentially the same. In another example, the first clock pulse and the second clock pulse can be different. Furthermore, the method provides for connecting the first interface and the second interface with a temporary memory device, and for exchanging the different time-critical user data between the first interface and the second interface by way of the temporary memory device. Also, the method controls the exchange of the different time-critical user data between the first interface and the second interface in such a manner that collisions of the different time-critical user data within the interface apparatus and/or collisions on a divided medium connected with the interface apparatus are avoided, in order to allow deterministic behavior during exchange of the different time-critical user data. Finally, temporary storage in memory of the different time-critical user data is also provided for in the method, so that a clock pulse difference between the first clock pulse and the second clock pulse is balanced out by means of the temporary storage in memory.

According to another aspect, a memory medium is described, in which a program is stored, which, when it is carried out by a processor, carries out the method for exchange of different time-critical user data.

A floppy disk, a hard disk, a USB (Universal Serial Bus) memory device, a RAM (Random Access Memory), a ROM (Read Only Memory) or an EPROM (Erasable Programmable Read Only Memory) can be a computer-readable memory medium. A communication network can also be viewed as a computer-readable memory medium, such as, for example, the Internet, which allows downloading of a program code.

The interface apparatuses can essentially ensure that the behavior of a network, of an overall system or medium that are used essentially implements the same degree of determinism as the systems, interface apparatuses, avionics systems, host devices or subscribers themselves, in order not to endanger the hard real-time behavior of the overall system. This can mean that in the case of a distributed real-time system, reaction times for communication from a central control unit of an avionics system to a remote sensor or actuator of the avionics system and/or back should lie within a firmly predetermined or deterministically predetermined time interval, and that adherence to the time interval is ensured for the corresponding communication. If a delay were to come about, the overall system could get into an unstable state, because data required at a specific time, for example, are not present.

To guarantee this high degree of determinism in avionics, when using distributed systems, a network transmission can be controlled by means of a central communication unit called the Bus Controller (BC). This controller should maintain an overview of the level of use of the transmission medium and prevent multiple of the distributed components from accessing the jointly used network infrastructure in uncontrolled manner and at the same time. Simultaneous access to the jointly used infrastructure could lead to collisions. It is true that such collisions could be cancelled out, for example in CSMA/CD (Carrier Sense Multiple Access/Collision Detection), but in this connection, the overall system can lose time for eliminating the conflicts, and thereby also lose its deterministic nature. A BC can be accommodated on a common device with a central component of an avionics system. However, it can also be implemented as a separate device, which can concern itself exclusively with allocation of the transmission medium.

The temporal flow of a central control unit can be predetermined. Predetermination of the temporal flow can lead to static behavior of the central control unit, and the static behavior can impart a deterministic nature to the central control unit and/or to the overall system. In other words, it can be predetermined by means of allocations that are established in the design of a network, taking signal running times into consideration, at what time what component can use the joint network infrastructure. It can also be guaranteed that no unforeseen and additional delays occur. Certain delays can be permitted, however, and can already be incorporated into the design of the network system, as long as they are deterministic, in other words always occur in the same manner with the same properties. Such permitted delays can be, for example, the delay for carrying out calculation operations within the system components, the running time within a system or the running times on the medium. The system components and the medium can form the network.

Avionics systems, particularly the software of the avionics systems, in other words, for example, a navigation software, can be based on this approach and can rely on the fact that the systems responsible for the transport of the data can be responsible for or adhere to a predetermined reaction time. Thus, in the case of a GPS or radar system, a central navigation software can predetermine at what points in time current position data of a GPS receiver are supposed to be read.

In order to ensure this determinism, which is required for avionics components or avionics systems, special layers of network protocols can be used for the networks, for example the physical layers on layer 1 of the OSI network model, which are specifically designed for avionics requirements. The layers can be implemented as modules. Careful design of layer 1 can be a prerequisite for signal integrity in rough environments, for example, in the presence of radiation or to meet EMC (electromagnetic compatibility) requirements in aircraft. Because layer 1 avoids transmission errors, its application-appropriate design can be a necessary but not a sufficient condition for the required determinism.

Determinism can thereby be implemented essentially only if higher layers of the network protocol avoid collisions. The temporal determinism of transmission can be guaranteed by means of a specific design of the higher layers, such as, for example, of the Media Access Control layer or of the applications layer or of the modules that implement them.

Since the standards EFABUS and EFEx became capable of use, there can be Ethernet technologies based on the protocol IEEE 802.3, which are characterized by sufficient robustness against electromagnetic field effects. The ability to use the Ethernet technology and the sufficient robustness achieved in this way has been shown in experiments with AFDX networks (Avionics Full Duplex Switched (X) Ethernet), which also use an Ethernet technology. AFDX networks and/or AFDX components must, however, be adapted in order to turn them into essentially completely deterministic components. A media-independent interface (MII, Media Independent interface) or the GMII (Gigabit MII) must be provided as an access point or interface for the physical layer (Physical Layer) of the IEEE 802.3 or Ethernet.

A command/response protocol or Command/Response protocol can be set up on the aforementioned layers of the Ethernet. When setting up the command/response protocol on Ethernet, individual protocol layers cannot be replaced. Instead, the Ethernet protocol can be enriched with elements of the command/response protocol. The Ethernet protocol can essentially be allocated to the layers 1 to 2, and the command/response protocol can be allocated to the layers 1 to 4 of the OSI model. In particular, according to one aspect of the invention, the Ethernet protocol IEEE 802.3 can be used exclusively for implementing the functions of the layer 1, while the command/response protocol can be used exclusively essentially for the layer 2. In other words, in an interface apparatus and/or in an overall system according to the invention, an Ethernet protocol can be implemented, in which the functionality of the layer 2 has been replaced or enriched by a command/response protocol. Therefore the layer 1 made available by the physical medium, which might already exist, can be utilized and, by means of replacement of the layer 2 in combination with adherence to an internal determinism, the interface apparatus can be adapted to the requirements for operation in an aircraft. The separation of the layer 1 and layer 2 can be evident from the structure of a transmission frame generated by the interface apparatus. A protocol analyzer can be used to check the production of a transmission frame according to the invention. In one example, AFDX can also be made real-time-capable by means of adaptation of the layer 2 with a command/response protocol and by ensuring an internal deterministic time behavior by means of the interface apparatus. Therefore the command/response protocol can essentially be used for the layer 2. In one example, however, the checksum, particularly the checksum method, can be used in the command/response protocol, which sum or method corresponds to the definition of the checksum/of the checksum method of the Ethernet layer 2. By means of the use of the checksum in accordance with the definition for the layer 2 of the Ethernet, compatibility with other Ethernet devices can be guaranteed, such as, for example, compatibility with a switch that implements the Ethernet standard.

The command/response protocol can be implemented by means of a FPGA (Field Programmable Gate Array), in other words with register logic and memory logic and particularly with use of the logic components and memory components of the FPGA, in such a manner that the temporal demands on the response time can be met, until the time that a response is returned after a command has ended. Implementation of the command/response protocol on the basis of a FPGA can guarantee processing latencies and maximal throughput of data through the FPGA. In other words, eliminating interference variables in that the FPGA is specifically tailored to the command/response protocol can prevent unpredictable interference when processing the command/response protocol. Consequently, deterministic behavior of the interface apparatus can be implemented. The register logic and/or memory logic can be blocked, during operation, by external influences such as interrupts on the FPGA.

Malfunctions, such as, for example, failure of a component, particularly of a cable or a device, can be reduced by means of providing redundancies. However, such malfunctions essentially have no influence on the time behavior of the transmission, but rather on the operability of the system as such, and possibly might lead to a complete failure in operation. It might not be possible to block these failures in operation during operation, but their effects can be reduced. For the production of redundancy, both the communication medium and also the initiator of the bus transactions (BC) can be doubled or multiplied, so that in the event of an error, it is possible to switch over. In the following, doubled components can be assumed, which are referred to as A and B. An error case can be, for example, a cable break or a device failure. If such an error case occurs in a redundant system, it is possible to switch over to Bus A or Bus B and/or to the Bus Controller (BC) A or BC B, which is still capable of functioning, if the communication medium is doubled in the form of a first Bus A and a second Bus B, if a further Bus Controller B (Alternate Bus Controller B) is provided in addition to the first BC A. A doubled bus can be referred to as a dual redundant bus if the data stream occurs only on one bus, or as a duplex bus if the data stream occurs simultaneously on both. Triple or quadruple redundancy of the bus is also possible, and is referred to as a triple or quadruplex bus. In these cases, the data stream is generally distributed simultaneously to all existing bus branches (lanes).

It is true that such an error case as described can also influence the determinism of the overall system, but it might not be avoidable, such as blocking out external influences, for example the occurrence of delays of unpredictable duration. However, in a deterministically structured system, failures such as a cable break in a data bus can be quickly and essentially clearly recognized. This is because in an error case, a time monitoring system will generate an alarm, for example a Time Out, immediately after a fixed predetermined time without data reception. The alarm can be generated quickly, because due to blocking of other external influences, a conclusion concerning the respective error location and the reason for the error can be drawn immediately, by way of the corresponding assigned time monitoring system. Because a transmission error, for example, can essentially be recognized clearly, redundancy measures can be activated immediately, such as switching over to an alternative bus line or to an alternative device.

Systems that are not structured deterministically cannot limit the error situation as quickly, because an unambiguous criterion is lacking.

The bus controller cyclically processes a bus list or a schedule, according to the command/response protocol, which list or schedule regulates when what user data are exchanged between what subscribers. This schedule can be viewed as a "schedule for the user data."

The bus controller, which sends the commands of the command/response protocol to the bus, can control the error correction in the event of an error, after error detection, in that it either switches over to an alternative bus list for the command/response protocol or changes individual parameters of the bus list according to predetermined algorithms, in such a manner that in the event of an error, it utilizes redundantly present systems. By means of the response of the redundant devices, it is possible to switch over both between bus lines A and B, and also between entire devices. For this purpose, the bus controller (BC) will also remove systems that have been recognized as permanently defective from the bus list, so that no further time is wasted by a useless attempt to use defective components. In other words, the bus list or the bus protocol represents the schedule, and the bus controller can switch over to an alternative bus list or change individual parameters of the existing bus list according to predetermined criteria. For example, a device can be additionally addressed or excepted from communication by being added to the schedule or taken out of the schedule. If, however, the schedule is not changed at all, and if, alternatively, an equivalent device not used before is supposed to be used in place of a previously used device, the address in an existing bus list can be changed.

Alternatively to the implementation of the interface apparatus by means of a FPGA, the interface apparatus can be implemented by means of an ASIC (Application Specific Integrated Circuit). However, the interface apparatus can also be made available, instead of by means of hardware, by means of an essentially software-based solution, which can guarantee adherence to the temporal determinism by means of the individual allocation of resources for processing the command/response protocol. In the software-based solution, a program code running on a processor can essentially take on control of the hardware components. In the case of the software-based solution, as well, an external influence, such as the occurrence of an interrupt, can be blocked by means of appropriate provisions. An interrupt can be brought up to the interface apparatus "from the outside," for example by a network component. However, this external influence can be kept away from the message transmission by means of a blocking apparatus that is able to regulate the resource allocation, for example. The message transmission can take place by means of the reassignment of registers and the displacement of pointers, and can essentially not be influenced by the interrupt.

Any desired combination of components of the hardware solution and the software solution can be possible.

The use of Ethernet as the underlying basis for a command/response method, such as, for example, for the protocol MIL-STD-1553B or EFEx, can be transparent for the avionics applications if, in spite of the use of a network infrastructure based on Ethernet, particularly of the physical layer of the network infrastructure, up to the GMII or MII, the original time behavior of the command/response networks previously used can be guaranteed in higher layers. By means of these measure, for example, an avionics application or a host device cannot determine that the transmission system has been replaced. The original time behavior can essentially be predetermined by the MIL-STD-1553B or EFEX standard, and adherence to the time behavior can be ensured by means of the method of implementing the interface apparatus that has been described.

A parameter that must be noted for determining the suitability of a transmission infrastructure or of a divided medium can be the Response Time, the response time or the reaction time within which a component must place a datum onto the medium after a request or after a comment of a central unit, for example of a bus controller.

When using a FPGA for implementation of the interface apparatus, the pass-through time within the FPGA, in other words the total of the time taken for the message to pass through the FPGA from the first interface to the second interface or from the bus controller to the second interface, for example in the form of a query, and back, for example in the form of a response, and/or the processing time in a host device can be overly low in relation to an originally expected response time. In case the original response time is predetermined by the MIL-STD-1553B or by the EFEx standard, the pass-through time in the interface apparatus can be in the range of nanoseconds (ns), while the standard to be replaced expects a response within an order of microseconds (µs). This shows that by means of the interface apparatus described, it is possible to penetrate into a time range that lies below the time range that is often referred to as deterministic and can be on the order of milliseconds (ms, in other words on the order of $1\times10^{-3}$ s). It can also happen that responses are available before the expected point in time. Nevertheless, the predetermined timing should be adhered to. The interface apparatus can therefore be set up for data transmission at a predetermined point in time, which can be determined with a precision on the order of a few µs, which therefore can be determined with a precision on the order of $1\times10^{-6}$ s. As a result, the order of magnitude for the response behavior of the interface apparatus can lie in the range of the MILBUS or EFEx standard.

When using AFDX, it might be possible to establish essentially only a probability with which data are transmitted at a predetermined point in time, and this probability can be determined only in the range of ms. However, establishing only a probability instead of predetermined response times might not meet the criteria for determinism.

When using an Ethernet protocol without further mechanisms, collisions occur, which can lead to dropouts or waiting times of up to several seconds and therefore cannot be used for adherence to determinism.

The interface apparatus can have a time monitoring device for adherence to the response times, which device is set up for retaining existing time-critical user data in the interface apparatus until transmission is provided for in the time schedule that controls the transmission to the medium. The schedule can ensure that the response is made available at the point in time at which it is expected by an apparatus sending a query. The time monitoring device can therefore ensure that time-critical user data are not distributed to the medium prematurely because of the rapid processing within the interface apparatus. By means of this retention of the response, it can also be ensured that the subscribers connected with the medium work synchronously. In other words, the time monitoring device can be a unit that is provided essentially for precisely measuring the response time. In one example, the interface apparatus can be set up for starting the time monitoring device while user data of an avionics component arrive at its first interface. For this purpose, the interface apparatus of a first subscriber can be set up for recognizing the presence of user data at the first interface. The interface apparatus can furthermore be set up for performing the processing of the user data, particularly the transport of the user data from the first interface of the first subscriber to the first interface of a second subscriber, after or during reception of a corresponding command from a BC. Afterward, the interface apparatus of the second subscriber can output the response, by way of the second interface of the second subscriber, to the medium, wherein the interface apparatus of the second subscriber can ensure that a predetermined response time has been reached before it passes the response on to the medium. The response that belongs to the user data, made available by the second interface of the second subscriber, is recognized at the second interface of the first subscriber and passed on to the first interface. The user data can be time-critical user data that are transmitted in response to commands, in different directions. The commands can be generated by a BC, which is situated, for example, also on the interface apparatus. The transport of the user data can be organized by means of RTs. In a different example, a command can be transported from one avionics component to another. In yet another example, a received command can be processed in the command/response protocol within the interface apparatus. These commands, intended for processing, are not passed on to the first interface or to the host side within the interface apparatus. This first interface or host side within the interface apparatus does not know when what command arrives at the second interface, at the medium or on the bus side, in other words works independent of the second interface.

In MILBUS, both commands and responses can contain user data, which are transmitted in different directions. However, commands essentially come only from the bus controller. User data, however, can come either from the bus controller or from a subscriber or host. If the user data come from the bus controller, they are appended to the command. If the user data come from the subscribers, they are contained in the responses of the individual subscribers. Receivers of user data can be the bus controller or other subscribers. Both a receive command and a response to a transmit command can therefore contain user data.

In one example, the time monitoring device can be implemented as a stopwatch or timer. The time monitoring device can have a counter that is counted up or down, until a threshold value is reached, which corresponds to the predetermined response time. Only when the threshold value is reached essentially precisely can the response be transmitted to the medium for distribution.

The interface apparatus can be set up for carrying out the time monitoring. On the one hand, it can be set up for blocking unforeseeable events, which could lead to an unforeseeable delay—possibly beyond the magnitude of µs. On the other hand, the interface apparatus and particularly the time monitoring device can also be set up for monitoring the minimum time default values, so that prematurely making messages available is prevented. In one example, the interface apparatus can be set up for monitoring a lower and an upper limit of a reaction time.

The time monitoring device can be a part of the resource management device.

By means of making an existing physical network infrastructure, a divided medium, and, in particular, the Ethernet usable, the bandwidths and cost advantages of these technologies can be utilized. Thus, for example, many avionics components or avionics applications already have Ethernet connectors implemented on the avionics boards for administration purposes, which guarantees the specific avionics functionality. Such an already existing component can be utilized, using the interface apparatus according to the invention, thereby particularly ensuring monitoring of the time behavior or of the determinism, without having to accept losses in real-time capability. In one example, an existing MIL-STD-1553B infrastructure can be converted into an Ethernet-based infrastructure by replacing the media adaptation device and providing an interface apparatus.

An avionics component can be implemented on a system board or a system circuit board. This system board can be configured, in one example, as a plug-in card. This system board can already provide the Ethernet connector. In one exemplary embodiment of the invention, such a configuration port can be utilized as a media connection device or connector for a divided medium, in order to transmit the time-critical data in this way. Utilization of the already existing component can contribute to saving costs and weight.

Replacement of a MIL-STD-1553B connector or EFEx connector with a jointly utilized transmission medium, for example an Ethernet connector, should represent little porting effort from the point of view of the user. However, it might be possible to achieve a reduction in costs by using a commercially available physical transfer medium, particularly an available physical layer. For commercially available physical transfer components, lower restrictions in distribution, for example due to export restrictions, such as those that exist for EFABUS or EFEx, would also be expected, because, for example, Ethernet components are free of ITAR (International Traffic in Arms Regulations).

EFABUS and EFEx networks are operated at 20 Mbit/s and thereby can compensate limited transmission rates of conventional MIL-STD-1553B protocols. In EFABUS systems, glass-fiber lines are utilized in addition to metallic conductors; these lines are very expensive and represent great effort in laying them. In order to operate the MILBUS, i.e. a system that works according to the MIL-STD-1553B protocol, at a higher clock pulse, new cabling can be provided, but this again is specifically designed for the MILBUS and is therefore expensive. On the other hand, special transmission techniques can be utilized, for example methods of frequency multiplex, as they are known from DSL (Digital Subscriber Line) technology, in order to utilize data rates of approximately 20 to 200 Mbit/s on the MILBUS. Previously, 5 Mbit/s were achieved with new cabling. Because of their great complexity, such systems will probably find little acceptance on the market.

Furthermore, all system designed only for aircraft use can also have a cost disadvantage, among other things because of their lower production numbers, as compared with widely available mass-produced products such as Ethernet components, which are advantageously offered for sale as COTS (Commercial off-the-shelf) network technologies.

The interface apparatus described, either hardware-based on FPGA or ASIC or by means of software adaptations and dedicated resource allocation, can make it possible for cost-advantageous COTS products such as, for example, Ethernet components, to make deterministic or real-time-capable transmission behavior available to the avionics systems. Furthermore, there is experience in making the physical layer of the Ethernet resistant to parasitic electrical and magnetic field effects, so that interference requirements also will not represent a restriction when using Ethernet components. It was possible to gain experience in Ethernet technology also with AFDX, for example. AFDX is also based on an Ethernet technology, but a specific bandwidth can be reserved for each component to be addressed, and a very complicated switch can be used for AFDX.

A bus system that is based on the international standard published by the US-DOD (Department of Defense), MIL-STD-1553B, with supplements published in Notice 2, can be referred to as MILBUS. In Europe, MILBUS is also frequently referred to as STANAG 3838.

A transmission system that is used in the first series lots of the Eurofighter and is based on the international standard STANAG-3910 can be referred to as EFABUS. EFEx (EFA-BUS-Express) is a further development of the EFABUS protocol with adaptations and optimizations for the further series lots of the Eurofighter, in which, however, hardware that is unchanged as compared with the EFABUS can continue to be used. The EFABUS protocol or the EFEx protocol utilizes not only a higher data rate as compared with the MILBUS, which lies at 20 Mbit/s instead of 1 Mbit/s, but also a larger address space or a larger data block size than the MILBUS. The avionics components or subscribers that are provided in a MILBUS system, are, in a network section, a single bus controller (BC) and 31 remote terminals (RT). Optionally, a bus monitor or diagnostics system (MON) is provided. A broadcast address is used (RT 31). Each subscriber of a MILBUS system has a transmission (TX) and reception region (RX), each having maximally 30 subaddresses, each having maximally 32 data words at 16 Bits.

EFABUS or EFEx, as an active subscriber, has a BC (bus controller) and furthermore up to 30 RTs (Remote Terminals). EFABUS and EFEx utilize a broadcast address (RT 31) and optionally a monitor (MON).

For reasons of redundancy, a RT is generally provided for the purpose of helping to take on the function of the bus controller if it fails—for this reason, an individual RT address is also issued for a BC. Per subscriber, there is a transmission (TX) and reception region (RX), each having maximally up to 255 subaddresses, each having maximally 4096 data words.

For this reason, it can happen that the memory existing on a FPGA is not sufficient and an expansion memory must be accessed. A subaddress can be utilized to address various resources such as memory regions or functional groups within a terminal on the bus, i.e. within a physical unit or within an interface apparatus.

A resource management device can use existing resources, for example the components of an FPGA, such as the memory or control logic, or also combine them into modules, in such a manner that the tasks demanded of them can be met. The resource management device can administer a plurality of different resources. A resource management device can be implemented as a Finite State Machine (FSM) and thereby form a sequential logic system that relocates data between the different memory devices. This relocation can also be referred to as cycling through, and can be actively controlled by the FSM. The relocation can take place in status-controlled manner. The FSM implements the logic that controls when, what, from where and to where transfer is taking place. If something is changed in this logic, the FSM would have to be changed in terms of its structure or switching. The hard-wired logic can be useful for adherence to the determinism. The relocation can take place in accordance with a timing, schedule or timetable that has been predetermined in fixed manner.

The temporary memory device can be a memory device composed of multiple individual memory modules. The individual memory modules can be combined to form sub-memories of the temporary memory device, in order to be able to make memories having specific properties available. Thus, for example, different memory sizes, which are tailored to the packet sizes to be processed, can be produced by means of combining different memory modules. On the other hand, the memories can also be used in different modes, in other words, for example, as single-port, dual-port or multi-port memories, or as asynchronous and synchronous memories.

A dual-port memory, which has two interfaces, two ports or two interfaces, which are operated with different clock pulses, can be referred to as an asynchronously utilized memory. For example, one interface of the asynchronous memory can be utilized to write data, for example user data or messages, into the memory with a first clock pulse frequency, and the second interface can be utilized to read the written-in data out with a second clock pulse rate. If the second clock pulse rate is higher than the first clock pulse rate, the memory can be read more quickly than it can be written to. Vice versa, if the second clock pulse rate is lower than the first clock pulse rate, the memory can be read more slowly than it can be written to.

When the same message is simultaneously read and written, the consistency of the read data could furthermore be endangered. In one example, an alternating buffer can be used to avoid endangering the consistency of a read datum.

Furthermore, the situation can arise that the timing of the command/response protocol asks for a data transfer even if the memory is busy with another access at that time. In order to be able to perform this transfer, advantage can be taken of the fact that the pass-through time in the interface device of the signal processing in the host device lies in the range of ns as compared with the response time on the medium, which lies in the range of us and is therefore slower.

As the result of the use of different clock pulse rates, collisions can occur when reading and writing data. In order to avoid such collisions, it can be signaled, by means of a signal exchange between the first and second interface of the memory, when what access can take place. This signal exchange is controlled and monitored by the resource management device.

According to another aspect of the invention, the interface apparatus can furthermore have a time monitoring device, wherein the time monitoring device is set up for monitoring the time behavior of a command/response protocol in such a manner that the time behavior of the command/response protocol is adhered to.

The time monitoring device can contain provisions made by a bus controller.

According to a further aspect of the present invention, the first interface or the first interface device has a user data memory. Also, the second interface or the second interface device can have a memory, the transmission memory. The transmission memory can be configured as a transmission register.

The user data memory can be implemented as a memory that either the interface apparatus or the FPGA can access, or also a component located outside of the FPGA, for example, a host device. Consequently, a data exchange between the host device and the interface apparatus can take place by way of the user data memory, so that user data can be read from or written to the interface apparatus by way of the user data memory. The interface apparatus can allow access by a further component located outside of the interface apparatus, for example by the divided medium. In this connection, the FPGA logic of the interface apparatus administers and segments the accesses in such a manner that the real-time capability of the interface apparatus and also of the external component is guaranteed with different real-time requirements. The access of the host device or of other external components can be segmented in such a manner that the sum of the access time of a segment and the processing time on the medium side or Ethernet side still clearly lies within the maximal response time. Such an external component can also be a media controller or an Ethernet controller. The external component also becomes accessible from the second interface by means of this access possibility. By way of the transmission memory, data can consequently be exchanged between the interface apparatus and a divided medium, particularly between the second interface and a network controller.

While external influences are essentially blocked out in order to ensure real-time capability, the user data memory and/or the transmission memory can essentially be the only interface toward the outside by way of which communication to the outer region of the interface apparatus is permitted.

The interface apparatus learns of the external accesses by way of the user data memory and/or the transmission memory and it utilizes the events provoked thereby. The accesses do not pass the interface apparatus without being noticed. Instead, the interface apparatus administers the external accesses, for example in that the time monitoring device is initiated, thereby ensuring the correct timing. Also, a classification of incoming user data can be initiated or triggered in this way.

A hard real-time condition (hard Real-time) can mean that essentially precisely established time marks for the protocol flow and the time behavior exist. If a timer expires or in the event of an alarm of a time monitoring device due to the fact that data are expected at a specific point in time but are not present, the redundancy mechanisms can essentially be activated immediately.

A data exchange between the interfaces can also take place essentially virtually, in that, for example, pointers to memory regions of the data and not the data themselves are exchanged. Because data are often copied when data are exchanged, direct data exchange by means of copying can lead to delays, which can be reduced by means of exchange of the pointers or addresses of the data. These delays could also be unforeseeable and disrupt the determinism.

Therefore the user data exchange between an avionics component located outside of the interface apparatus or its host controller and the medium also located outside of the interface apparatus can be achieved by way of the user data memory and the transmission memory. The avionics component or its host controller and the interface apparatus can be accommodated on a common board, in one example.

According to a further aspect of the present invention, the resource management device can be set up for controlling at least a part of the temporary memory device as a First-In First-Out (FIFO) memory.

Individual memory components that form the temporary memory can be controlled in different modes. By means of combining multiple basic memory modules, different memory types such as, for example, single-port memories, which have only a single interface for reading and writing data, but also dual-port or multi-port memories having multiple interfaces can be implemented. A FIFO memory can be a dual-port memory having two interfaces. In other words, every memory can be a physical single-port memory or a single-port memory module. The different type of a memory can result from the selected control of the single-port memory module. A group of types can allow different "subscribers" or different users of the memory parallel access. In order to allow parallel access, the single-port memory module can be multiplexed either geometrically or temporally. The arrangement of memory modules and the memory control can allow not only simple single-port memories but also the implementation of dual-port memories or multi-port memories. When using multiplex methods, however, the access capacity per port can be reduced accordingly.

According to a further aspect of the present invention, the FIFO memory can have a block RAM.

A block RAM can be a basic component of a FPGA and thereby also be present on a FPGA in large numbers. Block RAMs can be combined to form larger memory groups of any desired size, which can be operated in any desired manner.

According to another aspect of the present invention, at least two memories of the group of memories that consists of the temporary memory, the user data memory, and the transmission memory can be partial regions of a common memory.

Aside from the possibility of compiling the temporary memory from many small memory components, the possibility can also exist of dividing a large existing memory in smaller memory regions, so that, for example on the basis of the addressing, it can be established for what tasks what memory region is available.

According to another aspect of the present invention, the common memory can have an additional memory that is connected with the common memory by means of a memory management device.

By means of the memory components present on a FPGA, it is not possible to produce memory sizes of any desired size; for example, in the case of addressing of a command/response protocol according to the EFEx standard with 255 subaddresses, whereby maximally 4096 data words are provided for each subaddress, the memory available on the FPGA alone might not be sufficient to accommodate all the data words. In such a case, it would be possible to access external memory, for example an additional DDR (Double Data Rate) memory. Such an additional memory can be provided with a memory management device (Memory Access Control Unit), in order to guarantee correct, collision-free memory access. The additional memory, for example a DDR or DDR 3 memory, can be a single-port memory. Although the name "single-port memory" suggests that only a single port is present, a single-port memory can physically have a separate write port and a separate read port, by way of which the actual user data are exchanged, in each instance. The memory can be operated bidirectionally, and both ports can be implemented as FIFOs, since the memory or the temporary memory device is operated with a different clock pulse than the host logic. The part of the resource management device that faces the second interface can be referred to as the host logic.

Aside from the user data ports, i.e. the port for reading and the port for writing, a DDR RAM or a DDR3 RAM can have a third port for issuing memory commands. For example, during writing the data are written into the FIFO on the write side, and after the write command including parameters stops, they are taken over into the memory in final form, by way of the port for the memory commands. Consequently, conflicts resulting from collisions during simultaneous reading and writing can be caused by different devices. The memory management device can avoid such collisions by regulating access to the memory by real-time components and non-real-time components, for example. The term real-time component can refer to a component that must meet real-time requirements.

A distinction is made between two categories of real-time requirements.

A first category refers to the soft real-time requirements. Soft real-time requirements (Soft Real Time) are characterized by time limits, response times or deadlines, which sometimes are allowed not to be met and do not cause any systematic error when this happens. Thus, for example, a live video stream represents an application with soft real-time requirements, because non-adherence to a deadline, which becomes noticeable in distortion of an image, for example, has effects, but these effects are not serious.

A second category refers to the hard real-time requirements. Hard real-time requirements (Hard Real Time) are systems in which deadlines are predetermined, which are already recognized as errors if they are not met just once. A sequence or accumulation of errors can lead to critical errors or even to catastrophic system errors. In the case of hard real-time requirements, it can be necessary to ensure that the real-time requirements are met or that real-time requirements are restored again immediately by means of redundancy measures provided. An example of a system having hard real-time requirements is regulation of aircraft stability; if the time defaults are not met, particularly in interaction with other factors, critical situations and also accidents can come about.

In the case of such safety-critical systems, redundancies can be designed to be triplex or even quadruplex. In such systems, essentially all the components, in other words, for example, all the devices, all the buses, and all the bus controllers, can be present in triplicate or quadruplicate, in accordance with the degree of redundancy. The components present multiple times can furthermore be operated in parallel and synchronously. In the event of an error, in other words when the time requirements are not met, data of the systems that work in error-free manner are used immediately.

In the case of less safety-critical systems, dual redundancies are used. If an error has occurred, an alternative bus is generally used the next time, for example at the next data transmission after an error has been found. In the case of important devices, essentially everything can be present in duplicate even in the case of less safety-critical systems. In this connection, the components present in duplicate are operated either in parallel or alternatively. Furthermore, in order to increase the failure safety, alternative data sources can also be used. For example, an altitude datum can be calculated from the air pressure, read out from a GPS or derived from a radar altimeter. The command/response protocol makes it possible for the bus controller to react quickly to an error situation, in that it immediately adapts the bus list to the new situation, either by changing the bus list or by changing the addressing.

According to another aspect of the present invention, the resource management device can be set up for controlling the exchange of the different time-critical user data between the first interface and the second interface by means of managing a pointer on the first interface and/or on the second interface.

Managing a pointer can take place by way of software, for example. Data exchanged between the two interfaces no longer have to be copied, but rather merely the addresses of the data, at which data are to be made available or picked up, have to be passed on. Transport of the time-critical user data by means of the interface apparatus can proceed quickly by means of exchanging the pointers. In other words, virtual transport of the data can take place by means of the interface apparatus, because the user data themselves remain in an essentially fixed memory location. In one example, merely the frame structure around the data can be built up and/or removed while the pointer is being transported through the individual stages of the interface apparatus. Collisions of the pointers with one another must be avoided, however. A pointer to an interface can be equated with a pointer to a memory device connected with an interface or a memory region of a memory device connected with an interface.

According to yet another aspect of the present invention, the resource management device has an event evaluation device that can recognize an event at the first interface and/or an event at the second interface and can assign at least a part of a resource exclusively for exchange of different time-critical user data or pointers connected with them.

A resource can be, for example, a component of an interface apparatus, a component of a microcontroller board or a component of an avionics component. An event can be making available a signal from the host device or a signal from the divided medium, with which the host and/or the divided medium signals that data are being made available. An event can also, however, be sending of a message by way of the first interface or the second interface. If an event occurs, the event can be signaled, for example, as an interrupt on a data line provided specifically for interrupts. Such an interrupt or such an event signal can be evaluated, and if corresponding conditions are present, such as, for example, the presence of data in a memory, a resource can be individually made available for processing these data. The individual, exclusive or dedicated availability of the resource can prevent this resource from being interrupted in its processing by other events or other resources. Preventing interruption or blocking out other system interruptions can ensure rapid and collision-free processing of the data, using the assigned and allocated resource, independent of the status of the other resources. Therefore, at least for the duration of processing of a data transmission from an avionics component having multiple resources, a division into at least two separate systems can occur, which systems work essentially entirely uncoupled from one another. After the data transmission has taken place, the blocked resources can be used for other tasks, for example to support processing an avionics application once again. By means of the uncoupling of the at least two systems, which is essentially unlimited in terms of time, dedicated availability of the resources can differ from a multi-tasking solution, in which no true uncoupling might take place. By making dedicated resources available, it can be guaranteed that the resources are available within time spans that are predetermined by the hardware, to handle the event. In particular, indeterminism induced by a software component (e.g. a scheduler within an operating system) is avoided.

According to another aspect of the present invention, the resource management device can be set up for fulfilling at least one function of a command/response protocol. The function can be selected from a group of functions of a command/response protocol. This group can consist of processing a bus list, recognizing a command message, recognizing a preamble in a data packet, generating a preamble of a data packet, generating a status message (response message), generating a data message, generating a type field, and monitoring the divided medium.

The resource management device can implement the different functions of a command/response protocol, for example, using FSMs (Finite State Machines). To fulfill this function, the resource management device can be broken down into multiple subgroups or submodules, which are tailored for carrying out a specific task. Each of these submodules in turn can be implemented as a FSM or as system logic. Individual FSMs can run independent of one another and communicate merely by an exchange of signals, and can essentially influence one another merely by way of the exchange of signals. By means of such uncoupling of the submodules, a high degree of parallelity of processing can be achieved. Furthermore, by means of the interplay of multiple submodules of the resource management device, the command/response protocol, particularly a data according to the command/response protocol, can be analyzed or drawn up. In this manner, for example, commands, status messages or responses can be adapted, by means of the interface apparatus, in such a manner that transmission by way of the divided bus, by means of transmitting and receiving, is possible.

The host device and/or the avionics application might essentially have no knowledge that a command/response protocol is being utilized to ensure the time requirements.

In a distributed real-time-critical system, such as a plurality of interface apparatuses that are connected by way of the medium, the transmission protocol can be structured in such a manner that the time requirements of the most critical subscriber can be met.

The most critical subscriber or the most critical avionics component, for example temperature regulation or a navigation system, can be the avionics component that sets the highest real-time-critical requirement for ensuring regulation circuit stability. A real-time-critical requirement can be, for example, the period duration of a time cycle during which this real-time-critical subscriber must act, in other words, for example, must deliver or receive data. In this connection, for example, the temperature regulation of the cabin can have lower requirements than the networked systems of the Flight Control System. Not all the subscribers might necessarily be real-time-critical or have the same criticality. However, in the command/response protocol, all the data of the subscribers can be handled essentially in accordance with their time requirements, independent of the actual real-time requirements of the subscriber. When and how often the data of individual subscribers are transmitted can be configured for differentiating the time requirements, using the bus list, for example using the call-up frequency. The bus list also ensures, for differentiating the time requirements, that a non-critical device is not requested to send its data as often or does not receive new data as often, and thereby does not keep the bus busy for an unnecessarily long time. Also, by means of the possibility of modifying the bus list, it can be ensured that a defective device is no longer addressed and instead, data of redundant systems can be queried in this time window.

In other words, this can mean that a host device or an avionics application requests the time requirement for making available or receiving the time-critical user data. Because of the different processing times, for example on the order of ns for the pass-through time in the interface device and for the signal processing in the host device, as compared with µs for the response time on the medium, however, adherence to the real-time requirements by the host device can essentially be ensured. For this reason, in one case the interface apparatus can be set up in such a manner as to adhere to the time requirements, for example by means of retention of prematurely available messages, until the point in time when they are actually requested by the bus controller as it processes the bus list. In this manner, what is called a "Babbling Idiot", which can occur, causing interference, on the Ethernet, can be avoidable, in other words a device that sends its data far too often or even without interruption, because of a defect or an incorrect configuration, and thereby disrupts the entire bus sequence. The command/response protocol can specifically ensure that a potential "Babbling Idiot" subscriber or a Bubbling Idiot subscriber does not send its data without a request from the bus controller.

In another case, too, however, a situation can be recognized, in which the data transmission does not take place at the right time because of interference or unforeseeable delays beyond a maximal time default, and if necessary, it is possible to react with the corresponding initiation of redundancy measures even before a critical situation comes about.

Processing of the data in the different host devices can also take place essentially independent or asynchronous from one another. It can actually happen that processing and making the data available in the host device takes place so prematurely that uncontrolled sending by way of the medium could disrupt the real-time requirements of the overall system. The host side can work faster than the medium side in one example. The interface apparatus can adapt the different processing times of the host side and the media side in such a manner that the data made available and/or requested by the host device can be inserted into the transmission scheme of the overall system and data transmission does not take place arbitrarily. The different processing times on the host side and the media side can be the result, in one example, of different clock pulses with which the two sides are operated. The interface apparatus can therefore be set up in such a manner that it undertakes not only format adaptation to the transmission protocol, for example to the command/response protocol, but also clock pulse adaptation, and, if necessary, holds back data made available prematurely. Thereby the interface apparatus can also concern itself with synchronization of the applications operated on a medium.

According to another aspect of the present invention, the interface apparatus can have a switch-over device, wherein the switch-over device is set up for adjusting the resource management device in such a manner that it can process at least one component of a command/response protocol. In this connection, the component can be selected from the group of possible components or from the group of possible roles of a command/response protocol, wherein the group consists of a bus controller (BC), a remote terminal (RT), and a bus monitor (MON).

By means of the switch-over device, an interface apparatus, a software or a FPGA can thereby be created, which can be adjusted in accordance with the planned use, in each instance, and can also fulfill a specific function. It is also possible that desired combinations of the components of a command/response protocol are implemented on a single interface apparatus. Furthermore, simulation of a complete avionics network with a single interface apparatus can be possible. For example, it can be possible to simulate a plurality of remote terminals by means of a single interface apparatus, which terminals can also exchange data with one another and, in addition, can also have the bus controller and/or the bus monitor. It can be determined by the BC what units or RTs exchange data at what point in time.

According to yet another aspect of the present invention, the resource management device is set up for implementing at least one command/response protocol selected from the protocol family MILBUS protocol, MIL-STD-1553B, EFA-BUS (European Fighter Aircraft Bus), and EFEx (EFABUS Express).

According to yet another aspect of the present invention, the first interface and the second interface work independent of one another.

In other words, the first and the second interface work asynchronously. Consequently, no direct coordination between the first and the second interface is required, so that the first interface cannot meet real-time-critical requirements, while the second interface does meet real-time-critical requirements or vice versa.

According to a further aspect of the invention, an aircraft having a network is described, which has an avionics component and/or an interface apparatus according to the present invention.

According to a further aspect of the invention, a data structure for data transmission is indicated, which structure has bits organized in accordance with value, wherein the three bits having the lowest value allow differentiation of the type of data to be transmitted using the data structure, wherein it is possible to differentiate at least a command, a user datum, and status information.

The recognition of different data types, for example of commands, data or status, can take place using a preamble. In one example, the length and the meaning of the bits that are arranged after the first three bits having the lowest value can correspond to the bits having the equivalent value of a data format for a command, a user datum, and status information of a command/response protocol. For example, a preamble, a type identifier or a command/response header having the bit values 001, 010 or 100 can be used for differentiating a command, data, or a status word. By means of the use of the preamble, recognition of the type takes place by means of the use of regular data bits, and identification of the type by means of inherent physical states or voltage levels can be avoided. For this reason, use of a preamble, for the recognition of which essentially no special levels or states need to be evaluated, can allow the use of Ethernet COTS components that do not create such states and often can transmit them easily, without interference. COTS components essentially make a simple and robust infrastructure available.

It can be an aspect of the invention that data can be exchanged by means of the resource management device, in a predetermined and deterministic manner, between the first interface and the second interface. For this exchange, the resource management device can take on control of the temporary memory device. The selected method of control can predetermine a flow direction for the data and a time schedule for distribution of the data. The resource management device, in combination with the temporary memory device, can form a skillfully arranged pipeline system that connects the two interfaces with one another. The resource management device and the temporary memory device can both have multiple subsystems. During exchange of the data between the interfaces, the user data can be adapted to the requirements of the respective target interface. For example, the user data can be provided with frame data for forming a data packet, for adaptation to the target interface, can be freed of these frame data or also adapted to different time behaviors or memory widths.

The subsystems are connected by way of interfaces that form the boundaries between the subsystems. The boundaries of the subsystems, the memory sizes, and the intermeshing of the individual memory devices can be selected in such a manner, in this connection, that essentially no collisions of the user data can come about. Furthermore, attention can be paid to ensure that resources assigned in fixed manner organize the transport of the user data, which cannot be interrupted by other events. To avoid collisions, critical locations in the propagation paths of the user data can be tracked down. Critical locations can be locations that can lead to bottlenecks in data transmission. Such bottlenecks, which often occur if a resource is used jointly, can lead to collisions. By means of providing intermediate buffers and/or a corresponding time behavior, such critical locations can be deactivated.

In the present text, measures are described that guarantee temporally deterministic reception and transmission of data or messages. In particular, temporally deterministic reception and transmission of data can be ensured by means of the interaction of measures, such as the deterministic structure of the interface apparatus, synchronization of the interface apparatuses with the media clock pulse, by means of setting a schedule and/or by retaining messages until a request for sending them is sent by the command/response protocol controlled by the bus controller as the central control computer.

The BC can ensure synchronization with its schedule. In order to adhere to the schedule, the subscribers retain their data until they are requested to send the data, by means of a command.

By means of the interaction of a selection of the different measures, real-time conditions can be adhered to. In this way, it is ensured that no collisions take place, but also that every subscriber transmits its data sufficiently often.

The interface apparatus according to the invention can be set up in such a manner that essentially precisely the point in time is predetermined when a communiqué, a message or a datum is transmitted. In this connection, the interface apparatus can be built up in such a manner that the time point at which the message is transmitted or internally passed on from one submodule to another submodule is essentially not influenced by events that lie outside of the interface apparatus and are not predictable. The structure of the interface apparatus can be selected as an essentially self-sufficient system. Therefore it can be possible to already predetermine the time schedule, the scheduling or the timing of the individual messages during the development of the bus list. Precise time behavior of the system-internal sequences can be made possible by freeing them of external influences.

Those sequences that proceed locally, within the interface apparatus, for example within the FPGA or within a hardware module that implements the interface apparatus, can be referred to as system-internal processes. Freeing them of external influences and predetermining the system-internal sequences, in fixed manner, particularly the temporal sequences, can make the behavior of the interface apparatus predictable. In other words, the transmission of a message from one interface of the interface apparatus to the other can take place within essentially the same time. This time behavior can be achieved both under laboratory conditions and in active operation, because external influences are essentially blocked out or not permitted during active operation. By means of the predictability of the message pass-through achieved by way of blocking, a determinism can be produced that determines the real-time behavior of an overall system, and, in particular, of an interface apparatus. In this connection, ensuring the determinism when the time-critical user data pass through the interface apparatus can be an aspect that contributes to the determinism of the overall system. Aside from the deterministic pass-through of the user data, it can also be necessary to ensure that essentially no collisions occur on the medium itself. If a deviation from the deterministic parameters is noted, this deviation can be an indication of a failure of a component and not of the presence of a delay that has merely not been planned for. This failure can then be corrected essentially only by accessing redundantly present components.

The determinism of an individual interface apparatus can be utilized if a deterministic overall system is supposed to be created. In order to also produce determinism of the overall system, at least two or a plurality of individual interface apparatuses can be synchronized with one another on a medium. In this overall system, the individual interface apparatuses or the components coupled to the interface apparatuses can be referred to as subscribers. The determinism of the overall system can consequently be achieved by means of synchronization of the individual subscribers using the command/response protocol on the medium. The medium itself, on which the plurality of deterministic subscribers is operated, does not have to be deterministic. A collision-based medium, for example, can also be used. By means of synchronizing the subscribers with the medium, a synchronous overall system can be created. By means of predetermining the media allocation of at least one of the subscribers, which is configured as a central BC, the non-deterministic medium can also be converted to a deterministic medium. Unforeseeable events can therefore essentially be prevented.

By means of a deterministic overall system set up in this way, a system developer who is planning the interaction of individual subscribers or avionics components can be given a tool for essentially precisely predetermining the transmission time points of individual messages. Consequently, a cycle can be planned, in which it is established, for example, at what point in time GPS data or radar data that have been determined are transmitted to a central avionics PC, without the data interfering with one another during transmission, although a simple and cost-advantageous medium such as Ethernet is used. For the individual messages, however, the entire bandwidth of the medium can be used because of the exclusive bandwidth allocation.

Thus, components having a complex structure can be avoided, such as those used in Traffic Shaping approaches, similar to AFDX. The low complexity can have a positive effect on reliability and maintainability. In Traffic Shaping approaches, the bandwidth at which a subscriber puts stress on the medium can be limited, and it might be necessary to assign priority for transmission to the individual messages, in order to guarantee that all communiqués, messages or information can be transmitted within the predetermined time limits, and that high-priority messages experience little delay. However, because here only the likelihood is increased, but complete predictability is not ensured, unforeseeable events can still occur.

However, the invention might not leave the decision as to when a message is actually transmitted to each individual scheduling mechanism up to the individually distributed subscribers. Because of the deterministic structure of the individual subscribers and by means of the synchronization of the individual subscribers on the medium, it can be avoided that individual subscribers act independent of one another and thereby cause external influences on themselves or other subscribers, for example in the form of interrupts or collisions. Access to the medium can take place in accordance with an access plan that can be predetermined, from a central device, for all the subscribers, for example from a BC.

Establishing the media access and processing the messages in the individual interface apparatuses can lead to deterministic behavior of the overall system even in the case of a non-deterministic medium. Use of the interface device according to the invention can therefore tolerate the use of non-deterministic components. The existing bandwidth of the medium can be exclusively allocated to each subscriber, without the bandwidth having to be reserved and lying idle when no data are exchanged over the reserved bandwidth.

The determinism can ensure the real-time capability of the overall systems. A system can be referred to as a real-time-capable system or real-time system if a maximal reaction time or a response time can be predetermined in fixed manner and this reaction time, predetermined in fixed manner, is not influenced by external influences during regular operation. The absolute value of the reaction time can depend on the system for which real-time capability is supposed to be produced, and can differ, for example, for a radar system and a GPS system. The reaction time can be the time span measured from sending of a message by a first subscriber all the way to reception of the message at a second subscriber or the time span from sending of a query to receipt of a response to the query.

The reaction time can have at least one time span selected from the group of the running time of a message on the medium, the processing time within the interface apparatus, the pass-through time of a message through the interface apparatus, the pass-through times of a message from one of the two interfaces to the BC, and the pass-through time of a message from one of the two interfaces to the RT.

A real-time-capable system can presuppose a deterministic structure of the system and, in particular, of the system components. Determinism can also be understood to mean deactivating or blocking out unforeseen events, which, if they occur, could change a precalculated time behavior. Real-time behavior of a system can be achieved if the time behavior of the system is essentially always the same or a maximal value for the variation of the time duration of individual processing steps has been predetermined.

To represent the demands on real-time behavior, in one example an avionics component can be configured as a central unit of a Flight Control System. The Flight Control System controls or regulates avionics components that are important for the flight behavior of the aircraft and thereby have high default values for the time behavior. The Flight Control System regularly calculates the control defaults or regulation defaults for controlling or regulating the avionics components. This calculation and distribution of the regulation defaults must take place in real time. To achieve real-time behavior, it can be necessary, for example, to recalculate a regulation default for the avionics system or avionics subsystems connected with the central unit, at least once, in the central unit of the Flight Control System, within the time during which an aircraft flies a distance corresponding to the length of the aircraft, and to distribute this value to the systems or subsystems. During this time period, therefore, essentially all the running times and processing times must elapse, and no unforeseeable events should delay this time duration. The example shows that the Flight Control System is a system with high real-time requirements. In other avionics systems, for example the air conditioning control, less critical requirements can apply, on the one hand with regard to the running time, and on the other hand with regard to the occurrence of problems. However, maximal values can be predetermined for the influence of problems, which values are then not exceeded because of the determinism.

It should be noted that different aspects of the invention were described with reference to different objects. In particular, some aspects were described with reference to apparatus claims, whereas other aspects were described with reference to method claims. However, a person skilled in the art can derive from the above description and the following description that, unless described differently, not only every combination of characteristics that belongs to a category of objects but also every combination of characteristics that relates to different categories of objects is viewed as having been disclosed by this text. In particular, combinations of characteristics of apparatus claims and characteristics of method claims are supposed to have been disclosed.

BRIEF DESCRIPTION OF THE DRAWINGS

In the following, exemplary embodiments of the invention will be discussed in greater detail, using the attached drawings. These show:

FIG. 1 is a block schematic of an avionics network according to an exemplary embodiment example of the present invention.

FIG. 2 is a block schematic of an interface apparatus, which can be configured as a bus controller and/or as a remote terminal, according to an exemplary embodiment of the present invention.

Figure 3:
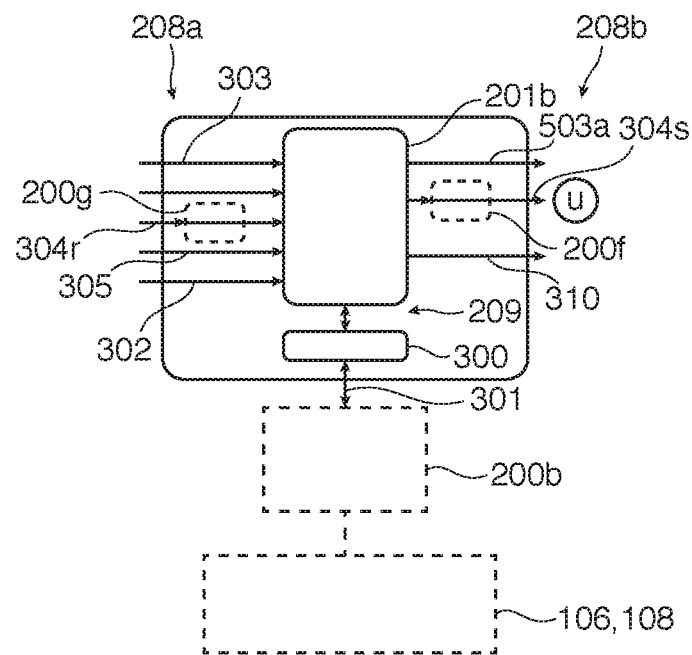

FIG. is 3 a detailed block diagram of a submodule for a remote terminal according to an exemplary embodiment example of the present invention.

FIG. is 4 a detailed block diagram of a bus controller submodule according to an exemplary embodiment example of the present invention.

FIG. shows 5 the transmission part of a serial/parallel converter as a detailed block schematic according to an exemplary embodiment example of the present invention.

FIG. is 6 a detailed block diagram of a transmission buffer according to an exemplary embodiment example of the present invention.

FIG. is 7 a magnified block diagram of a transmission/reception buffer according to an exemplary embodiment example of the present invention.

FIG. is 8 a block diagram of a memory access control device according to an exemplary embodiment example of the present invention.

FIG. is 9 a block diagram of a protocol processing device having a loop-back buffer, according to an exemplary embodiment example of the present invention.

FIG. is 10 a block diagram of an interface apparatus having an event evaluation device, according to an exemplary embodiment example of the present invention.

FIG. shows 11 the structure of three message types of a command/response protocol, according to an exemplary embodiment example of the present invention.

FIG. is 12 a flow diagram for a method for exchange of user data, according to an exemplary embodiment example of the present invention.

DETAILED DESCRIPTION OF EXEMPLARY EMBODIMENTS

The representations in the figures are schematic and not to scale. In the following description of FIG. 1 to FIG. 12, the same reference numbers are used for the same or corresponding elements.

FIG. 1 shows a block schematic of an avionics network 100 according to an exemplary embodiment example of the present invention. The avionics network 100 has the avionics components 101, 120a, 120b, 120c, 120d, 120e, 120f, which are disposed along the divided medium 102. The avionics components 101, 120a, 120b, 120c, 120d, 120e, 120f can also be referred to as subscribers 101, 120a, 120b, 120c, 120d, 120e, and 120f. The avionics network 100 is a heterogeneous network structure, which has at least two differently configured interface apparatuses, the bus controller (BC) 103 and the remote terminal (RT) 120a, 120b, 120c, 120d, 120e, 120f. A further type of network components can be used, a bus monitor, which is not, however, shown in FIG. 1. The designations of the different types BC, RT or bus monitor are determined according to a corresponding functionality, which the respective network component assumes in the command/response protocol.

The avionics component 101 at the left end of the jointly utilized medium 102 or of the divided medium 102, particularly of the aircraft bus 102, has the interface apparatus 103 having the first interface 104 and the second interface 105. Optionally, the avionics component 101 can have a hosting device 106, which is responsible, among other things, for carrying out an avionics application. In the central avionics component 101 at the head of the bus 102, the interface apparatus 103 is configured as the BC 103 or conductor 103. This central avionics component 101 can either be used solely for controlling the bus 102 and/or the other avionics components 120a, 120b, 120c, 120d, 120e, and 120f, or, in contrast, can also simultaneously carry out an avionics application, for example as a central unit of a Flight Control System. Such an avionics application is indicated by means of the host device 106. Avionics software that implements the avionics function of the avionics component runs on the host device 106. This central avionics application or the central avionics function that relies on an interface apparatus 103 for transmission of the generated data or data to be received can be a central evaluation function for data that are made available by other avionics components 120a, 120b, 120c, 120d, 120e, and 120f. In order to get at the data, an exchange takes place between the central avionics component 101 and the corresponding other avionics component. For this data exchange with the other components 120a, 120b, 120c, 120d, 120e, 120f, the avionics component 101 makes use of the interface apparatus 103, which guarantees data exchange between the first interface 104 and the second interface 105, and also organizes transmission by way of the medium 102.

The additional avionics components 120a, 120b, 120c, 120d, 120e, 120f also have interface apparatuses 107a, 107b, 107c, 107d, 107e, 107f, which are configured as a RT. These interface apparatuses 107a, 107b, 107c, 107d, 107e, 107f, configured as a RT, connect the common divided medium 102, the aircraft bus 102 with the host devices 108a, 108b, 108c, 108d, 108e, 108f. In order to be able to exchange data, at least two interface apparatuses configured as a RT and related avionics components are needed, and, in addition, an interface apparatus 103 configured as a BC. A BC itself cannot exchange any user data. However, a single interface apparatus can be configured both as a BC and with a coupled RT.

In one example, the BC itself can transmit or receive data. In another example, the BC essentially transmits only commands, and the RT integrated into the BC exchanges the user data. In this example, BC and RT access a common physical medium. For user data exchange, in this example, the RT coupled with the BC is activated. The interface apparatus and the host device can be accommodated on a common system board.

The host devices 106, 108a, 108b, 108c, 108d, 108e, 108f are adapted for carrying out avionics applications and make data available, which the avionics applications generate or need, by way of the first interfaces 109a, 109b, 109c, 109d, 109e, 109f, to the interface apparatuses 107a, 107b, 107c, 107d, 107e, 107f. The first interfaces 109a, 109b, 109c, 109d, 109e, 109f also serve for making received data available to the host devices 108a, 108b, 108c, 108d, 108e, 108f and thereby to the avionics applications. Consequently, the first interfaces 109a, 109b, 109c, 109d, 109e, 109f as well as the first interface 104 work bidirectionally. Likewise, the second interfaces 110a, 110b, 110c, 110d, 110e, 110f are structured as bidirectional interfaces and serve for communication with the medium 102. The first interfaces 109a, 109b, 109c, 109d, 109e, 109f and the second interfaces 110a, 110b, 110c, 110d, 110e, 110f are external interfaces, which lead into the outer region of the interface apparatus.

Because the data exchange takes place bidirectionally, by way of the interface apparatuses 107a, 107b, 107c, 107d, 107e, 107f, the description of the procedures that take place in the one direction essentially apply in the other direction, in the opposite order.

In order to adhere to real-time conditions, which are supposed to prevail, for example, for the exchange of data between the RT host device 108c and the RT host device 108f, attention must be paid in the dimensioning of the network 100 and particularly in the selection of the maximal line length of the medium 102, that all the running times and latency times that occur during a transmission between the host devices 108c, 108f represent a deterministic measure and are not influenced by unforeseen events. As a measure for ensuring that a network works in deterministic manner, attention can be paid, during planning, to ensure that a predetermined maximal value for a signal running time is not exceeded. If the default values are adhered to, the real-time capability of a command/response protocol can also be essentially ensured. This requirement holds true for exchange not only of user data but also commands and status messages. In a MILBUS system 102, for example, the time, measured from the end of a command in the BC host device 106 to the RT host device 108c or to the interface apparatus 107c, until its arrival in the host device 106 or in the interface apparatus 103, must lie in the range of 4 to 12 μs. Similar values are achieved with an Ethernet bus 102 as the physical medium. However, with this the magnitude of the time period that is provided for the response times at the medium 102, is still greater than the processing time or the pass-through time in an interface apparatus 103, 107a, 107b, 107c, 107d, 107e, 107f and/or in a host device 108a, 108b, 108c, 108d, 108e, 108f, which lies in the range of ns.

In the dimensioning of the bus 102, particular attention must be paid to ensure that determinism, in other words predictability of the running times, is not equated with the processing speed within the interface apparatuses 103, 107a, 107b, 107c, 107d, 107e, 107f. In the sense of this application, determinism should be understood to mean that an exchange procedure of user data or a user data flow is prevented from being interrupted in unforeseen manner and thereby delayed. Determinism is not supposed to mean primarily that the processing speed is increased, but rather that a predetermined processing speed or a predetermined timing is adhered to. A possible cause for interruptions in a data exchange can be collisions, which can occur during simultaneous access to the divided medium 102. If an infrastructure together with its network controllers is used as a divided medium 102, which infrastructure is designed according to the IEEE 802.3 (Ethernet standard), then additional measures must be provided in order to prevent collisions. It is true that with Ethernet, there is collision recognition and collision resolution, but no collision avoidance.

By means of additional securing of the transmission by means of a command/response protocol, collisions can be avoided in that bus allocation is regulated by means of a central transmission schedule or a central schedule, which is stored in the BC 103. In other words, the additionally introduced BC 103 ensures, by means of a predetermined schedule or timetable, that in each instance, only precisely one avionics component 101, 120a, 120b, 120c, 120d, 120e, 120f is requested, by means of a command, to transmit data to the medium, in other words to send a response. As a result, it is essentially prevented that collisions of the exchanged different time-critical user data on the divided medium 102 can occur. This holds true analogously also for bidirectional exchange of the different time-critical user data between the first interface 104, 109a, 109b, 109c, 109d, 109e, 109f and the second interface 105, 110a, 110b, 110c, 110d, 110e, 110f.

An interface apparatus 103, 107a, 107b, 107c, 107d, 107e, 107f that is configured in such a manner that it assumes a specific role of a command/response protocol will be referred to by this role, for the sake of simplicity. For example, an interface apparatus 103 that is configured as a BC can be referred to as a BC. An interface apparatus 107a, 107b, 107c, 107d, 107e, 107f that is configured as a RT can also be referred to as a RT. The same shall also apply for a bus monitor. Accordingly, the avionics components 101, 120a, 120b, 120c, 120d, 120e, 120f can also be abbreviated. Corresponding mixed forms are also possible in the case of mixed configurations.

The central timetable of the BC 103 is also referred to as a bus list or schedule. The bus list is generally processed sequentially and cyclically, but if necessary, can also be changed according to predetermined criteria, in order to address redundant devices, for example in the case of an error. These predetermined criteria can be contained in the bus controller or determined on the basis of algorithms.

Three types of messages are provided in the bus list. The first type relates to command messages (Command Message), which are essentially allowed to be transmitted exclusively by an interface apparatus set up as a bus controller 103. The flow direction of a command message is therefore always from a BC to a RT 120a, 120b, 120c, 120d, 120e, 120f.

The second type of messages relates to data messages (Data Messages), which contain the actual user data. Data exchange between two RTs can only take place after a transmission connection between two avionics components has been established by means of a command message. For transmission, a source avionics component makes a data packet available, which contains the user data, and addresses it to a target avionics component 103, 120a, 120b, 120c, 120d, 120e, 120f. The user data are generally exchanged between the host devices, which are connected with the interface apparatuses, configured as RT.

For feedback regarding the success or lack of success of a message exchange, what are called status messages (Status Message) are provided, with which the remote terminals 120a, 120b, 120c, 120d, 120e, 120f can inform the BC 101 about the status of a message transmission. In this connection, the BC 101 automatically interprets the absence of a status message as lack of success of the message exchange.

For the sake of simplicity, in the following only one BC 101 component and one RT component 120, 120a, 120b, 120c, 120d, 120e, 120f will be considered, wherein the components of the respective avionics component will be referred to by leaving out the letters a, b, c, d, e, f, but without restricting the validity of generalization for the great number of avionics components. Thus, a RT avionics component 120 has the host device 108 and the interface apparatus 107. A BC avionics component 101 has the host device 106 and the interface apparatus 103.

FIG. 2 shows a block schematic of an interface apparatus 103, 107, which can be configured as a bus controller BC and/or as a remote terminal RT, according to an exemplary embodiment example of the present invention. For setting the type of the interface apparatus as a BC, RT or as mixed operation of BC and a plurality of RT, a setting device or switch-over device, a configuration register or a change-over switch can be provided in the interface apparatus 103, 107. The change-over switch or the configuration register can also be activated by way of the holding apparatus in the aircraft, with which an interface apparatus is installed, so that during installation of a device in the aircraft, switching of the type takes place automatically. This switch-over device is implemented by means of the register 200d. The register 200d is a memory region to which the host system can write static configuration.

The block diagram of the interface apparatus 103, 107 shows the division of the interface apparatus into subunits or subsystems. In the division into subsystems, it was taken into consideration that this division, and particularly the interfaces between the subsystems, agrees/agree with hardware interfaces that are predetermined by a FPGA hardware synthesis and hardware architecture. It can be derived from FIG. 2 that in the division of the interface apparatus 103, 107 into subsystems 200, 200a, 200b, 200c, 200d, 201, 201a, 201b, 201c, 201d, 201e, 201f, 201g, 201h, attention was paid to ensure that as many subsystems 200, 200a, 200b, 200c, 200d 201, 201a, 201b, 201c, 201d, 201e, 201f, 201g, 201h as possible can be created autonomously or semi-autonomously (BSP Memory Buffers, 200). Such predetermined or autonomous subsystems 200, 200a, 200b, 200c, 200d, 201, 201a, 201b, 201c, 201d, 201e, 201f, 201g, 201h also define their interfaces 209, 208, 211, 207 for the adjacent subsystems 200, 200a, 200b, 200c, 200d, 201, 201a, 201b, 201c, 201d, 201e, 201f, 201g, 201h. The adjacent subsystems are therefore created to be non-autonomous. The adjacent non-autonomous systems were mostly designed, in terms of their scope, in such a manner that they can be tested independently and in isolated manner, each on its own. Some of these systems contain a state machine. In this connection, each subsystem contains maximally one state machine.

In the division into subsystems 200a, 200, 200b, 200c, 200d, 200e, 201, 201a, 201b, 201c, 201d, 201e, 201f, 201g, 201h, just as in each individual design of a subsystem, it has been taken into consideration that the respective real-time requirements of the subsystems have been included. The real-time requirements can be taken into consideration if the maximal clock pulse count and thereby the maximal latency of a subsystem such as a temporary memory device 200, 200a, 200b, 200c, 200d, 201e, 201f, 201g, 201h is known. Real-time requirements can also be taken into consideration, however, if it is known that a system always has essentially the same behavior and if the required number of clock pulses that elapse until a message has been processed within the interface apparatus 103, 107 is determined by means of concrete measurements, in order to determine the time behavior of the subsystem. Thus, for example, the time behavior of the resource management device 201, 201a, 201b, 201c, 201d, 201e, 201f, 201g, 201h, which is also referred to as a control logic 201, 201a, 201b, 201c, 201d, 201e, 201f, 201g, 201h, can be determined by means of measurements. For example, the subsystems are dimensioned in such a manner that a maximal running time predetermined per subsystem is essentially not exceeded. In the design, functional homogeneity was also taken into consideration, wherein functions and system tasks that are combined in a common task are supposed to represent a common functionality. Functional homogeneity in the distinction and division of the subsystems means that a subsystem uses only a single FPGA switching structure, if at all possible. A FPGA has a plurality of different structures of resources, which can be instantiated with different effectiveness for different applications or paradigms. An example is FPGA structures that can be used as mass memories, for example block RAMs. Such a structure of the FPGAs is often used exclusively only for use as a mass memory. A plurality of the same structures, e.g. logic structures or memory structures, are disposed closely next to one another geometrically in a FPGA. The subsystems in FIG. 2 are defined on a much higher abstraction plane than the physical structures. If attention is paid to functional homogeneity in this definition, then the synthesized boundaries of these subsystems run along the geometrical boundaries of the same FPGA resources. A common functionality leads to common implementation paradigms, for example of FSMs or memory look-up tables. In this connection, the functionality of the different subsystems is distributed to different units (Entities) and modularized, in the design, in order to avoid a monolithic hardware block. This modularization can facilitate re-usability of individual modules and lead to good synthesis results.

The submodules or subsystems 200a, 200, 200b, 200c, 200d, 200e, 201, 201a, 201b, 201c, 201d, 201e, 201f, 201g, 201h are projected onto the components of the FPGAs in such a manner that boundaries of the subsystems coincide with interfaces actually present in the FPGA 103, 107, such as a bus or a native FIFO interface. This projection ultimately maximizes the efficiency of the use of FPGA resources. By means of such a projection, advantage can be taken of the fact that these predetermined interfaces are high-performance interfaces. Furthermore, these interfaces generally lie between different FPGA structures, and their direct use promotes functional homogeneity.

FIG. 2 shows four main subsystems, namely the reception and transmission buffer 200a or transmission and reception buffer 200a, the serial/parallel converter 201a, the parallel/serial converter 201a, the transmission/reception UART (Universal Asynchronous Receiver Transmitter) 201a or the transmission/reception converter 201a, the resource management device 201 or the control logic 201, and the temporary memory device 200 or the buffer 200.

By means of asynchronous operation of the buffer 200a1, it is possible to balance out a clock pulse difference between a transmission clock pulse domain 700a and the system clock pulse domain 701. By means of the asynchronous operation of the buffer 200a2, it is possible to balance out a clock pulse difference between a reception clock pulse domain 700b and the system clock pulse domain 701. Three clock pulses meet in the module 200a, the clock pulse of the transmission clock pulse domain, the clock pulse of the reception clock pulse domain, and the clock pulse of the system clock pulse domain. The transmission and reception clock pulse domain are predetermined by the MII. However, it cannot be guaranteed, without the clock pulse rate adaptation, that the clock pulses are the same or synchronous. For this reason, there is a distinction between transmission clock pulse and reception clock pulse. The transmission clock pulse domain 700a or the transmission clock pulse region 700a is situated in the region of the second interface 105, 110, particularly on the side of the media-independent interface 202, for example a GMII interface, and the physical medium 102 connected with it. Likewise, the reception clock pulse domain 700b or the reception region 700b is situated in the region of the second interface 105, 110. The system clock pulse domain 701 works with a first clock pulse. The transmission clock pulse domain 700a works with a second clock pulse. The reception clock pulse domain 700b works with a third clock pulse. The second clock pulse and the third clock pulse can be the same, in one example. In particular, the Medium Attachment Unit 204 (MAU) is situated in the transmission clock pulse domain 700a and in the reception clock pulse domain 700b. In other words, the transmission clock pulse region 700a or the transmission clock pulse domain 700a is situated in the vicinity of the interfaces 205 or the ports 205a, 205b of the transmission and reception buffer 200a, which faces the transmission medium 102, while the system clock pulse domain 701 is situated in the vicinity of the interface 206, which faces the control logic 201. Both the reception clock pulse and the transmission clock pulse are generated by the physical layer (Phy) and passed on to the transmission clock pulse domain 700a or to the reception clock pulse domain 700b by the MAU 204, by way of separate connections. Furthermore, the register 203 is divided into two different registers, the transmission register 203a and the reception register 203b.

In the direction toward the first interface 104, 109, starting from the interface 207, which connects the transmission and reception buffer 200a with the transmission and reception converter 201a or serial/parallel converter 201a, the components situated there already lie on the side of the system clock pulse 701 or in the system clock pulse domain 701, which is operated with the first clock pulse. The interface 206 also knows only the system clock pulse. The boundary of the clock pulses is 200a1 and 200a2. The logic modules 201b, 201c, 201d, 201e, 201f, 201g, 201h, which are situated on the system clock pulse side and are operated with the system clock pulse domain 701, are referred to as the control logic. The serial/parallel converter 201a is not assigned to the control logic.

In total, the interface apparatus is operated with four clock pulses, which are divided into four clock pulse domains: transmission clock pulse domain 700a, reception clock pulse domain 700b, system clock pulse domain 701, and host clock pulse domain 702. This results in the following allocation: the first clock pulse corresponds to the system clock pulse 701, the second clock pulse corresponds to the transmission clock pulse 700a, the third clock pulse corresponds to the reception clock pulse 700b, and the fourth clock pulse corresponds to the host clock pulse 702. For the system, the system clock pulse 701 can be the "most important clock pulse" or the decisive clock pulse. This means that the components and components groups 200, 201, 201a, and 200a are operated with this clock pulse. All the data that come from outside of the interface apparatus and are operated outside of it with a different clock pulse are immediately transferred into the system clock pulse 701, for example by means of the buffers 200a1 and 200a2, which work asynchronously. The system clock pulse domain 701 is connected with the other three clock pulse domains. The host clock pulse domain 702 is essentially completely separated from the transmission clock pulse domain 700a and reception clock pulse domain 700b.

Figure 9:
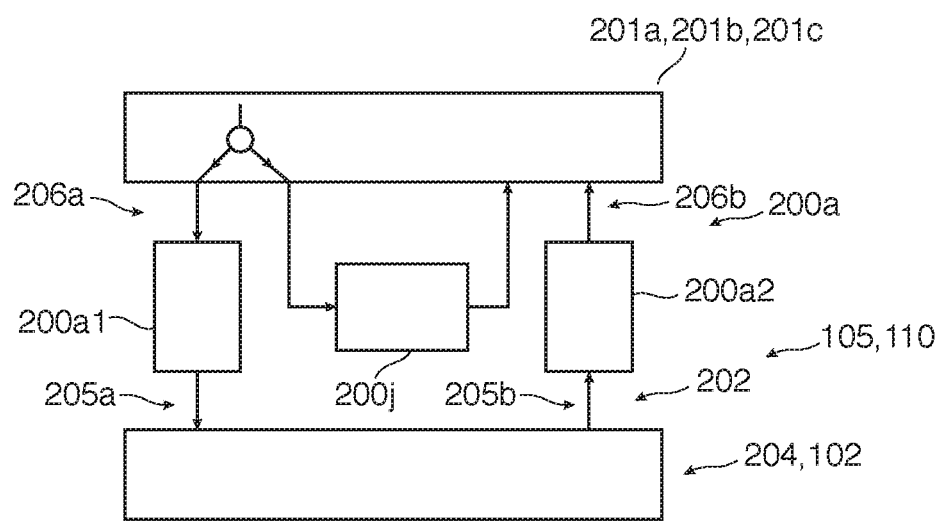

The loop-back buffer, which is discussed in greater detail in FIG. 9 and which is not shown in FIG. 1, connects transmission clock pulse domain 700a and reception clock pulse domain 700b. The boundaries between different clock pulse domains are always formed by buffers 200a1, 200a2, 200. The transmission buffer 200a1 forms the boundary between the transmission clock pulse domain 700a and the system clock pulse domain 701, the reception buffer 200a2 forms the boundary between the reception clock pulse domain 700b and the system clock pulse domain 701. The temporary memory device 200, which can also be referred to as a buffer, forms the boundary between the host clock pulse domain 702, with which the host device 106, 108 works, and the system clock pulse domain 701. Because of the selection of the structural location of the temporary memory device 200, 200b, 200c, 200d, the temporary memory device can also involve a local boundary and not just a logical boundary. Consequently, the transmission and reception buffer 200a represents the interface or boundary between the two different clock pulses of the first interface 104, 109 and the second interface 105, 110.

The data are exchanged by way of the media-independent interface 202, for example a GMII interface 202 or a MII interface 202, between the medium 102 and the transmission and reception buffer 200a or reception and transmission buffer 200a, in the size of individual bytes. The data bus 105, 110 has a width of 8 bits. However, according to the GMII specification or the MII specification, not all the data lines have to be used. If fewer data lines and therefore fewer bits are used, the clock pulse adaptation to the physical layer in the Ethernet is easier. If, for example, a Marvell® Phy is used, in other words a commercially available integrated circuit from the Marvell® company, which implements the functionality of the physical layer (Phy), only 4 data lines or 4 bits are active at 100 Mbit/s. How many data lines are active can be read out by a configuration register of the MII. This is a static register. In order to be able to distinguish between 4-bit operation and 8-bit operation, a buffer is used, which adapts the output word width to the setting in the configuration register.

However, in order to be able to evaluate a transmitted message (Message), a communiqué, a transmitted packet or a transmitted telegram received by way of the interface 205, 105, 110 and process it further, the data present in serial form at the interface 205 or at the second interface 105, 110, including the user data, are written into a broad buffer 200a2, the width of which is dimensioned in such a manner that it can accommodate the entire message, in its full length, without being able to analyze it. The interface 205 can essentially permit two opposite data streams 205a, 205b for the transmission direction and for the reception direction. For this purpose, the interface 205 can essentially have two lines and/or two ports. The buffer 200a1, 200a2 is larger than an Ethernet packet. This means it can essentially accommodate an Ethernet packet and a number of additional data, not specified in any detail, in order to have some room or tolerance for future expansions. The entire message lies in the buffer 200a2.

While a register stores states over an extended period of time, a buffer can temporarily store data for a short time. For this reason, a buffer can have a higher write speed and read speed than a register. In other words, the entire message is not written bit by bit into a shift register, but rather the message is read out from the reception buffer 200a2 at the first clock pulse, in 8-bit words, and processed by the control logic 201 in 8-bit words. For processing after the reception buffer 200a2, attention essentially can be paid to the fact that the dimension of the output of the reception buffer 200a2, which has a width of 8 bits, matches the internal registers of the control logic well, which also work at a width of 8 bits, for example. For this reason, no adaptation is required any longer at the interface between the buffers 200a1, 200a2 and the control logic. The asynchronous buffer 200a2 is a desirable clock pulse boundary.

The resource management device 201, the control logic 201 or the Control Logic 201 is set up in such a manner that it implements the functionality of a command/response protocol. For this purpose, the resource management device 201 is configured as a Finite State Machine (FSM) having various submodules 201b, 201c, 201a, 201d. In particular, the submodule that implements the functionality of a RT 201b or the submodule that implements the functionality of the BC 201c is configured as a separate module, in order to thereby easily allow expansion or removal of a plurality of RTs 201b or BCs 201c, depending on the size of the FPGAs used. Consequently, an interface apparatus has at least a FSM for a BC and a FSM for up to 31 RTs. In the submodule for the RTs, there is a FSM that handles all the active RTs. What RTs are active on the respective interface apparatus can be set by the host by means of the configuration register 200d. A setting in the configuration register 200d then decides what functionalities the FSMs simulate, in other words whether BC and/or RT or a plurality of RTs are simulated.

The resource management device uses the timer 201d and/or the time monitoring device 201h in order to guarantee correct timing for the command/response protocol. For example, the resource management device 201 is set up in such a manner that it implements the time behavior of the MIL-STD-1553B protocol, using its submodules. The timers 201d have a high degree of precision, in order to guarantee adherence to the determinism. The time monitoring device 201h can be a part of the timer 201d.

The temporary memory device 200 is used to store essentially all the data for the resource management device 201. In this connection, the message memory 200b takes up a large portion of the memory. The message memory 200b can be operated in at least two different modes. In reception mode (Receive Mode), the message buffer is set up for storing a message that arrives by way of the memory/logic interface 209 from the medium 102, in order to thereby represent a target memory for a data transfer. Data that arrive by way of the bus 102 and are available to the host 106, 108 get into the reception buffer 200b.

In a further mode, transmission mode (Transmit Mode), the message buffer 200b is used as a source for data that are supposed to be transmitted in the direction of the medium 102. The message buffer 200b has two interfaces or ports and is operated as a dual-port memory. On the one hand, messages can be exchanged between the host device 106, 108 by way of the user data memory 200f, by way of the interim memory interface 211, and on the other hand, data can also be exchanged with the medium 102 by way of the memory/logic interface 209. Within the message buffer 200b, memory regions are reserved for reception and transmission of data, in dedicated manner.

In a further exemplary embodiment of the invention, the part of the message buffer 200b that contains the data received by the bus 102, as the reception buffer, can be transferred into the host device 106, 108. This presumes that the interface apparatus 103, 107 itself can actively access the host device 106, 108 and store data there. Therefore the number of reading cycles can be reduced. The "Write Posting" mechanisms of computer-internal communication systems that are often used are thereby utilized better.

The temporary memory device 200 also has a memory region for a bus list 200c and another memory region, separate from it, for a control register 200d.

In general, there is a difference between a memory and a register. A memory, a buffer or a FIFO are referred to as a memory. Memories are instantiated in the FPGA, in this implementation, in a block RAM. This implementation or instantiation as a block RAM can be an effective memory implementation. The distinction between buffer and memory is not exclusive. The message memory 200b or the memory 200b is a buffer, because it is made available on the basis of the FPGA resource of a dual-port block RAM and demarcates the host clock pulse domain 702 and system clock pulse domain 701. It is, at the same time, the memory 200b, because it is an addressable mass memory.

The term memory used herein can broadly encompass registers, FIFOs, buffers or block RAMs, since not only registers but also FIFOs or block RAMs can store data.

If a specific functionality of a memory is emphasized, which goes beyond storing data, then a distinction is made between the terms register, FIFO, buffer, and block RAM.

A register is a special memory that is designed for storing precisely one word and therefore does not require any addressing.

A FIFO is a memory architecture that allows accessing first what was written to the memory first. For this reason, a FIFO also does not possess any addressing or any logic that allows addressing. A FIFO can also separate clock pulse domains or clock pulse domains. For example, 200a1 and 200a2 are FIFOs that separate the transmission clock pulse domain and/or the reception clock pulse domain from the system clock pulse domain.

A buffer is a memory that stores data temporarily or transitionally. It can furthermore separate different clock pulse domains from one another, because it can be operated at a different write clock pulse and read clock pulse. Operation at a different write clock pulse and read clock pulse is referred to as asynchronous operation.

A block RAM is a memory that is present in the FPGA and the memory size and access width of which can be configured. A block-RAM-based memory lies within the FPGA or the interface apparatus and not outside of it. A block RAM is used for implementation of all the memory on a FPGA.

In the following, the operation of an interface apparatus 103, 107 will be considered once in the operating mode as a remote terminal (RT) and once as a bus controller (BC). For this purpose, the case of transmission of user data by way of the medium 102 will be represented for both modes.

FIG. 3 shows a detailed block diagram of the submodule that implements the functionality of a remote terminal 201b, according to an exemplary embodiment example of the present invention. The functionality of the RT is structured as a FSM 201b, called the remote terminal FSM 201b. The remote terminal FSM 201b serves as a coupling network or switch between the message buffer 200b and the transmission medium 102 (not shown in FIG. 3), for example an Ethernet bus 102. The transmission medium can be reached by way of the reception interface 208a or the transmission interface 208b and the serial/parallel converter 201a connected with it (not shown in FIG. 3). Because the message buffer 200b is connected with the host device 106, 108, the RT FSM can be interpreted as a coupling element between the host device 106, 108 and the medium 102. The remote terminal FSM 201b processes data that come from the message buffer 200b or are written into 200b. However, these first pass through a memory controller, which is described in FIG. 8 and not shown in FIG. 3.

It should be noted that in FIG. 3, not all the components actually present between the message buffer 200b and the host device 106, 108 are shown.

Access to the message memory 200b takes place by way of the memory interface (Memory interface) 300 and the memory access link 301. By way of the configuration port 302, which is connected with a configuration register 200d not shown in FIG. 3, the remote terminal submodule 201b or the RT FSM 201b is informed, on the one hand, that it is supposed to work in the operating mode RT. The configuration register 200d can be configured as a switch-over device 200d between the different operating modes RT, BC and MON. Furthermore, the RT submodule 201b is informed of the terminal addresses, by way of the configuration register 200d, to which addresses it is supposed to react or which it is supposed to use when identifying messages. The resource management device 201 could also be switched into bus controller operating mode (BC) by way of the configuration port 302, in that the BC FSM 201c is activated instead of or in addition to the RT FSM 201b. Furthermore, the RT address could also be changed and the remote terminal could be operated with any other desired address. Other switch-over devices, such as mechanical or electronic switching devices, are conceivable.

If an interface apparatus 107 was set as RT by way of the configuration port 302 and the related configuration register 200d, there are four different possibilities as to how the RT FSM 201b can react to a command (Command) from a BC, received by way of the command input 303 (Command Input).

The RT FSM 201b will ignore a command that arrives by way of the command line 303 if this RT FSM 201b has been activated neither as a source RT nor as a target RT by a BC. Activation could also take place by means of a BC that is situated on the same module or on the same FPGA as the RT FSM 201b. In order to avoid conflicts, it is provided that a RT FSM that is supposed to be a participant in communication will be switched as a source RT or target RT. The actual message exchange can take place without giving an address, by means of establishing source RT and target RT. The available bandwidth of the transmission medium can essentially be used completely, and multiple target RTs can also receive the message.

The reception mode will still be discussed in greater detail below. For the sake of completeness, the different operating modes of the RT FSM 201b or of the remote terminal submodule 201b will be described at this point.

If the RT FSM 201b was activated as a reception RT or target RT by means of a command previously received by way of the command line 303, with the corresponding RT address, then the RT FSM 201b will wait for data, user data or data packets to be received on the reception line 304r. The RT FSM 201b will pass these data on to the corresponding memory location of the reception buffer 200b, to store them. To establish the address region, the message buffer 200b, particularly the specific address, will be activated as a reception buffer, with activation of the RT FSM 201b as the reception RT.

In transmission mode, the RT FSM 201b was activated as a transmission RT or source RT for transmission, with a command previously received from a BC, for example by way of a message on the command input 303 with the RT address of the RT FSM 201b. In this transmission mode, the RT FSM 200b will read out user data from the message buffer 200b, which is set up for transmission as a message source, and will transmit them by way of the transmission data line 304s.

The RT FSM 201b can also be activated simultaneously as a transmission RT and reception RT, and can exchange data by way of a loop-back buffer 200j connected with the FPGA (not shown in FIG. 3), which is connected both with the transmission line 304s and with the reception line 304r. The transmission RT and reception RT are different ones of the large number of RTs simulated by the RT FSM 201b. The loop-back buffer 200j brings about the result that transmitted messages are transferred not only to the bus 102, but simultaneously also into its own reception buffer 200a2. The RT FSM 200b handles the fed-back message just like a regular message. This also means that the RT FSM 200b does not know or does not have to know, during transmission, that the message is intended for it.

The configuration register 200d has a flag for an RT address, in each instance. If this flag is activated, then a reaction occurs to commands that relate to the RT address of the flag. If this flag is not activated, then the command and the bus traffic until the next command are ignored.

As can be seen, read access, write access, or read and write access to a corresponding memory address of the message buffer 200b will take place as a function of whether a message is to be sent from the message buffer 200b or received by it or both at the same time. Simultaneous read and write access can occur during a bidirectional transmission. The memory interface 300 regulates this simultaneous access, in other words whether read and write access to this memory is supposed to take place during the same time interval.

Reading takes place first, and, in a later phase, writing takes place. From the point of view of the message buffer 200b, simultaneous access is not allowed to take place in the scenario described above in the text. Simultaneous access takes place if access occurs on the part of the host device 106, 108 and simultaneously of the memory interface 300. The memory interface 300 always handles only one access at a time, namely reading or writing. The memory interface controls the memory access controller and should not be equated with the memory access controller in the memory interface 210.

If the RT FSM 201b was not activated by a preceding command from the BC, all messages received are ignored or discarded.

In the exemplary embodiment according to FIG. 3, data buffers 200f, 200g are shown. These can be used alternatively or supplementally to the data buffers 200a2, 200a1. For a simple structure of the interface apparatus, which is assumed in the predominant part of this text, the data buffers are not present. Therefore the data buffers 200f, 200g are only shown with a broken line. In order to prevent interference or a collision between different time-critical user data, particularly in the case of essentially simultaneous read/write access to the message buffer 200b, the internal data buffers 200f for the transmission direction and 200g for the reception direction can be provided in the transmission line 304s or reception line 304r, respectively. These data buffers 200f, 200g can contribute to implementation of the real-time behavior and prevent a collision by means of short-term temporary storage of data. With the simple structure of the interface apparatus, the data buffers 200a2, 200a1 by themselves essentially ensure real-time behavior of the interface apparatus, without additional hierarchically arranged data buffers 200f, 200g. The only asynchronous memories 200a1, 200a2 are accordingly disposed outside of 208.

Figure 8:
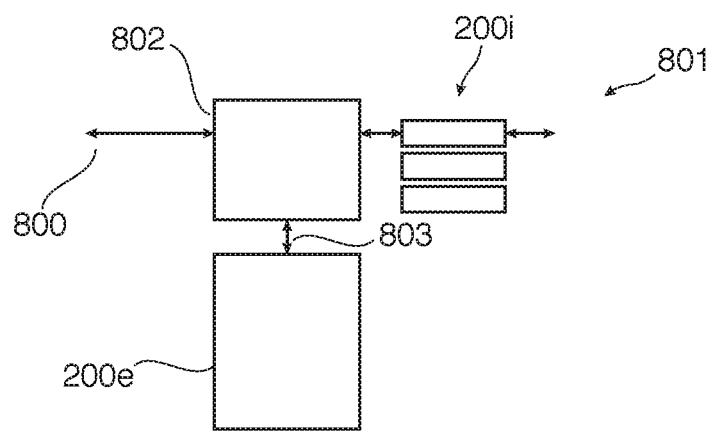

The data buffers 200f, 200g, if they are present, are implemented as internal FIFO buffers. Because the data buffers 200f, 200g are situated within the FPGA, the memory type block RAM is used to implement them. The size of this FIFO can be dynamically configured before synthesis. The data buffers 200f, 200g serve to resolve collisions during memory access in such a manner that the real-time capability of the system clock pulse domain is maintained without allowing the host clock pulse domain 702 to starve in terms of access. This functionality is shown in FIG. 8. The size of the data buffers 200f, 200g is configurable and based on the size of the host accesses to be expected and the clock pulse difference between host clock pulse domain 702 and system clock pulse domain 701. The data buffers 200f, 200g can also be part of the temporary memory 200.

The control register 200d (not shown in FIG. 3), which is connected with the RT FSM 201b by way of the control port 305, represents the broadest input signal of the RT FSM 201b. This control register 200d connects the command/response system, which is essentially implemented in the resource management device 201, with a host device 106, 108 (the host device is not shown in FIG. 3) or a host controller 106, 108. The configuration port 302 also accesses the control register 200d, as does port 305. In one example, the control register 200d can be statically routed to this port 302. The configuration port 302 specifies what RTs are handled by the RT FSM. The configuration port accesses the registers 200d. The register 200d is relatively broad, in order to cover the entire active flags for the RTs. The flags indicate which of the plurality of RTs on the RT FSM is activated. This register 200d is set by the host device 106, 108. On the way from the host device 106, 108 to the RT FSM 201b, the longest paths in the FPGA implementation occur, with reference to the geometrical path length in the FPGA. In addition to the geometrical length, the connection from the register 200d to the configuration port 302 consists of 32 parallel signal lines. Because of its length and width, this connection can be the most critical path in the interface apparatus. An automated signal routing process during design synthesis can be conceived for designing the overall system in accordance with the most critical paths. In the design of the interface apparatus, it might be necessary to pay attention to ensure that this undesirable designing according to the most critical paths is prevented. This is because this path might not be critical for the function of the overall system. The signals on this path are static relative to the system clock pulse and change only rarely or not at all relative to the system clock pulse. In order to reduce the criticality of these signal lines, the signals can be passed through multiple registers in an embodiment of the invention. The registers that are introduced shorten the signal line. By means of the registers that are introduced, value changes in register 200d are transmitted to the configuration port 302 only with a delay. This delay is proportional to the number of introduced registers and is a multiple of the first clock pulse of the system clock pulse domain. Because of the relatively static character of the signals in the register 200d, however, this delay essentially has no negative effect. Introduction of the registers can be used, in an exemplary embodiment, as a measure for allowing the interface apparatus on a predetermined platform.

In one example, the memory width of the configuration register 200d connected with the configuration port 302 amounts to 32 bits. In this connection, each bit represents a possible RT that is implemented on the same FPGA. Consequently, up to 31 RTs and 1 BC can be operated at the same time by means of this 32-bit configuration register 200d. The reception data buffer 200g and the transmission data buffer 200s are implemented by means of block RAM of the FPGA. The data buffers 200g, 200f are FIFOs having a width of 8 bits and therefore can accommodate the length of a maximally possible data packet (Data Frame). In this connection, the 8 bits relate to the width of the FIFOs 200g, 200f and not to the depth. The width indicates how broad a data word is, which can be written into the FIFO or read out by the FIFO during a clock pulse. The depth is the maximal number of words that can be stored in the FIFO at the same time. The depth represents the memory size.

The RT FSM 201b processes the data with 8 bits and therefore predetermines the width of the FIFOs 200g, 200f at 8 bits. The data buffers 200g, 200f of the RT FSM 201b are operated synchronously, because both input and output are situated in the same clock pulse domain 701. The data buffers 200f, 200g are configured as a dual-port memory and are operated at the same clock pulse on each side. The burst length for a memory access to the message buffer 200b is established by means of the memory length of this data buffer 200g, 200f. It is shown in FIG. 8 how the memory accesses are segmented in order to maintain the real-time capability on the interface side and on the host side. The size of such an access segment automatically results in the size of a memory segment.

The memory interface 300 is kept simple, so that it can be combined and operated with different types of message memories 200b. The bidirectional operation of the interface 209 is implemented by means of two unidirectional data ports, in each instance, one for reading and one for writing. Thereby the message buffer interface 209 has two ports on the message memory 200b. The interface 301 knows only one port, which can be used for writing and also for reading. This interface 301 serves only for the memory accesses of the RT FSM 201b. The additional parallel accesses of the host device 106, 108 are not shown in FIG. 3.

An additional or other source for transmitting data—can be the BC 201c, in other words the central control device 201c. The BC 201c can, however, send data only in the form of commands (Commands), not user data.

Figure 4:
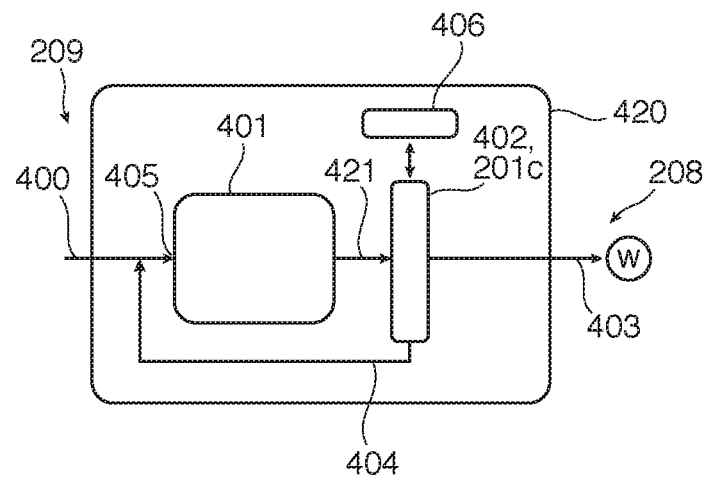

FIG. 4 shows a detailed block diagram of a bus controller submodule, and particularly its role during the processing of a bus list by means of a loop-back mechanism according to an exemplary embodiment of the present invention. The bus controller submodule 201c, the bus controller FMS 201c or the BC FSM 201c or BC 201c forms the interpreter 201c, 402 for a program control device 420. The BC FSM 201c, as the coordinator or director for the traffic on the medium 102, initiates all the transactions. Furthermore, the BC FSM 201c monitors adherence to time defaults or deadlines according to the allowed timetable for data transfers, and thereby ensures adherence to the determinism. The BC 201c assumes that the subscribers, i.e. other interface apparatuses 103, 107 connected with the medium 102, and particularly their RT FSMs 201b adhere to the timing. In other words, the BC 201c processes the bus list in interaction with the loop-back FIFO 401, independent of the state of the RTs in question.

A RT 201b that does not adhere to the timing is recognized by the BC 201c as being defective. In such a case, the redundancies that have been provided are accessed.

For monitoring of the RT FSMs 201b, an independent watchdog can be integrated into the BC FSM 201c, which watchdog stops a transfer after the maximal transfer time has been exceeded, for example in order to shut off a Bubbling Ideot.

If the monitoring takes place within the RTs 201b, a watchdog is also provided, as in the case of the BC, and, in addition, a further safety mechanism is provided, which ensures that a new command from the BC 201c stops any data transfer that is still running, no matter on what bus it arrives. For this purpose, it can also be necessary for a response delayed within the interface apparatus to be stopped or discarded in order to adhere to the timing.

The plan according to which the BC FSM 201c allocates the divided medium 102 to the individual subscribers 101, 120a, 120b, 120c, 120d, 120e, 120f is stored in a bus list that the BC FSM 201c receives by way of the input line 400 and the loop-back FIFO 401. The input line 400 is a part of the memory/logic interface 209, which is disposed between the temporary memory device 200 and the resource management device 201. The elements of the bus list are loaded into a loop-back FIFO 401 by the bus list memory 200c, which is not shown in FIG. 4. The bus list in the temporary memory 200, 200c was written by a host controller 106, 108 (not shown in FIG. 4). For this purpose, a register having a width of 32 bits, which is connected with the input line 400, is evaluated.

The host controller 106, 108 initializes the bus list 200c, in that it writes the individual data sequentially into the loop-back FIFO 401. Whenever the host controller 106, 108 writes a new value into the register on the input line 400, the value of the register is transmitted to the loop-back FIFO. The content of the loop-back FIFO 401 represents the program code for the sequence control and establishes the timing. There are two commands in this program code. A first command relates to sending of a command word 1100 (Send Command Word). The second command relates to waiting for a specific period of time (Delay). The command instructs the FPGA to wait for a certain period of time. If a first command is pending, a command word 1100 or Command Word 1100 is transmitted. The parameters for this command word 1100 are present in a 32-bit register (not shown in FIG. 4) at the input line 400. If a second command is pending, the timer 406 is started and a wait occurs until this timer has reached a threshold value that is also present in the 32-bit word. In this way, the waiting times between two command words 1100 and thereby transmission sequences are generated. After a command has been performed, the 32-bit command word is written into the input 405 by the FIFO output, by way of the feed-back line 404, and thereby the entire sequence is repeated. In this way, the interactive nature of the bus list is achieved. Individual components of the bus list cannot be changed on-the-fly. However, the bus list can be separately emptied or flushed by the host controller 106, 108 and re-written, for example in order to switch over to redundant systems in the case of an error. For this purpose, the BC switches over to the redundant system. The configuration register 200d is not shown in FIG. 4. For the BC 201c, the configuration register 200d is used only to activate or deactivate the BC 201c. The FIFO 401 has a width of 32 bits. The oldest word, in each instance, is actively present at the output. This is the word that is processed next by the timer 201d and/or by the time monitoring device 201h. There, a decision is made as to whether a command will be transmitted or whether a wait will occur. If a preceding command was carried out, the current word is loaded from the FIFO into a 32-bit register within the BC 201c, and, after the command is carried out, the word is fed back to the input of the FIFO 404. The 32-bit register within the timer 201d is not shown in FIG. 4. The bus list that is stored in the bus list memory 200c has a combination of different elements, which can be selected from two data word types. The data word types represent the command set of the bus list 200c. As needed, the elements of the bus list are sequentially stored in the bus list 200c. Only by means of evaluation using an interpreter 402 are the elements of the bus list 200c converted into corresponding behavior.

The bus list command word (Buslist Command Word) that is used in the bus list 200c and in the loop-back FIFO 401 is not already the final command word (Command Word, Command) 1100 that the BC 201c sends to other subscribers 120, other interface apparatuses 103, 107 or other RT FSM 201b. The final command word is generated from the parameters in the 32-bit register including addressing. An arrangement sequence of the bits after MSB or LSB does not yet exist in the bus list command word of the bus list 200c and also not in the output command word 1100 at the output 403 of the loop-back FIFO 401. The MSB in the case of a command word 1100 that is generated by the interpreter 402 and output to the data line 403, in which the preamble 512 with the values 001, 010 or 100 of the command word 1100 is also accommodated, is the data line of the parallel connection 403 having the highest index, for example in the case of a 32-bit line 403, the line having the index 31 at the interface 403 of the loop-back FIFO 401.

A delay data word, which is characterized by a specific bit of the data word set to the high state, is interpreted as a delay and passed to the time element 406, for waiting the period of time predetermined in the delay data word. The delay data word is the word in the FIFO. With the delay data word, it is possible to adhere to a time plan if the pass-through time of a message through the interface apparatus is less than the time at which a response is expected.

If the specific bit is set to the low state within the current 32-bit data word in the FIFO 401, then the BC 201c generates a command data word. The command data word is exchanged by way of the command line 403, which is part of the interface 208, between the resource management device 201 and the serial/parallel conversion device 201a. Therefore a corresponding command word (Command) is sent, which instructs a remote RT 107a, 107b, 107c, 107d, 107e, 107f to do something. The command word is generated in the BC 201c. In order to guarantee cyclical repetition of the procedure, the command word (Command) is passed back to the loop-back FIFO 401 by way of the feed-back line 404, so that a ring buffer is implemented. The loop-back FIFO 401 is implemented by means of block RAM.

The protocol in which a command/response protocol is essentially used on layer 2 and the Ethernet protocol is essentially used on layer 1 can be referred to as a "command/response protocol over Ethernet" or "Command/Response over Ethernet protocol." Telegrams that correspond to this protocol can be generated by the interface apparatus. The loop-back FIFO 401 is the interface between the logic 201 for the "command/response over Ethernet protocol" and the host device 106, 108. The combination of parallel/serial converter 201a and data buffer 200a represents the logic for the "command/response over Ethernet protocol." The data to the interface 104, 109 are not time-critical if the data involve the sequence plan for the BC 201c and not user data for a related avionics application. Processing of the sequence plan is time-critical, but its configuration is not. These data for the sequence plan have no real-time requirements. The BC 201c does not receive and send any user data. The user data are exchanged by way of the RT FSM 201b. The host 106 loads the loop-back FIFO 401 once during initialization of the network with the data for the sequence plan. Afterward, the program control device 420, particularly the BC 402, processes the program cyclically, using the loop-back FIFO 401. In the case of undisrupted behavior, the BC 201c "hears" nothing more from the host device 106, 108 after it has been initialized. To state it in other words, a host enters into contact with a BC essentially only during initialization and during error correction, for example during a redundancy switch-over. Therefore, although the host does have the possibility of changing the bus list 200c, changing the bus list is essentially not real-time-capable and could also impair the real-time capability of the network.

The program control device 420, particularly the loop-back FIFO 401, determines the entire time behavior of the implemented command/response protocol. The loop-back FIFO 401 determines the interval at which command words are sent to the RTs 201b, in each instance. The timer 406 in the program control device 420 serves for this purpose. A command word initiates every transfer on the network 102 and specifies the transfer addressing and the transfer duration. The messages that can be transmitted during a transfer can be, for example, a command (Command or CMD), data of a source RT (Sender Data) or a response of a receiver (receiver response). The times between the individual messages of a transfer are established by the maximal response time (Response Time), which can be monitored by the time monitoring device 201d, 201h. The length of the messages is also known. In this way, the complete length of each transfer is known when the bus list is initiated. Consequently, the interval times between two transfers are also known at initiation.

The loop-back FIFO 401 can be viewed as a program memory for the sequence of the message transfer. The BC logic 201c consequently implements a simple processor 420, which knows two command words. The first command word is an instruction to initiate a transfer, in that a command word is emitted. The second command word is an instruction to wait for a predetermined period of time. This simple processor 420, however, utilizes no instruction pointer and no branch commands (Branch Commands). The commands are processed strictly sequentially by the loop-back FIFO 401, and each processed command is written to the end of the FIFO.

Because the loop-back FIFO 401 represents a great path length due to the many functions to be implemented, the layout of the loop-back FIFO can lead to timing problems within the interface apparatus 103, 107, which can impair the internal function of the interface apparatus. Such timing problems can be found, for example, during the FPGA synthesis, if the interface apparatus 103, 107 is implemented by means of a FPGA. However, timing problems can disrupt real-time behavior and should therefore be avoided. Aside from the time behavior of the messages on the Ethernet bus, the internal demands on the timing of the digital circuit should also be adhered to by the timing and kept free of disruptions in order to avoid unforeseeable events. The internal timing is essentially influenced by the loop-back FIFO 401, wherein disruptions can be caused by the time behavior of the electrical signals and the circuitry of the electrical components, particularly if the loop-back FIFO 401 is implemented on a FPGA. This because during FPGA development, at first only an abstract logic circuit, for example, is formed on the circuit elements present on the respective FPGA. Subsequently, these circuit elements are electrically connected, accordingly. These connections form a path length. In the assignment of these connections, it is checked whether the running times for signals, which times result from the path length, are short enough to guarantee stable electrical conditions in all participating circuit elements, before a signal is written into a register with the next clock pulse flank. In this connection, the path lengths between output or Output of the host device 106, 108 and input 400 or Input 400 of the loop-back FIFO can become too long. The output of the host device 106, 108 corresponds to the first interface 104, 109. In the structure of the interface apparatus 103, 107, attention must therefore be paid to ensure that the path length, in other words the total length of the wiring of the components of the FPGAs involved in the connection, between the first interface 104, 109 and the input 400 of the loop-back FIFOs, does not exceed a predetermined length.

In order to avoid timing problems that can occur due to the overly long connection between the first interface 104, 109 and the input 400 of the loop-back FIFO 401, additional registers are inserted at the two end points 104, 109, 400. These registers split the long path length into shorter segments and thereby reduce the risk that unforeseeable unstable states and internal conflicts or collisions can occur. In other words, the registers uncouple multiple segments of a total path, so that the requirements regarding the timing in the individual segments can be controlled more easily, and thereby relax the time behavior, wherein they reduce the probability that error states will occur. This measure contributes to guaranteeing the correct functionality of the determinism of the interface apparatus.

The interface apparatus can be implemented with a FPGA of the type Xilinx Spartan 6: XC6SLX45T.

The signals that the host device 106, 108 writes into the loop-back FIFO 401 run by way of the registers introduced at the ends of the path between the first interface 104, 109 and the input 400 of the loop-back FIFO 401. The signals that are transmitted by the host device 106, 108 and the loop-back FIFO 401 serve for the initial and static configuration, and the transmission is not repeated in error-free operation. Due to the introduction of the registers, the transmission of the signals from the host device 106, 108 to the loop-back FIFO 401 is delayed by a multiple of the clock pulse cycles of the system clock pulse domain 701. Due to the static and initial character of this transmission, this delay has no effect on the functionality of the BC 201c.

The loop-back Puffer 401 or the loop-back FIFO 401 represents the bottleneck for the timing of the logic circuit 201 or the resource management device 201. The input 405 of the loop-back FIFO 401 represents a critical point in the bottleneck formation. The loop-back FIFO 401 is connected with the host device 106, 108 by way of the input line 400 and with the BC FSM 201c by way of the intermediate line 421. The BC FSM 201c forms the interpreter 402 of the program control device. The loop-back FIFO 401 can be written to by the host device 106, 108 during initialization. The commands received during initialization are processed by the BC FSM 201c, particularly its loop-back FIFO 401. The BC FSM 201c is connected, by way of the output line 403, with the serial/parallel converter 201a and the data buffer 200a, which are jointly responsible for implementation of a command/response protocol by way of the transmission medium. The commands generated by the BC 201c are converted into the "command/response over Ethernet protocol" by the serial/parallel converter 201a and the data buffer 200a.

The loop-back FIFO 401 is situated entirely, i.e. with input 400 and output 403, in the system clock pulse domain 701 or the domain of the first clock pulse signal. The system clock pulse is derived from the FPGA clock pulse. Consequently, this loop-back FIFO 401 cannot be operated with different clock pulse signals at the input 400 and output 403, in other words not asynchronously. Therefore the loop-back FIFO 401 also cannot ensure balancing out between the different first clock pulse and second clock pulse. The loop-back FIFO 401 itself can only be operated with the same clock pulse for input/output. Therefore a plurality of sequential and/or serial registers are used on the input side, in order to produce asynchronous behavior. Use of the registers can play a minor role for the real-time capability of the terminal. However, only with these registers can the function of the FPGA implementation as a valid circuit be achieved. The transition between the different clock pulses takes place in that registers switched in series are written to with the one clock pulse and read with the other clock pulse. If the value of the registers that are formed from the serial circuit is the same in the series, then one can assume that the signal states for the total register are valid and stable.

As has already been explained, not only a RT FSM 201b operated in transmission mode but also a BC FSM 201c can be responsible for transmitting data. While the RT FSM 201b transmits the time-critical user data of the avionics applications, BC FSM 201c transmits commands of the command/response protocol, in order to control access to the medium. The RT or BC makes the corresponding packets of the user data of the command/response protocol available in raw form, by way of the outputs 304s or 403s. These raw data have a parallel form and not yet the serial form that is to be transmitted. This raw form of the user data, however, involves data that are not yet capable of transmission, because a corresponding frame format for a transmission frame is absent. Because the data of the output 403 come from the BC 201c, only the raw data for the command are transmitted by way of the output line 403. A command always has the same format 1100, namely addressing and length of the message. The output 403 is a parallel interface.

The BC FSM 201c thereby makes a command word 1100 in the corresponding format of the implemented command/response protocol available, for example in the format of the MILBUS protocol or a modified protocol, in which the first 3 bits 512 contain a type identification, but still without a valid frame, by way of the output 403. At the transmission line 304s, the RT FSM 201b also makes user data to be transmitted available without a valid frame format or as an incomplete transmission frame.

It is now the task of the combination of the parallel/serial converter 201a and the transmission-reception buffer 200a to add the corresponding missing data for a valid transmission frame not only of the command/response protocol but also of the transmission protocol used to the data made available, and, at the same time, to ensure that processing of the data takes place deterministically, without essentially causing overly great delays due to appending of the frame structure to the raw data. At the same time with completion of the transmission frame, the clock pulse difference between the first interface 104, 109 and the second interface 105, 110 is balanced out and the data format is converted, for example from an 8-bit parallel data format to a 4-bit serial data format. Adaptation of the clock pulse difference is balanced out in the asynchronous FIFO of the transmission-reception buffer 200a. This is always done when an interface apparatus 103, 107 accesses the divided medium 102. For this reason, adaptation of the clock pulse difference also takes place in the case of a BC 201c that does not receive any user data by way of the first interface 104, 109.

In other words, the interface apparatus makes use of the fact that in order to adhere to determinism in a command/response protocol, there are always points in time, during transmission of data, at which the bus cannot be engaged, therefore even if data are being delivered by a source, they cannot be transmitted before predetermined general conditions have been met. A general condition to be met can be that a data packet must be completely present in a buffer before a processing step. Due to adherence to general conditions, stop phases come about during the creation and disassembly of data packets as they pass through the interface apparatus, during which phases the data flow is interrupted. An example of a stop phase is the calculation of a user datum length or its CRC (Cyclic Redundancy Check) checksum. During these stop phases, the packet is stopped. Memories or registers are provided at locations where such stop phases come about, in order to temporarily store the packet and to not block preceding or subsequent submodules. However, the stop phases are also used to determine frame data of the transmission frame and to append them to or remove them from the user data, so that the stop phases lead to as little delay in the total sequence as possible. In other words, the stop phases are used to build up the frame. The interface apparatus uses the stop phase, which is required for packet length determination and for converting parallel data into serial data, to create the Ethernet header, by means of the payload FIFO 200h in the submodule of the serial/parallel converter 201a. The Ethernet header can have the MAC target address, the MAC source address, and the Ethernet frame length at the location of the parallel/serial converter 201a.

A stop phase occurs in the submodule of the transmission and reception buffer 200a as the result of the asynchronous operation of the FIFOs 200a1, 200a2 for rate adaptation and due to the conversion of an 8-bit datum into a 4-bit datum. This stop phase is used to complete the data packet 506 with the CRC, the SDF, and the preamble. The corresponding functions are combined in this submodule.

By means of utilizing the stop phases, it is possible to achieve the determinism for the data stream that is necessary to transfer data by means of a command/response protocol.

A transmission-capable frame in accordance with the selected protocol format of the transmission medium 102 should be made available at the medium-independent interface 202 at the second interface 105, which frame merely has to be converted by the network controller 204 into the physical signals provided for the selected physical transmission medium, in accordance with the standards of the transmission medium 102. Because of using a media-independent interface and making a transmission-capable frame available, the network controller 204 does not have to generate any further frame format for the transmission.

By means of the use of the parallel/serial converter 201a and of the transmission-reception buffer 200a, it is possible to interpret the compilation of the transmission packet as a two-stage process. In this process, the data that are available in the respective process stage are used to create the data for the respective protocol. In other words, creation of the respective frame structure does not take place by means of sequential processing of the entire frame, as it does when packaging the data of a higher layer in the protocol frame of a layer that lies underneath it, but rather the transmission frame of the command/response protocol and of the transmission protocol used are processed in parallel.

Figure 5:
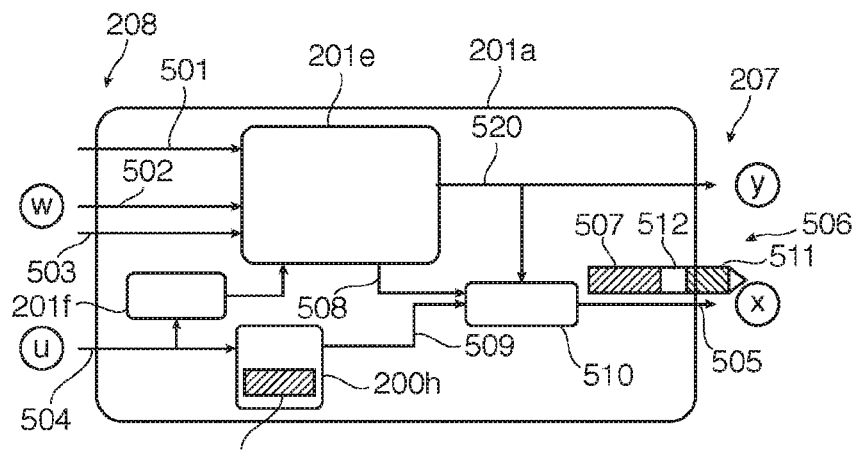

FIG. 5 shows the transmission part 201e or the transmission UART FSM 201e of a serial/parallel converter (UART) 201a as a detailed block schematic according to an exemplary embodiment of the present invention. Of the interface 208, which connects the parallel/serial converter 201a with the resource management device 201 (not shown in FIG. 5), the control line 501 ("Send Control"), the command line 502 or Command Line 502 or the command input 502, the status line 503 or the status input 503, and the data line 504 or the data input 504 are shown. The data line 504, if present, is connected with the data transmission line 304s of the RT FSM 201b (not shown in FIG. 5). The parallel/serial converter 201a receives a status datum from the line 503, by way of the status line 503, which datum has been requested by a BC from a RT and is made available by the RT.

The command line 502 is connected with the data line 403 of a BC FSM 201c (not shown in FIG. 5).

The status line 503 of the parallel/serial converter 201a receives the status data from the output 503a of a RT 201b designated with "send status." The lines 503a and 503 are connected with one another and serve for exchange of status data between RT 201b and UART 201e, which data a BC has requested from a RT and are made available by the RT. As signals, the parameters for a status word are transmitted on the "send status" line. Furthermore, the RT FSM 201b and the parallel/serial converter 201a are connected by way of a "ready" line, which is not shown in FIG. 3 and FIG. 5, but is disposed parallel to the "send status" line. When this "ready" line goes to high, then the UART 201e constructs the data stream for the status word.

A data word stream is a sequence of messages of the type data 1101, in other words user data. A data word is a single message of the type data 1101. A status word is a single message of the type status 1102. By way of the send control line 50, the UART 201e is informed that it is supposed to construct a data word data stream, and, for this purpose, to access the data of the data input 504. The user data themselves are stored in the data buffer 200h by way of the data input 504. While the data are being written into the buffer 200h, the total number of words is counted by the logic unit 201f and passed on to the UART 201e.

By way of the "timer control" line 310 (not shown in FIG. 4), which is connected with 201e, the timer 406 is controlled in order to generate the exact response time (Response Time) for data words and/or status words within the RT 201b. The timer is used to retain a response and a status word in the UART until the response time has been reached by the timer. Command words are transmitted by the UART directly and immediately. A BC expects the responses from the addressed RTs 201b to the packets that have been sent, within the response time. For adherence to the response time, a default is provided within the RT 201b, in order to be able to check that the response to a data word 1101 and/or to a status word 1102 is actually sent within the times expected by the sequence plan, from the RT 201b to the BC 201c that has sent the data word or the status word. For this purpose, the time monitoring device 201d, 201h can be used. If necessary, the response is delayed within the RT 201b, in order to adhere to the sequence plan.

If a UART 201e is considered that is used in combination with a BC 201c, in other words a UART within an interface apparatus 103, 107 used as a BC, then the UART is used for sending a command word 1100. The command word 1100 is sent immediately. The delay during the processing of the bus list happens using the timer 406. If the parameters for a command word are made available by way of send control, then the UART 201e constructs and sends the final data stream for a command word 1100. The timer 201d and/or the time monitoring device 201h serves for clocking the correct time for sending a response or a status. The RT FSM 201b starts the "stopwatch" 201d, 201h when a command arrives. Afterward, the response is generated with user data and held in the UART 201e until the stopwatch has reached the threshold value. The same thing happens when the RT FSM 201b issues a status word when a message is received. The status word after a user data message is also held in the UART by means of the stopwatch. The timer 201d, 201h is therefore used only when a command word 1101 and a status word 1102 are sent.

The sequence of the processing of time-critical user data present on the data line 504 and to be transmitted is controlled within the parallel/serial converter 201a by the send UART FSM 201e. This represents part of the resource management device 201 and is responsible for the transmission direction of the parallel/serial converter 201a. The parallel/serial converter 201a serves to compose a data stream that can ultimately be passed on to the transmission buffer 200a1 of the transmission and reception buffer 200a (not shown in FIG. 5) for further processing. An example of a data stream that is made available at the output interface 505 is indicated in the form of a data packet 506. Depending on the role assumed by the interface apparatus, the data packet 506 can be a command 1100, a data word 1101 or a status datum 1102. The output interface 505 is a part of the interface 207 between the parallel/serial converter 201a and the reception and transmission buffer 200a. Aside from conversion of a serial data stream into a parallel data stream and vice versa, the serial/parallel converter 201a also already generates part of the transmission frame of the user data to be transmitted. This incomplete part of the transmission frame has portions of the command/response protocol transmission frame and portions of the transmission protocol transmission frame, for example of the Ethernet transmission frame.

By way of the control port 501, the send UART FSM 201e receives a signal that indicates that new data to be transmitted are pending at one of the inputs 502, 503 or 504. By means of this signal, a stop phase that might have been adhered to is terminated, and further processing continues. The stop phase is used to adhere to the sequence plan. Consequently, the control signal 501 can control the stop phases for the serial/parallel converter 201a. As a function of the different types of data to be transmitted, in other words commands (Commands) 1100, status data (Status) 1102, and user data (Data) 1101, the data are made available at the related, spatially separated inputs 502, 503, 504 of the interfaces 208. In other words, it can already be determined at the location where the data are made available to what type of data the data to be transmitted are assigned. The data are therefore multiplexed locally or made available as a function of location.

User data are made available by way of the data input 504, status data by way of the status input 503, and commands by way of the command input 502. The input parameters at the command input 502 or at the status input 503 must be present in stable manner at the moment when the data stream 506 is generated. The data stream 506 consists of the data or parameters present at 502, 503, 504, in each instance. These parameters must be valid at the UART FSM 201e or present in stable manner, in order to generate a correct data stream 506. For example, a data stream for a command word 1100 is generated by the FSM 201e when the command ready control signal (not shown in FIG. 5) is set. At the time point of setting of the signal, the parameters for the command word must already be valid at the command input 502.

Generation of a data stream from commands 1100 or from status data 1102 is easily possible, because constant input data of equal length are present.

The situation is different for user data, which are made available by way of the data line 504. In particular, the possible different data length of the user data is a variable factor that must be handled individually for each user datum to be transmitted. The length therefore behaves dynamically. The length of the message is always known during a transfer operation and is deterministic. However, the UART FSM 201e must be designed for processing these dynamic lengths. Command words 1100 and status words 1102 always have the same length and structure and can easily be generated from the parameters present on the related input lines 502, 503. Before a data transfer of user data can take place, the user data FIFO (Payload FIFO) 200h, which can also be assigned to the temporary memory device 200, is pre-loaded with the user datum 507'. The user data can be time-critical user data of avionics applications, which must be transmitted at a specific point in time. The additional loading of the user data 507' into the payload FIFO 200h or into the user data buffer 200h means that an additional waiting time occurs as the result of an intermediate step, in comparison with transmission of deterministic commands or deterministic status data by way of the lines 502 or 503.

The payload FIFO 200h must be adapted to the size of the maximal payload to be transmitted by means of the protocol used on the medium 102. In the case of an Ethernet protocol, the minimal size for the payload FIFO 200h amounts to 1500 bytes. In one example, no segmentation of user data to a predetermined length, e.g. 1500 bytes, might be necessary, because the user data are shorter than the predetermined length. In another example, the UART 201e can be designed for a message length that corresponds to the length of an Ethernet frame. Only after the complete payload has been completely loaded into the payload FIFO 200h can transmission of the user data (payload) 507' by way of the data output 505 begin. In this connection, attention must be paid to ensure that no collision of the data, which are made available by the send UART FSM 201e, by way of the output 508 of the payload FIFO 200h to the data multiplexer 510, occurs with the data that are made available by way of the output 509. The data multiplexer 510 ensures that the right data stream 506 is made available at the right time. Evaluation of the control input 501 and creation of a serial data stream 506 from parallel data 507' are controlled by the send UART FSM 201e and the central FSM 201e, respectively.

To generate a data stream 506 either from commands of the line 502 or from status data that are made available by way of the line 503 or from user data that come by way of the line 504, first a header 511 is created, which corresponds to the protocol used for the transmission medium 102. For example, the header, when using Ethernet, has the target MAC address, the source MAC address, and the length of the Ethernet frame. The length datum is therefore included in the Ethernet frame, for example in the header 511. In one example, a frame according to the standard IEEE 802.3 with length information is therefore used. No Ether Type identifier is used, as it is used in Ethernet Type II. Use of a simple IEEE 802.3 definition allows COTS Ethernet switches to be used, which cannot derive the length of the frame from the command/response layer.

The broadcast address is always used as a target MAC (Media-Access-Control) address. Any address can be used as the source MAC address, because this address is not utilized since the communication source and communication sink are established by the BC. The addresses are only used in order to be compatible with standard Ethernet components. Evaluation of the addresses does not take place.

Alternatively to the use of Broadcast Ethernet addresses, however, in another exemplary embodiment the command/response addresses can also be reproduced on related valid Ethernet addresses, so that the Ethernet packets are already received only by the desired target systems.

Figure 11:
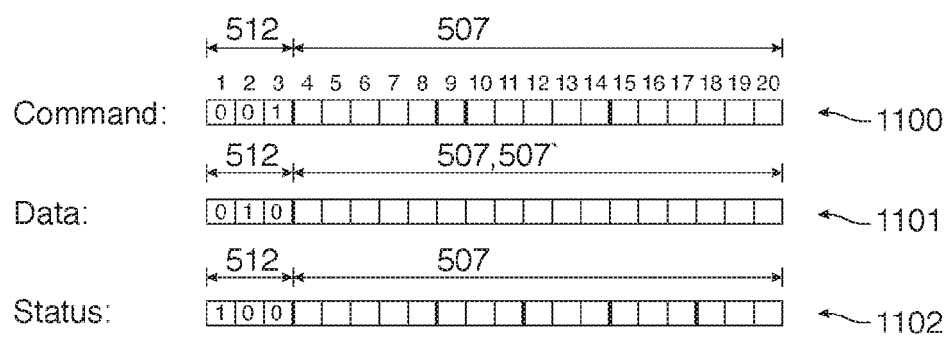

In the following, without any restriction of generality, it will be assumed that for the transmission protocol, the collision recognition protocol of the Ethernet according to the standard IEEE 802.3 is used, and for the command/response protocol, essentially the MILBUS standard MIL-STD-1553B is used. In particular, a modified frame structure of the MILBUS standard can be used, which is shown in FIG. 11. Other command/response or Command/Response protocols or transmission protocols, for example transmission protocols on layer 2 of the OSI layer model, are conceivable.

The header 511 of an Ethernet packet has, among other things, the MAC target address. This is filled with the general broadcast address by the send UART FSM 201e. Because the address data of the command/response protocol are used for addressing, the content of the MAC addresses is essentially unnecessary. Reachability is also ensured by means of the broadcast address. The send MAC address, which is furthermore provided, can be filled with standard pre-filled general information, because it is also not evaluated. During the development of the interface apparatus 103, 107, for example during the synthesis of the FPGA 103, 107, the MAC transmission address can be set. Alternatively, for example if the interface apparatus 103, 107 is being tested or measured, the same address can be used for all the subscribers on the divided medium. With this method of procedure, having to wait for the synthesis of a FPGA can be avoided. In another example, the transmission address is not used. If a simple Ethernet switch is used to connect the interface apparatuses 103, 107 or the terminals 103, 107, this switch specifically does not evaluate the transmission address. However, it is also conceivable that a more complex switch is used to connect the terminals, and that problems occur if the switch receives frames having the same transmission MAC address from all of its ports. In order to avoid problems with a more complex switch, for example, different transmission MAC addresses can also be used by the terminals.

The address of the header to be used, which make up a major portion of the header data 511, are therefore predetermined deterministically in one example, and therefore can be quickly entered into the header 511, without evaluation of any other data. By means of the use of pre-filled data for the addresses, delay times can be reduced or utilized while user data pass through the interface apparatus.

In general, it can be an idea of the present invention to fill unnecessary data with standard data that are pre-filled into registers, in order to avoid unnecessary delays that can occur with regard to collisions while data pass through the interface apparatus. Because the command/response protocol has an individual RT address, with which the respective target RT is addressed, the general broadcast address can be used, by means of which all the avionics components 120a, 120b, 120c, 120d, 120e, 120f connected with the medium 102 react. These avionics components consider only the RT address of the command/response protocol, in order to determine whether or not an arriving packet must be processed further.

The compilation of a data stream for transmission of a command or a status datum can easily be carried out on the basis of the transmission lengths, which are also predetermined in fixed manner.

However, the variable length of the user data 507' is carried out using temporary storage in memory in the user data FIFO 200a and by means of the length calculation device 201f, which in turn can be part of the resource management device 201. This calculated length of the pure payload 507' is available at a specific point in time before transmission.

The physical layer is essentially implemented by the Ethernet protocol and not by the MILBUS protocol. A type differentiation of the command/response packets on the physical plane is not possible because of packaging in an Ethernet packet, as it was according to the original MILBUS standard by using a physical synchronization datum by means of Manchester coding and voltage levels. The command/response header 512, which is generated by the send UART FSM 201e, has 3 bits, in order to identify the type of the command/response packet used, in each instance. These bits are only available after decoding and are disposed in the data packet as the least significant bits (Least Significant Bit, LSB). Thus, the bit sequence "001" in the command/response header 512 indicates that a command is contained in the command/response packet as user data. The bit sequence "010" indicates that pure user data 507' are present in the user data field 507. The combination "100" indicates that the user data field 507 contains status data of the input port 503. The data packets that are modified as compared with the MILBUS standard are evident from FIG. 11.

Because of the use and packaging of the command/response protocol in the Ethernet protocol, no further provisions have to be made to distinguish individual data packets from one another on the medium 102, for example by means of special synchronization sequences. The length addition device 201f, length addition FSM 201f or length calculation device 201f adds the fixed length of the 3-bit-long command/response header 512 to the variable length of the payload 507' contained in the user data FIFO 200k. The determined total length of the payload 507, 512 is stored in the Ethernet header 511 as an Ethernet length field. The Ethernet length field of the Ethernet header 511 is determined from the length of the payload 507' and a constant value of 3 bits for the command/response header 512, and used as a length indication. A complete frame therefore has two length indications. One length indication relates to the complete Ethernet frame and is contained in the Ethernet header 511. The other length indication is contained in the command/response header 511 and relates only to the command/response protocol. Variable lengths of the total frame 603 result only from variable lengths of the user data, because all the other fields have a constant length. The two length indications in the Ethernet header 511 and in the command/response header 512 have a fixed difference from the user data length. The length calculation device 201f counts the length of the user data and adds the differences for the length field of the Ethernet header 511 and the length field of the command/response header 512 to the length of the user data, and passes both values on to the UART 201e. In other words, this means that two different values for length exist in one data word 1101. On the one hand, there is a value of a length of the data word 1101, which is calculated within a data word 1101, and on the other hand, there is a value for the length of the Ethernet frame, which is stored in the length field for Ethernet. The value for the length field of the Ethernet packet is greater than the value of the length of the data word.

The Ethernet payload 507, 512 can consequently be a combination of the 3 type bits 512 and the pure payload 507', 507, the 3 type bits 512 and a command 507, and the 3 type bits 512 and a status datum 507.

Therefore the send UART FSM 201e calculates the 3 bits of the type field for the header 512 of the command/response protocol and places it ahead of the pure payload 507', 507, the command 507 or the status datum 507, in order to obtain the Ethernet user data 507, 512 or the transmission medium user data 507, 512. The compiled data packet 506, which does not, however, have the required form yet so that it can be transmitted on the transmission medium, is passed on to the transmission buffer 200a1 of the transmission and reception buffer 200a, by way of the output line 505. During output of the packet 506 by way of the output line 505, the send UART FSM 201 checks whether or not the Ethernet user data 507, 512 have the minimal length of 46 bytes required by the Ethernet standard. If this is not the case, the send UART FSM 201e adds the additionally required number of padding data during transmission, in other words without repeated temporary storage in memory, in order to obtain a valid payload 507, 512 having the required minimum length for an Ethernet frame. The send UART FSM 201e decides whether or not the total length of a data word 506 is below the minimal length of an Ethernet frame 603. If it is found that the value is too low, then the send UART FSM 201e adds the fixed value for a minimal length in the length field for the Ethernet frame 603, particularly in the length field of the Ethernet header 511. In the case of command packets 1100 and status packets 1102, padding is always carried out.

In the case of the data stream 506 that is output from the output 505, it should be noted that it is true that it has an Ethernet header 511 and a header 512 of the command/response protocol, as well as the user data 507, but when leaving the parallel/serial converter 201a, it does not yet have any end data of the Ethernet frame. Consequently, the packet end of the protocol of the transmission medium 102 is missing. The command/response protocol does not possess a special end such as, for example, a CRC checksum.

Because the command/response protocol demands defined minimal and also maximal response times, the transmission process in the parallel/serial converter 201a is monitored by means of a selection of timers from the plurality of timers 201d, 201h. This particularly holds true for incoming queries. A timer informs the send UART FSM 201e when it can trigger the transmission buffer 200a1, by way of the control output line 520 and the control input line 605, in order to receive the data stream 511 (transmission buffer 200a1 is not shown in FIG. 5). With every incoming command word 1100 to an interface apparatus that is configured as a RT, the RT FSM 201b starts a timer. If a terminal 103, 107 or an interface apparatus 103, 107 recognizes that the combination of transmission address and reception address of an incoming command word 1100 or another message is not served by the terminal, the respective message is recognized as not relevant for the terminal. If it turns out, within the RT FSM 201b belonging to the terminal, that the received command word 1100 is not relevant for the respective RT FSM 201b, then the RT FSM 201b stops this timer again.

If the command word 1100 or another message is relevant for the terminal, then the timer continues to run until the maximal predetermined threshold value that represents the response time. In the meantime, the RT FSM 201b makes the data word available, in order to pass it on to the UART 201e. The RT FSM 201b delivers the raw data, and these are brought into the correct format by the UART 201e. When the threshold value is reached, the expired timer 201d, 201h triggers transmission of the data, which were made available in the serial/parallel converter 201a. The corresponding behavior holds true for a status word 1102 after a data word 1101 was received. The entire logic 201 is set up for making a message available within the predetermined response time, in order to have the data that are to be transmitted present in valid manner until expiration of the timer. The response time is predetermined by the sequence plan, and ensuring adherence to the response time contributes to the determinism of the interface apparatus. In other words, "real time" is reproduced by means of guaranteeing that the data will be made available within the response time. In the design of the interface apparatus, it is assumed that the response time is adhered to, in that the design provides for blocking and avoiding unforeseen events. If a response time is nevertheless not adhered to, then the interface device 103,107 will only send a data word 1101 or a status word 1102 when it is available, i.e. in other words as quickly as possible. This deviation from the sequence plan could, however, be interpreted as a malfunction and trigger switching over to redundant components.

Figure 6:
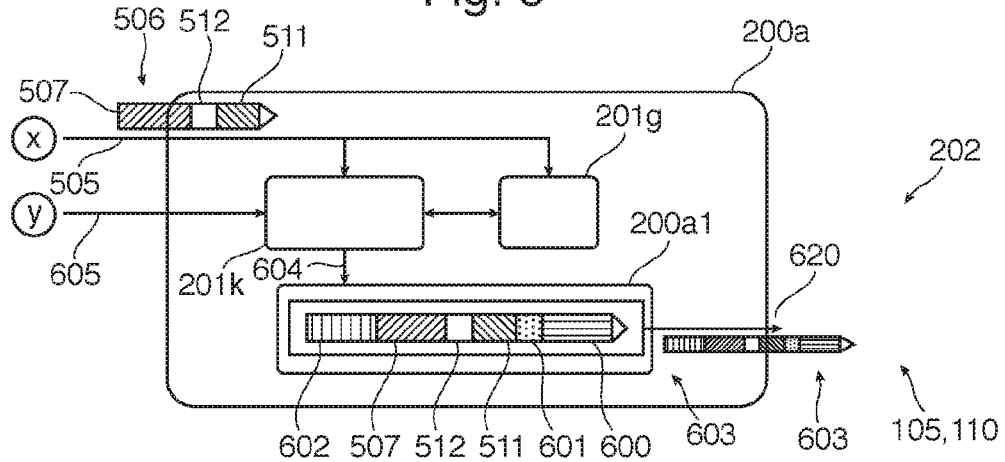

FIG. 6 shows a detailed block diagram of a transmission buffer 200a1 according to an exemplary embodiment example of the present invention. The data stream 506 from the serial/parallel converter 201a (not shown in FIG. 6) reaches the transmission buffer 200a1 by way of the line 505. Before the interface apparatus 103, 107 can now output the data stream 506 by way of the output line 620 of the media-independent interface 202 of the second interface 105, 110, in order to pass it on to the transmission medium 102, the data stream 506 is temporarily stored in the transmission buffer 200a1. The transmission buffer essentially represents the last logic unit of the FPGA in the transmission direction of user data 507' to be transmitted, before the data stream 506 or the data word 603 in a data stream 603 is passed on to the media-independent interface (Media Independent interface, MII) 202. The received data stream 506 already contains the entire MAC addressing in the MAC header 511, the Ethernet length field, the command/response header 512 of the command/response protocol, and the user data 507 to be transmitted. Independent of command word, data word or status word, the data stream 506 already contains all the data for the command/response protocol. Within the transmission buffer 200a1, the transmission buffer control FSM 201k, which is also assigned to the resource management device 201, brings about the result that the data 600, 601, 602 for a complete transmittable Ethernet packet are added. In order to create a complete Ethernet packet, an Ethernet preamble 600 and a SFD (Start of Frame Delimiter) 601 still has to be placed ahead of the packet 506. Furthermore, a checksum 602 still has to be appended to the end, in order to conclude the Ethernet packet 603 correctly. No checksum is provided in the command/response protocol.

Because the preamble 600 and the SFD 601 involve binary values predetermined in fixed manner, always having the same bit sequence, independent of the content of the packet 506, the preamble 600 and the SFD 601 can already be pre-allocated in or pre-loaded into the transmission buffer 200a1. This pre-loading can also contribute to achieving the real-time behavior. Pre-allocation can take place before the incoming data stream 506, consisting of MAC header 511, type identifier 512 of the command/response protocol, and payload 507 is added to the pre-loaded preamble 600, 601. During pre-loading of the data buffer with the preamble 600 and the SFD (Start of Frame Delimiter) 601, a CRC calculation device 201g is initialized and calculates the checksum 602 required for the Ethernet packet, to conclude the packet 603 to be transmitted. The length of the preamble, of the SFD, and of the CRC checksum are not calculated into the Ethernet payload length.

The transmission buffer 200a1 is implemented as a FIFO that has the two ports 604 and 620. After the finished data packet 603 is completely present in the data buffer 200a1, the data packet 603 can be passed on to the network controller 204 (not shown in FIG. 6) for data transmission, by way of the output 620, by way of the MII interface. Passing on is triggered by means of a signal on the control line 605, which is connected with the control output 520 of the UART 201e. The control output 520 and the control line 605 are configured as a line bundle having a plurality of individual lines. The content of the transmission buffer 200a1 is then applied to the bus 102 (not shown in FIG. 6), by way of the output line 620. First, checking takes place as to whether the content, in other words the data packet 603, is complete and whether the UART 201e releases the message after expiration of the response time, by way of a signal line of the plurality of lines of the control output 520. The related timer is used to check the expiration of the response time.

While the data are present in an 8-bit format over the input line 505 and data line 604, the data on the output line 620 only have a 4-bit format. In other words, the output line 620 is composed of 4 lines that run parallel. This 4-bit processing is predetermined by the physical layer of the Ethernet protocol, which sits on the other side of the MII. The CRC checksum 602 is calculated for the entire data frame 603, without the length of the SFD 601. Consequently, the CRC checksum 602 is calculated only for the MAC address in the Ethernet header 511, the type indicator 512, and the payload 507. The CRC calculation device 201g calculates the CRC checksum 602 recursively. The checksum is calculated according to the Ethernet IEEE802.3 specification, in order to adapt the data packet 603 to a standard Ethernet transmission infrastructure. In this calculation, some values are inverted for calculating the checksum. The CRC checksum 602 is the only error check that takes place during the entire transmission. In this way, computing time can also be saved.

In the following, the reception of user data 507, 507' is described.

Reception of a message packet 1100 from the common medium 102 takes place in accordance with the transmission of the message packet 603 described in the figures FIGS. 5 and 6, in the reverse order.

In a simple case, the MAC addresses of the Ethernet header 511 are not evaluated, because they are merely filled with the broadcast addresses, in order to guarantee further processing in an external switch, which might be used in the medium 102. An evaluation of the addresses does not take place within the interface apparatus 103, 107, and the interface apparatus 103, 107 reacts to all the incoming messages without looking at the addresses. In another case, in which the MAC addresses of the Ethernet header 511 are filled with real addresses, these addresses are evaluated, so that only the addressed interface apparatus 103, 107 reacts, in each instance.

A data stream is consequently either always passed on to the interface apparatus or passed on because agreement of the addresses was determined. When a data stream arrives by way of the Ethernet bus 102 and is passed on to the interface apparatus 103, 107, it first reaches the transmission register 203. The presence of a data packet is signaled to the transmission and reception buffer 200a, and a received data packet is written into the reception buffer 200a2. The reception buffer 200a2 is connected with the media-independent interface 202. The reception buffer 200a2 is the first unit of the interface apparatus 103, 107 that comes into contact with the received message. According to the data packet 603, the received message contains a preamble 600 of the Ethernet protocol and a SFD of the Ethernet protocol, which the reception buffer 200a2 removes before the rest of the message, i.e. the MAC addresses, the CRC checksum, the type field 512 of the command/response protocol, and the user data are written into the reception buffer 200a2. The Ethernet preamble 600 is essentially removed during reception, and the first word that gets into the reception buffer 200a2 is the MAC target address from the Ethernet header 511.

The reception buffer 200a2 is implemented as a buffer FIFO, by means of a BRAM or block RAM. The reception buffer 200a2 has a size that is suitable for storing the entire Ethernet packet without Ethernet preamble 600 and without SFD, and, in this connection, for taking the maximally possible total length of the Ethernet packet into consideration. The size of the reception buffer 200a2 amounts to 2 kbytes, in one example, and thereby does not differ from the size of the send buffer 200a1. The two memories 200a1, 200a2 are over-dimensioned for Ethernet packets. Generally, the BRAM memory is plentifully present on a FPGA. The reception buffer 200a2 works asynchronously, like the transmission buffer 200a1. Asynchronous behavior can be reproduced by a BRAM. On a FPGA, BRAM is essentially the only mass memory that can be used effectively. For this reason, the BRAMs of the FPGA are also used for implementation of the asynchronously operated memories 200a1, 200a2 for clock pulse adaptation.

Similar to the way in which the transmission buffer 200a1 is operated by the transmission clock pulse 700a, the reception buffer 200a2 is driven by the reception clock pulse 700b, which is derived from the second interface 105, 110. The transmission clock pulse 700a and the reception clock pulse 700b can be referred to as a second clock pulse 700a, 700b. This means that the data that come from the bus 102 are written to the reception buffer 200a2 with the bus clock pulse 700a. However, reading out of the buffer 200a2 takes place with the system clock pulse 701 of the interface apparatus 103, 107, which can correspond to the clock pulse of the host device 106, 108 and can have a higher frequency than the bus clock pulse 700a.

The reception buffer 200a2 is read out with the system clock pulse 701. Because input and output of the memory 200a2 are operated at different clock pulse rates, the form of the operation of the data buffer is referred to as asynchronous operation. Also, data are written into the reception buffer 200a2 with a width of 4 bits, while the data from the reception buffer are read out in the direction of the serial/parallel converter 201a at 8 bits. The data are received serially by the medium 102, i.e. on the media side of the MII 220, and converted into parallel data having a width of 4 bits, and passed on to the MII or GMII interface 202. The MII or GMII interface 202, however, does not buffer the data having a width of 4 bits, and therefore 4-bit words are automatically lost, if they are not taken up by the reception buffer 200a2.

The system clock pulse or the first clock pulse 701 of the first interface 104, 109 is the clock pulse with which the control logic 201 or the resource management device 201 is also operated. The reception buffer 200a2 is also operated by a FSM, which is specifically set up for operation of the reception buffer 200a2. The FSM of the reception buffer is also part of the resource management device 201. This control FSM of the reception buffer receives a message from the MII interface 202, called a Write Enable Flag, with which the MII interface 202 informs the reception buffer 200a2 or the FSM that manages the reception buffer that a message can be picked up from the transmission register 203. A wait occurs until not only the preamble but also the SFD arrives, before the data packet made available or received, or the received data packet from which the preamble 600 and the SFD 601 have been removed, is written into the reception buffer 200a2. In other words, the preamble 600 and the SFD 601 are cut off before reception.

The data packet placed into the reception buffer 200a2 therefore has only the MAC addressing, the Ethernet length of the packet, the CRC checksum, and the user data. As soon as the FSM that is responsible for control of the reception buffer 200a2 recognizes reception of the SFD within the data stream that has just been written, it activates a timer from the plurality of the timers 201d, 201h. Furthermore, the CRC value of the received data packet is calculated and compared with the CRC value of the data packet that was sent along with it. The CRC value of the data packet is appended to the Ethernet payload. If errors are recognized when checking the checksum, this is signaled with external triggers at locations outside of the FPGA 103, 107, for example at a host controller or at a host device 106, 108. In the case of an error, the entire packet is rejected, and the triggers that have already been started are stopped. However, no packets are repeated. In case of an error, an error bit is set in the status word 1102 of the receiver, with which the BC is informed of the error situation. The checksum of an incoming message is calculated with a CRC device, just like the checksum of an outgoing message; this device is not shown in FIG. 6. The CRC device 201g for the transmission buffer and the CRC device for the reception buffer use the same code. For the reception direction and the transmission device, however, separate exclusive instances are provided for avoiding blocking and double allocation.

As soon as the MII interface 202 signals, for example by way of a low level of a write enable signal, that the entire packet has been written into the reception buffer 200a2, the FSM that is provided for managing the reception buffer 200a2 ensures that the reception buffer 200a2 is read out by the next stage or by the next submodule. The reception buffer 200a2 is taught by means of the read-out, in order to create room for further reception packets in the reception buffer 200a2. The CRC checksum is still read out, but is not used further by the reception UART that works parallel to the transmission UART 201e. The delay that occurs as the result of the read-out is negligibly small, because of the far higher clock pulse frequency of the first clock pulse 701 as compared with the clock pulse frequency of the second clock pulse 700a, 700b. In order to start the timer for the response time, a logic must first recognize a command word 1100 as such. Before the identification byte, i.e. the 3-bit-wide type identifier 512, can be read out, a time difference elapses, which is taken into consideration by the threshold value of the response timer. However, it is not always necessary for the complete preamble 512 or the complete header 512 to be passed on for the command/response method. This means that the fixed difference in the timer is not always correct. For this reason, it can happen that the response timer emits the response up to 20 ns too late. This is tolerable at a response time of 4-12 µs, which is predetermined in avionics applications.

The response time of 4-12 µs or a time-out of 14 µs can meet the requirements of the time behavior in a MILBUS; in the case of EFEX, the response time could be selected from the range of 6-9 µs. However, clearly shorter response times could also be adhered to.

Figure 7:
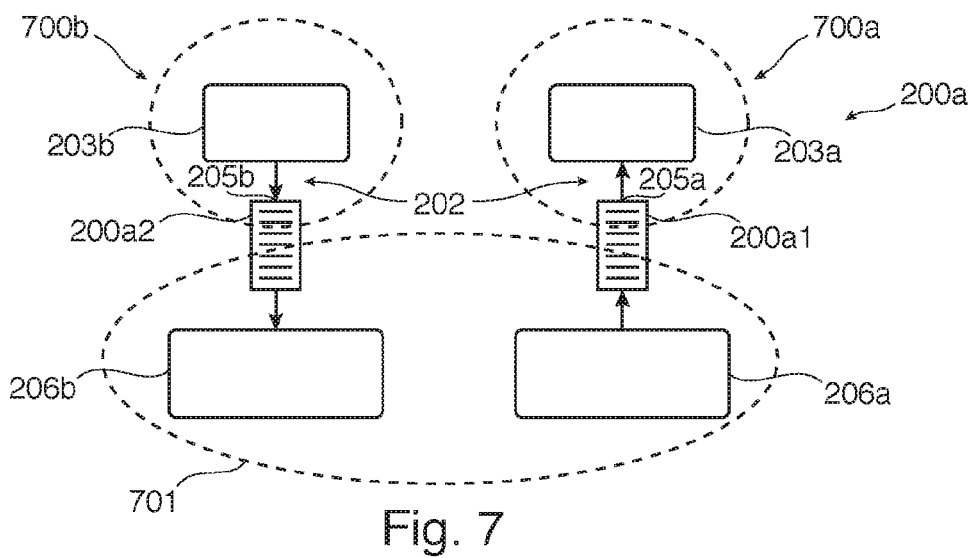

FIG. 7 shows an enlarged block schematic of the transmission/reception buffer 200a according to an exemplary embodiment example of the present invention. The reception port 205b of the reception buffer 200a2 is connected with a reception conversion port 203b of the transmission register 203, and the transmission port 205a of the transmission buffer 200a1 is connected with the transmission conversion port 203a of the transmission register 203. The transmission conversion port 203a and reception conversion port 203b are responsible for 4-bit/8-bit conversion between the medium and the interface apparatus. Furthermore, the reception conversion port 203b cuts off the preamble 600 and the SFD 601 in incoming messages. The transmission conversion port 203a and the reception conversion port 203b are part of the media-independent interface 202a. The FIFOs 200a1, 200a2 are dual-port memories.

The transmission rate of the media-independent interface 202, just like the reception rate, amounts to a value of 100 Mbit/s and allows the interface apparatus 103, 107 to derive the transmission clock pulse 700a or the reception clock pulse 700b from the media-independent interface 202. A GMII 202 is generally present as a media-independent interface 202. However, this interface 202 is essentially operated only with 100 Mbit/s. If the media-independent interface 202 is supposed to be operated as a real GMII interface with a higher clock pulse rate, the second clock pulse 700a, 700b must be specially generated by the interface apparatus 103, 107, and cannot be derived from the physical layer of the Ethernet, particularly not from the network controller 204. For operation on a real GMII interface 202, the interface apparatus 103, 107 therefore has a clock pulse generation device.

The transmission register 203, 203a, 203b can also be implemented, for example, on the network controller 204. The network controller can be implemented as an IC (Integrated Circuit) and can drive the physical layer of the transmission bus 102. This IC and particularly the media-independent interface 202 including transmission register 203, 203a, 203b work with 4-bit commands. The transmission port 203b and the reception port 203a of the media-independent interface 202 are situated in a common clock pulse domain 700a, 700b, just like the transmission port 206b of the reception buffer 200a2 and the reception port 206a of the transmission buffer 200a1 are situated in a common clock pulse domain 701. The different clock pulse domains are represented, in FIG. 7, as the network controller clock pulse domain 700a, 700b and the system clock pulse domain 701. The two clock pulse domains 700a, 700b, on the one hand, and 701, on the other hand, are separated from one another by the transmission buffer 200a1 and by the reception buffer 200a2, respectively.

Hard real-time requirements (hard Real-Time) are set for the transmission and reception buffers 200a1, 200a2 and the ports 203a, 203b of the media-independent interface 202, in order to prevent data from being lost. In other words, while the physical layer of the Ethernet can pass on the received data words by way of the (G)MII interface 202, no checking takes place, when they are passed on, as to whether the system 103, 107 on the other side of the GMII 202 is ready to accept the data. If sufficient capacity for the data is not present, the data are lost. It must therefore be guaranteed that the FPGA logic 201 can receive all the data words that are offered to it by the GMII 202. If a single one of the 4-bit words of a reception stream is lost, the entire reception frame is destroyed because of the invalid CRC, which is calculated over several of the 4-bit words. This also holds true for padding bytes without entropy. If a 4-bit word of a data packet is lost, then the entire message would have to be discarded, because of the incorrect CRC value.

To ensure real-time behavior, overflow of the reception buffer 200a2 or of the reception FIFOs 200a2 should therefore be avoided. In order to avoid an overflow, the size of this buffer 200a2 is selected to be at least so large that in the reception direction, room can be provided for an entire Ethernet packet, without preamble and without SFD.

Because the preamble 600 and SFD 601 are already present in the FIFO during transmission, the transmission buffer 200a1 could be selected to be correspondingly smaller. However, in one example the transmission buffer 200a1 could be selected to have the same size as the reception buffer 200a2. In another example, the transmission buffer 200a1 and the reception buffer 200a2 can be compiled in such a manner that more than the minimally required memory space is available. The transmission buffer 200a1 and the reception buffer 200a2 are implemented as block RAM, in order to provide sufficient space.

Because a plurality of block RAMs (BRAM) that can be configured for asynchronous operation are present on a FPGA, dual-port asynchronous block RAMs are used for most memories of the temporary memory device 200.

A valid received Ethernet packet is recognized in the reception buffer 200a2 by the related FSM, and passed on by way of the port 206, 206a, 206b of the serial/parallel converter 201a, which is connected with the transmission and reception buffer 200a. The control data, for example data for addressing a command word 1100 or data that indicate the length of a data word, are parallelized for identification. If necessary, afterward user data are processed further byte by byte. However, the entire Ethernet message is not parallelized.

The serial/parallel converter 201a or transmission and reception converter 201a is also split up into a transmission part and a reception part. The reception part of the serial/parallel converter 201a filters the data packets made available by the transmission/reception buffer. During the filtering process, the identifier of a received packet, which is comparable to the identifier 512 of a packet to be transmitted, is examined, and it is recognized whether the content of the received packet is, in fact, a command/response packet. If the packet content is not a valid command/response packet, these invalid packets are discarded for performance reasons. For example, invalid packets can come about because other Ethernet packets can also be distributed on a bus, which packets are then also passed on within the FPGA 103, 107. Invalid packets can occur if the interface apparatus 103, 107 is operated on a medium on which other devices such as network nodes or switches are also being operated. These often exchange Data Link Layer messages, i.e. messages on layer 2.

The messages that were recognized as belonging to a command/response protocol are divided up into the corresponding categories as command 1100, status datum 1102 or data 1101, on the basis of the type identifier 512. Commands and status messages are parallelized in the serial/parallel converter on the reception side. These control data are written into a parallel register, byte by byte. When all the bytes of a command word have been received, the complete command frame 1100 is evaluated and the content is passed on to higher logic units, which lie outside of the serial/parallel converter 201a. In this connection, a higher logic unit can mean a logic unit or FSM that is situated behind the serial/parallel converter in the reception direction, in other words, for example, a BC FSM 201c or RT FSM 201b. To pass on a received packet to a RT and to make the user data available to a host device 106, 108, the reception part of the serial/parallel converter 201a, for example, is connected with the RT FSM 201b, by way of the interface 208a, 208 shown in FIG. 3. The reception of user data was already discussed, in part, in the description of FIG. 3.

Reception of a message of a specific message type is passed on to higher layers by means of assigned flags. Such flags can be signaled to a RT 201b, for example, by way of the control port 305. Depending on the recognized type of the message 1100, 1101, 1102, different lines are used for transfer. Thus, the RT FSM 201b receives user data by way of the line 304r and commands by way of the command input 303. The command input 303 and the data line 304r are locally separated.

The presence of a message in the serial/parallel converter 200a can occur after reception of the complete message. The serial/parallel converter 200a reads the CRC checksum out but does not use it any further. The serial/parallel converter 200a essentially reads the CRC checksum out only to empty the FIFO 200a2. In the case of commands or status messages of the command/response protocol, the presence of a packet can already be reported before the end of the complete Ethernet frame. This is also possible in the case of short messages. The data field of an Ethernet frame, as described for FIG. 6, contains the type field 512 as user data and the packet 507 to be transmitted, in other words either a command 1100, status datum 1102 or the pure user data 1101. A command 1100 and status data 1102 have a fixed length of 20 bits including the type field 512. An Ethernet data field, however, has at least a length of 46 bytes, so that in the case of a command 1100, a status datum 1102 or of very short user data 1101, 507', a large part of the Ethernet data are filled with padding data, in other words contain data that are not used any further. Short user data are, for example, user data that are shorter than about 46 bytes. Consequently, during reception of short user data, particularly during reception of status data 1102 or commands 1100, there is no need to wait until the entire Ethernet data have arrived. Instead, as soon as only padding data are received, the received packet can be passed on to the next submodule, for example the RT FSM 201b or the BC FSM 201c, before the end of the Ethernet data.

Reception of the data can continue in parallel with passing on the already received prior command/response packet. The reception process can also be broken off, however. In other words, a reaction can take place before all the padding data of a command word 1100 have been received. In one example, therefore, even shorter Ethernet frames can be generated, particularly if status data or commands are being transmitted. In this manner, the padding data, which produce overhead, can be avoided. However, when using short Ethernet frames, there might not be any COTS compatibility with existing hardware. Overly short Ethernet frames are rejected by a COTS switch. Also when using a COTS hub, a collision could be caused within the hub, because the beginning of a data word 1101 could collide with the end of a command. In a correspondingly adapted infrastructure, and particularly when using switches or hubs that are also adapted to the short packets, an additional performance gain could be achieved.

Therefore the entire Ethernet frame including padding data does not have to be written into the serial/parallel converter 201a before the presence of the packet is signaled. By means of early transfer, the response time for commands and status data can be reduced as compared with a solution in which the padding data would also be evaluated. In general, the entire system reacts to incoming messages before all the padding bits were received. The respective response, for example as a data word to a command word or as a status word to a data word, is written into the transmission buffer 200a1 and held there until the response time has been reached, for example until the response time for a MILBUS and/or for an EFEx network has been reached. By means of the proposed implementation of the interface apparatus with FPGA logic 201, the response times required by the MILBUS or EFEx standard can be reduced by a multiple.

The data messages are passed on by the reception buffer 200a2, by way of a native FIFO interface 206a. In the opposite direction, data that are written into the transmission buffer 200a1 are received by way of the native FIFO interface 206. A "native FIFO interface" refers to the simplest FIFO interface that is present on a FPGA. A native FIFO interface has a parallel data path as an input, a signal for the validity of the data, and a clock pulse. As an output, a native FIFO has a signal that indicates that the FIFO is ready to accept new data.

By means of providing a separate transmission buffer 200a1 and reception buffer 200a2 or a transmission serial/parallel converter and a reception serial/parallel converter, which are each operated by separate, independently working FSMs of the resource management device 201, collisions of time-critical user data that move in different directions through the transmission and reception buffer 200a and/or through the serial/parallel converter 201a can be avoided.

In the interface apparatus 103, 107, it is therefore provided, by means of the deterministic design, that neither collisions of different time-critical user data that move in the same direction come about. Nor that collisions of different time-critical user data that move in opposite directions come about.

The reception part and the transmission part 201e of the serial/parallel converter 201a each use a sequential one-dimensional FSM. By means of the use of a one-dimensional FSM, the transmission UART FSM 201e or transmission part 201e differs from the other submodules of the resource management device 201. The use of a FSM at this location in place of a memory creates homogeneity of the structure of the FPGA 103, 107.

If the FPGA 103, 107 is operated on a bus infrastructure, then messages that are exchanged by COTS Ethernet nodes and switches are also received by the interface 205, 205a, 205b. These packets represent valid Ethernet packets. In order to avoid collisions with the user data, MAC address filters are used, in order not to react to just any packet, by means of filtering MAC addresses. This filtering of the MAC addresses takes place in the FSM responsible for the reception direction, within the serial/parallel converter 201a. Then the length of the received message is evaluated. The first byte of the payload, particularly the first 3 bits, contain the type of the message, wherein the bit pattern 001 stands for a command, the bit pattern 010 stands for data, and the bit pattern 100 stands for status data. If a message does not have any of these three message types, the message is discarded, in order not to waste unnecessary time with evaluation of a packet that does not belong to the command/response protocols.

If, however, a message is successfully received, it is assigned to one of the three message categories of command word, status message or data. After recognition of a complete message, the event that a valid message is present in the reception serial/parallel converter of the serial/parallel converter 201a can be reported to a higher layer or a subsequent layer, in the reception direction, such as, for example, a BC FSM 201c or a RT FSM 201b, by way of a native FIFO interface.

This message, received as being valid, is then passed on as a function of the type. A valid data message 1101 is passed on to the RT FSM 201*b* by way of the reception line 304*r*, and then to the message buffer 200*b* and the host device 106, 108.

A valid command 1100 is passed on to the command input 303 of the RT FSM 201*b*.

A RT recognizes a transmission error, for example because no data are received, because the data are interrupted or because the physical bit pattern is disrupted, in other words the CRC checksum is not correct.

If no status word is received within an expected response time, the BC can determine that data transfer is not functioning.

If the status word is received, the reception also confirms that the RT or device involved, particularly the avionics component 120, is fundamentally able to send or receive correct data.

A status word 1102 contains several flags or bits that indicate error states of the device. However, error states of the data bus 102 are essentially not signaled by the status word 1102. An example of a flag of the status word is the "busy" flag, which is transmitted to signal that a device cannot yet make valid data available, after it has been turned on or after a reset. If, however, there are defects in the avionics component 120 and therefore the transmitted data cannot be used, the "subsystem" flag is used. Such a case can occur if a sensor, such as an altimeter, for example, is defective in an avionics component.

FIG. 8 shows a block schematic for a memory access control device according to an exemplary embodiment example of the present invention. Whenever access to a single-port memory is to take place with two independent actors, the question as to access regulations arises. A single-port memory has only a single port 803, by way of which write accesses and read accesses take place. Such a memory access control device 802 occurs when accessing the message buffer 200*b* or the expansion memory 200*e*. Physically, essentially every memory is a single-port memory. The logic that is shown in FIG. 8 multiplexes two actors that are connected with the real-time connector 801 and with the host connector 800. The actor at the real-time connector 801 can have higher requirements regarding the maximal reaction time than the other actor at the host connector 800. These actors can, for example, be a host device 106, 108 and a command/response logic 201 (both not shown in FIG. 8), which wish to access a single memory 200*e*. Because of the possibility of joint memory access, this access must be synchronized in order to avoid collisions. The memory access control device 802, which can be part of the resource management device 201, manages exclusive access to the memory 200*e* when both components 106, 201 wish to access the DDR 3 RAM 200*e* from two sides at the same time. The memory access control device 802 segments the accesses from the outside, for example from the host connector 800, to the memory 200*e*. The host device 106 may not have to adhere to any hard real-time requirements. In particular, the host device 106 may have to adhere to real-time requirements that do, however, allow greater permissible reaction times than the reaction times that the Command/Response logic 201 or command/response logic 201 must adhere to. The host device 106 is connected with the host connection line 800. The Command/Response logic 201, for example the RT FSM 201*b*, must meet real-time requirements and is connected with the real-time connector 801. The memory access control device 802 ensures that the single memory 200*e* can be accessed from the two sides 800 and 801.

In the case of memory access, a distinction has to be made between two variables. On the one hand the latency for the access, and on the other hand the bandwidth. In this connection, the latency indicates how quickly data are made available after a query. In this connection, the bandwidth indicates how many data per time unit are made available. The latency is linked with a reaction time of the memory to a read/write signal and is a measure of the inertia of the memory. The single-port memory 200*e* can be a DDR 3 RAM. A DDR 3 RAM has a rather high latency, i.e. it reacts rather sluggishly to query commands. However, a DDR 3 RAM offers a large transmission bandwidth, once access has been granted.

If two read accesses to the memory 200*e* are carried out from the two sides 800, 801, in other words, for example, by a host device and the command/response logic 201, the real-time query on the side 801 is given priority. No high real-time requirements are set for the host connector 800. The maximal latencies on the side of the real-time connector 801, i.e. in the direction of the command/response logic 201, are lower than the latencies on the side 800 of the host device. The host device does not necessarily have to be real-time-critical. The RT of the command/response logic 201 at the real-time connector 801 is time-critical, however. The maximal reaction time that must be adhered to at the real-time connector 801 by the command/response logic 201 is on the order of 4-12 µs. Typical avionics systems can allow themselves repetition times or cycle times on the order of double-digit ms. The cycle time is influenced by the reaction time if the boundaries of the predefined reaction time or of the timeout are not adhered to. Even if this barrier is significantly broader, this is still a hard real-time system. Exceeding the maximal cycle time—even if it is comparatively high—must be equated with failure or at least a malfunction of the avionics system. An interface apparatus designed in accordance with the invention can prevent such a malfunction. In spite of the large time ranges for the cycle times of the avionics components, the strict boundaries described exist for the response time of the interface apparatus, because many further data transfers can take place within the cycle time, for example for other devices.

Once the priority for the real-time queries on the side of the real-time connector 801 has been established, the high transmission bandwidth of the memory transmission must be utilized, if possible, and the available data must be read in out of the memory, although perhaps they cannot necessarily be processed further directly after the query. In order to allow temporary storage of the queried data, the real-time buffers 200*i* are used for temporary storage. These real-time memories 200*i* are filled, one after the other, until the access has been concluded. As soon as the real-time memories 200*i* are filled, the host device is allowed access to the memory on the host side 800, in order to prevent the host device from "starving" ("Starving""). In this connection, "not starving" can mean that the host device, which is connected with the memory access control device 802 by way of the host connector 800, is not completely cut off from the data stream even in the case of longer accesses of the higher-priority access of the command/response logic by way of the real-time connector 801. "Starving" can occur during multiplexing with different priorities.

The two actors 106, 201 that are connected with the memory access control device 802 have different but nevertheless real-time-critical latency, with which they access the common memory component 200*e*. On the side of the real-time connector 801, a FPGA logic 201 is connected, the latency of which lies in the range of 6 µs. On the other side, i.e. on the side of the host connector 800, systems 106 are connected, the maximal real-time latencies of which lie more than 1000 times above that or that have no real-time requirements. These systems are also connected with the memory access control device 802 by way of the host connector 800 and the first interface 104, 109 (not shown in FIG. 8). For the host interface 800, the multiplex method is supposed to ensure that the disruptive influence caused by an access by the real-time connector 801 to the access bandwidth of the system is as slight as possible at the host connector.

By means of the architecture shown in FIG. 8, the need of the real-time connector 801 for data can already be satisfied if only one of the partial buffers 200*i* has been filled. Satisfaction of the need for data from the partial buffer 200*i* lowers not only the access time on the part of the real-time connector 801 but also the waiting time that an access by way of the host connector 800 experiences.

Particularly for simulation purposes, it can be practical to implement a plurality of BCs and/or RTs on one and the same FPGA 103, 107, i.e. to create an interface apparatus 103, 107 with a plurality of BCs and/or RTs.

However, since data that were transmitted by way of an output interface 202 is not reflected back to the same output interface 202 in an Ethernet network 102, the transmitted data can no longer be received by another component that are connected to the same output interface 202. In order to nevertheless be able to carry out the desired simulation with multiple command/response components 201*b*, a special measure for transmission and reception of data must be provided. To reflect the data, a loop-back device or a loop-back buffer 200*j* can be used.

FIG. 9 shows a block schematic of a protocol processing device 201*a*, 201*b*, 201*c* having a loop-back buffer 200*j* according to an exemplary embodiment example of the present invention. A component of the resource management device 201 that is involved in the processing of the transmission protocol and/or of the command/response protocol is referred to as a protocol processing device 201*a*, 201*b*, 201*c*. The reception buffer 200*a*2 is directly supplied by the MII interface 202 of the Ethernet controller 204. The loop-back buffer 200*j* is connected with the second interface 105, 110 of the interface apparatus 103, 107. In particular, the loop-back buffer 200*j* is linked with the transmission FIFO 200*a*1 and with the reception FIFO 200*a*2. The loop-back buffer 200*j* is connected with the native FIFO ports 206*a*, 206*b*, which both belong to the system clock pulse domain 701. In contrast to the reception buffer 200*a*2 and the transmission buffer 200*a*1, the loop-back FIFO 200*j* does not have to transfer any data between different clock pulse domains 700*a*, 700*b*, 701. For this reason, a synchronous FIFO 200*j* can be used for implementation of the loop-back buffer 200*j*. The loop-back buffer 200*j* is part of the interface apparatus 103, 107 and, for example, implemented on a common board or on a common FPGA. The loop-back buffer 200*j* shares the FIFO ports 206*a*, 206*b* with the reception buffer 200*a*2 and with the transmission buffer 200*a*1. If a message is written into the reception buffer 200*a*2, this message is automatically passed on to the reception serial/parallel converter (not shown in FIG. 8).

The protocol logic 201*a*, 201*b*, 201*c* is operated by a single clock pulse source. Installation is simple on the transmission side 200*a*1, because the output data only have to be passed on to the loop-back buffer 200*j*, in addition to being transmitted to the bus 102. If a new message from the protocol-processing logic 201*a*, 201*b*, 201*c*, which essentially has the serial/parallel converter 201*a*, the RT FSM 201*b*, and the BC FSM 201*c*, is sent to the transmission medium 102 by way of the transmission buffer 200*a*1, the signals are copied from the native FIFO interface 206*a* into the loop-back buffer 200*j*. For copying, the FIFO port 206*a* doubles the signals. One instance goes to the transmission buffer 200*a*1, the other instance goes to the loop-back buffer 200*j*. The loop-back FIFO 200*j* possesses a sufficient size to accommodate an entire Ethernet packet including preamble 600 and SDF 601.

Because undesired collisions can occur if data are simultaneously received by way of the loop-back buffer 200*j* and the reception buffer 200*a*2, the task arises, on the reception side 200*a*2, of creating a solution that can handle such a situation. The data are made available by the Ethernet interface asynchronously and thereby in non-predictable manner, while the loop-back buffer 200*j* returns a local message to the protocol logic 201*a*, 201*b*, 201*c*. In order to resolve the collisions that might occur, the loop-back buffer 200*j* and the transmission buffer 200*a*2 are activated one after the other. By means of this alternate activation, it can be guaranteed that both buffers, the loop-back buffer 200*j* and the reception buffer 200*a*2, receive data from available messages.

The signals from the loop-back buffer 200*j* and the reception buffer 200*a*2 are passed by way of an OR logic and brought together in the FIFO port 206*b*. While they are combined, the loop-back buffer 200*j* and the reception buffer 200*a*2 are started by the UART 201*e* as soon as the response timer for transmission of a message has expired. However, because the messages also arrive at different points in time due to the delayed transmission of the messages and because of the structure of the command/response protocol, in other words because of the time behavior of the command/response protocol, collisions of messages that come from the loop-back buffer 200*j* and from the reception buffer 200*a*2 are prevented. In an error-free case, collisions are avoided.

Delayed transmission of the messages leads to alternating reception. During alternating reception, the rule is applied that the FIFO 200*j*, 200*a*2 that signals an available message first is served first. If the unusual case were to occur that both FIFOs 200*j*, 200*a*2 can, in fact, make a valid message available at the same time, e.g. at the same clock pulse flank, the loop-back FIFO 200*j* is served before the reception buffer 200*a*2. The time penalty that results from the time-offset processing is low, because the loop-back FIFO 200*j* works at a higher clock pulse rate, the system clock pulse 701, than the input 205*b* of the reception buffer 200*a*2, which is operated at the network clock pulse 700*a*, 700*b*. However, the simultaneous occurrence of messages is a theoretical case, because it is ensured, by means of the command/response protocol and the bus controller, that deterministically only one planned communication between the individual subscribers can take place.

The interface apparatus 103, 107 has a loop-back engagement device with which the loop-back buffer 200*j* can be turned on and off. In one example, this loop-back engagement device acts on copying of the output data. A mechanical switch can be provided as a loop-back engagement device. The loop-back engagement device can alternatively be switched also by way of the configuration register 200*d*, with which the configuration of the number of simulated BCs and/or RTs is also determined.

A PLB bus (Processor Local Bus) or a PCIe bus (Peripheral Component Interconnect Express), which are present in a FPGA, can be used to connect the host device 106, 108 by way of the first interface 104,109. In other words, the first interface 104, 109 can be configured as a PLB bus or as a PCIe bus.

Figure 10:
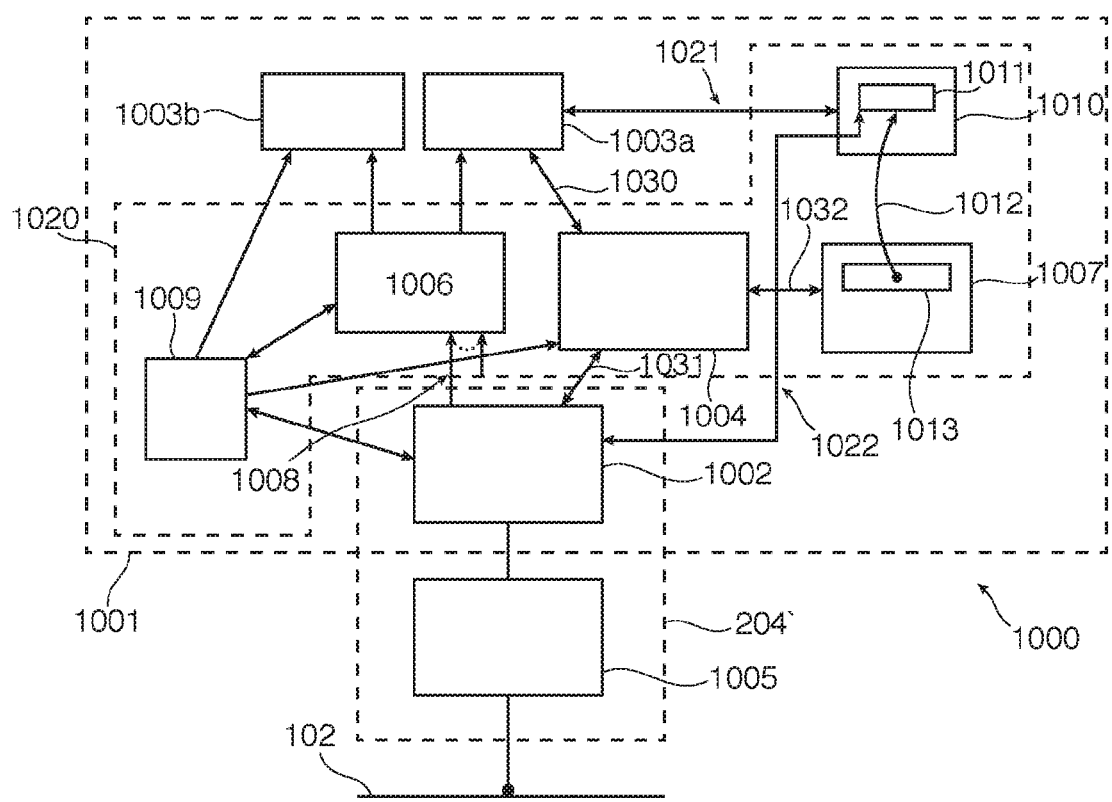

FIG. 10 shows a block diagram of an interface apparatus having an event evaluation device according to an exemplary embodiment example of the present invention.

An avionics component 1000 can be implemented on a single multi-core microcontroller board 1001. The multi-core microcontroller board 1001 has an Ethernet controller 204' and a plurality of computer devices 1003*a*, 1003*b*. The Ethernet controller 204' can involve access provided on the multi-core microcontroller board 1001 for configuration of the avionics component 1000, for example a management port. However, the Ethernet controller 204' can also be present only because the (multi-core) microcontroller used keeps one or more Ethernet controllers available on-chip as standard equipment and these are not used by the avionics application. The Ethernet controller 204' has an event generation device 1002 or an interrupt generation device 1002 and a physical layer 1005.

The avionics component provides a specific avionics function, which is performed by avionics software. The avionics software is loaded onto one or onto a plurality of the computer devices 1003*a*, 1003*b*. An avionics component 1000 is a component required for operation of an aircraft, which can also be part of a subsystem in an aircraft. For example, the avionics component can be a GPS (Global Positioning System), radar or other sensors that act in a friend/foe recognition system of the aircraft. The avionics component then performs its specific function within the avionics. Further possible functions from the area of flight control are engine and rudder controllers. An air-conditioning function, for example, is less time-critical.

The actual function of the avionics component 1000 is thereby determined mainly by the application-specific software loaded onto the computer devices 1003*a*, 1003*b* or the processors 1003*a*, 1003*b*. This application software ensures that the avionics component 1000 can perform the avionics function assigned to it. To run the application software, the avionics component can use hardware—in the form of an individual one or any desired number of the computer devices 1003*a*, 1003*b*—and system software, such as, for example, communication software. The selected number of computer devices 1003*a*, 1003*b* is generally dependent on the computer power required or the reliability demands on the avionics component.

In order to be able to load the avionics software onto the avionics component or in order to configure the avionics component and to be able to react to configuration data, the computer devices 1003*a*, 1003*b* or the computer cores 1003*a*, 1003*b* are connected with the event generation device 1002 of the Ethernet controller 204' by way of an internal bus 1004, for example by way of a system bus 1004 or a crossbar switch 1004. The Ethernet controller 204' is also an integral part of the multi-core microcontroller board 1001. If data or messages from the medium 102 reach the Ethernet controller 204' by way of the signal adaptation device 1005 or the physical layer 1005, this presence of a message is passed on to the event controller 1006 or the event control device 1006 as an event.

After the Ethernet controller 204' has received a message or a frame and placed its user data into the memory device 1007, it generates an event signal 1008 or an interrupt 1008 using the event generation device 1002, with which the event of placing the user data into the memory device is signaled. These event signals are received by the event controller 1006 and can also be assigned to the component that generated the event.

Likewise, the avionics software can inform the Ethernet controller 204', via the internal bus 1004, that it has placed data into the memory device 1007, which data are to be transmitted to other components of the avionics system, for example to another interface apparatus.

During configuration of the avionics component, the configuration data to be transmitted, for example the configurations or the avionics software itself, are stored in the memory 1011, the working memory 1011 or the temporary memory 1011. From there, the configuration or the avionics software can be distributed to the corresponding targets.

During configuration, the real-time capability of the components is essentially not important. Therefore it is sufficient to inform the components involved in the configuration process of the presence of changed data in the working memory 1010.

The situation looks different if data or user data that are generated by avionics software running on one or a plurality of the computer devices 1003*a*, 1003*b* are generated or needed by it, for example are supposed to be exchanged with another avionics component, and the transmission medium 102 is supposed to be used for this purpose. If such a data exchange is supposed to be carried out, the real-time capability of the microcontroller boards 1001 is important.

To meet real-time conditions, for example to be able to meet hard real-time conditions, the presence of time-critical user data is recognized by an event evaluation device 1009. This device can be a dedicated software component that runs on one of the existing computer devices 1003*a*, 1003*b*. In one example, the event evaluation device 1009 can be a specific interrupt handling routine or an Interrupt Service Routine that runs on one of the computer devices 1003*a*, 1003*b*. In one example, as shown in FIG. 10, one of the computer devices 1003*a*, 1003*b* can be exclusively reserved for the event evaluation device 1009, so that is only responsible for the recognition and processing of event. The Interrupt Service Routine can, however, also run on a divided computer device 1003*a*, 1003*b*, which also fulfills another function. In this case, it must be analyzed whether the Worst Case interrupt latency is known and—measured according to the requirements of the command/response protocol—is sufficiently small. Likewise, it must be taken into consideration that in this case, the cache memory of the computer device, particularly the data cache, instruction cache, and address translation cache, is not filled with the data required for the command/response protocol, in order to avoid worsening of the Worst Case implementation time. In FIG. 10, the event evaluation device 1009 is shown as a dedicated and exclusively used component.

By means of the specific initialization of the event controller 1006 or of the interrupt controller 1006, which determines what the method of procedure shall be when an event of the Ethernet controller is present, the event evaluation device 1009 is activated and informed of the event. The event controller 1006 controls the computer devices 1003*a*, 1003*b* in such a manner that one of the computer devices breaks off all the tasks or computer operations it is performing, for example tasks that relate to implementation of the avionics software. It is precluded that the computer devices 1003*a*, 1003*b* provided for this purpose are kept busy with handling of any interruptions other than those required for processing of the command/response protocol. The computer devices 1003*a*, 1003*b* provided therefore exclusively process the events of the command/response protocol. In this way, it is guaranteed that at least one of the computer devices 1003*a*, 1003*b* is completely available for the event evaluation device 1009 after the occurrence of an event of the Ethernet controller, within a limited and sufficiently small interrupt latency time. The computer device 1003*a*, 1003*b* can then concern itself exclusively with the transmission task, without itself running the risk of being interrupted.

The event evaluation device 1009 can be specially configured software that organizes transmission of the user data. The event evaluation device 1009 is part of an interface apparatus 1020, which can form a specific module on the avionics component 1000. In another example, however, the event evaluation device 1009 can also lie outside of the interface apparatus 1020.

The interface apparatus 1020 can exchange data between a first interface 1021 and a second interface 1022. The first interface 1021 and the second interface 1022 can be the same or different ports of a memory 1010 and can have the memory 1010 or a memory region 1011. The interface apparatus 1020 has not only the event evaluation device 1009 but also the event controller 1006 and the bus or crossbar switch 1004. The interface apparatus 1020 can be formed by a specific configuration of the microcontroller board 1001, particularly by interconnecting components of the microcontroller boards 1001.

Event handling starts after the event evaluation device 1009 has reserved at least one computer device 1003*a*, 1003*b* and/or further components of the microcontroller board 1001, which are necessary for interrupt-free transport of the user data through the interface apparatus 1020, exclusively for user data transmission. The free computer device 1003*a*, 1003*b* can then handle the event of the event generation device 1002 on its own, without having to concern itself with further tasks. The event evaluation device 1009 also blocks attempts of other components to access the reserved resources while the user data transmission is being carried out. Because the computer device 1003*a*, 1003*b* alone is assigned to the event evaluation device 1009 by means of the interrupt signal 1008 of the event generation device 1002 of the Ethernet controller 204', this assigned computer device 1003*a*, 1003*b* handles only this interrupt of the Ethernet controller 204' and cannot be interrupted by other events 1008. In other words, the event evaluation device 1009 ensures that there is at least one computer device 1003*a*, 1003*b* that essentially concerns itself only with handling events of the Ethernet controller 204' and the actions triggered by them, which events occur in connection with the exchange of time-critical user data between the avionics software, which exchange runs in parallel on a different one than the computer device 1003*a*, 1003*b* assigned to the event generation device 1002 of the Ethernet controller 204', and which events occur on the medium 102.

Since the resources are exclusively reserved by the event evaluation device 1009, it is possible for a command/response protocol to be processed deterministically, in terms of time, on the dedicated computer device 1003*a*, 1003*b*. It can be assumed that the reserved resources guarantee adherence to the response times. At least the components used for processing of the command/response protocol, such as, for example, memory regions, processor-internal operating means, such as, for example, caches, entries in the memory management for address translation or computer-internal communication paths, for example bus systems, are reserved for this purpose. To carry out the command/response protocols, program code is loaded onto the dedicated computer device, for example the software for a BC and/or for one or more RTs. In a "Cache Warming" phase of initialization, the program code required for carrying out the time-critical functions is loaded into the caches. Afterward, the parts of the cache required for this purpose are frozen, so that the program code can no longer be moved elsewhere. In order to guarantee access to the data and to avoid problems with access to the data, the address regions used, for example address regions for the message buffer, can be placed outside of an existing cache in order to prevent the address regions from being stored in the cache and modified only there (cache inhibited). It is then possible to do without the use of a bus snooper, in order to avoid the reduction in the temporal determinism it induces. In order to prevent address translation data from being missing in the memory management (MMU: Memory Management Unit) and to prevent complicated reloading from becoming necessary due to the absence of the address translation data, the event evaluation device 1009 can be set up so that it already works on physical addresses. The use of physical addresses avoids address translation. A further possibility for improving temporal determinism in address translation consists in assigning the corresponding entries in the MMU, in the form of block address translation registers or page table entries, statically to the event evaluation device 1009. If a dynamic jump prediction is present in the computer devices 1003*a*, 1003*b*, the dynamic jump prediction can be deactivated, whereas the static jump prediction remains activated or is activated. The actual measures used can be any desired combination of the various measures to guarantee temporal determinism when accessing data and instructions.

Neither the communication paths 1030, 1031 between the computer devices 1003*a*, 1003*b* and the Ethernet controller 1002 nor the communication paths 1021, 1022, 1032 for access to the memory modules 1007, 1010 can be exclusively reserved in usual computer architectures. Therefore measures are necessary that guarantee a sufficiently short Worst-Case access time for accesses, both by the computer devices to the Ethernet controller and to the memory, and also by the Ethernet controller to the memory.

The need for action increases when using multiple computer devices and when using DMA (Direct Memory Access) mechanisms.

Possible measures can be use of a crossbar switch, use of sufficiently fast bus systems, use of a split-transaction bus protocol, careful use of write-posting mechanisms, prioritization of critical bus transfers, and limiting the DMA burst length:

When using a crossbar switch instead of a bus system, multiple computer devices can simultaneously access different memory devices or the Ethernet controller. A data transfer within the computer system does not necessarily block all the others.

When using sufficiently fast bus systems, increased access times can be avoided if a bus system is able to transmit the maximal sum data rate that can be produced by all the computer devices jointly.

The use of a split-transaction bus protocol can prevent a bus from being blocked and also not being available for other transfers. This is because high waiting times can be induced during a read access if the slave being addressed (e.g. memory or Ethernet controller) cannot make the requested datum available quickly enough. During this time, the bus is blocked and also not available for other transfers. This can be avoided if a read access is split up into two bus transactions—a read request and a read response. Between these transactions, other computer devices can use the bus.

Careful use of write-posting mechanisms can mean that if write commands are temporarily buffered—for example in order to increase the average throughput—for example in the bus interface of a computer device, then all the stored write transactions must be carried out ahead of a conflict-susceptible read access (for example to the same address region). This mechanism can induce very high transfer times, in individual cases.

In the prioritization of critical bus transfers, it is taken into consideration that operating means to be used exclusively, such as bus systems, must be assigned to the different requesters (computer devices and Ethernet controllers) within the scope of an arbitration process. If multiple requests are pending at the same time, then the arbiter must decide, by means of a suitable protocol, e.g. by means of a priority-based protocol, which request is to be served first. Suitable priority must be assigned to the bus accesses generated by the time-critical components of the command/response protocol.

In the limitation of the DMA burst length, it is ensured, not only in the user programs but also in the driver software, for example, that the DMA burst length stands in a suitable relation to the transfer time and to the bus bandwidth. This is because if large data regions are transmitted in non-interruptible DMA bursts or continuous DMA bursts, other potential users of the bus systems are locked out for a long time and therefore experience long bus access times.

In the following, it is assumed that the received packet is intended for a BC, for example if a status datum has been received. Therefore the BC software is loaded onto the dedicated computer device 1003a, 1003b. Processing of the BC software that implements the BC protocol takes place in an interrupt context, which is particularly characterized in that it can be entered into without the scheduling functions of the operating system and that further interrupt requests will not be served, i.e. that the interrupt context blocks further interrupt requests. In this example, the reaction time can be the time that elapses from arrival of the packet at the Ethernet controller until the point in time when processing of the packet has been exclusively assigned to a computer device. The reaction time to arriving messages, in the selected example the arriving status datum, therefore essentially depends only on the handling of the message by the hardware of the Ethernet controller 204', on the constant hardware running time of the interrupt signal 1008 of the event generation device 1002 to the event controller 1006, as well as on the implementation time of the event evaluation device 1009. Consequently, the time behavior until exclusive occupation of the event evaluation device 1009 is essentially deterministic.

After exclusive assignment of the event evaluation device 1009, processing of the communication software takes place, in other words, accordingly, processing of the BC software, processing of the RT software or processing of the software of a bus monitor. Deterministic processing of the communication software in the context of the event evaluation device 1009, in this example the BC protocol or the BC software, is guaranteed. For this purpose, the event evaluation device 1009 ensures that the processing of the BC cannot be interrupted by other events 1008. Access by the BC to required resources, for example to the buffer memory 1013 in the work memory 1007 and/or to the buffer memory 1011 in the work memory 1010, is possible within a deterministic and sufficiently small time span. The communication software is set up so that adherence to maximal time defaults is possible. For adherence to a time default, programming techniques that essentially prevent loops having an indefinite number of iterations can be used.

The avionics application software that makes the user data to be transmitted available by way of the first interface 1021 has already stored these data in transmission buffers 1011 or in the user data memory of an application memory 1010. Data consistency is ensured by means of alternating buffer mechanisms, even in the case of simultaneous write/read access (Producer/Consumer problem).

Different implementations of an Ethernet controller 204', particularly the event generation device 1002 of the Ethernet controller 204', can use a descriptor ring for the reception and transmission buffers. The event evaluation device 1009 now does not have to copy the user data made available by the avionics application software in the transmission buffers 1011. Instead, it places a pointer 1012 to the transmission buffer 1011 in a free descriptor entry 1013 and indicates, by means of meta-data in the descriptor and control registers in the Ethernet controller, that a new message is ready to be sent. The Ethernet controller then independently reads the user data out of the transmission buffer 1011 by means of efficient DMA mechanisms. When the data transmission has been completed, the descriptor entry used is marked as being free. The Ethernet driver of the Ethernet controller 204' is set up in such a manner that the data buffer is not released but rather stays in its designation as a transmission buffer, and the avionics application continues to be available. An existing Ethernet controller can be provided with an additional control device or programmed accordingly, in order to fulfill this functionality.

The BC protocol can therefore transfer the pointer 1012 to the event generation device 1002 of the Ethernet controller 204' without itself copying the user data from the transmission buffer 1011. Therefore time-consuming copying processes can be avoided. The DMA (Direct Memory access) mechanism of the event generation device 1002 of the Ethernet controller 204' takes the user data out of the transmission buffer 1011 by way of the second interface 1022 or the network-side memory port 1022 and hands it over to the transmission hardware 1005 or the physical layer 1005.

After exclusive assignment of the resources within the interface apparatus 1020 has been ensured, the command/response protocol used achieves malfunction resistance on the transmission medium. In a configuration procedure, collisions on the medium 102 do not play a significant role. In the transmission of time-critical user data, collisions bring about an uncertainty factor, which prevents deterministic behavior.

Because collisions can be excluded by means of the use of the command/response protocol, a simple structure of the physical layer, in other words of the physical components that ensure the actual signal transmission. This physical layer now no longer requires any collision detection and essentially has only driver and receiver modules, which can be designed to be malfunction-resistant so that they can be used for aircraft. Therefore the existing cabling can also be used in an aircraft at moderate transmission rates.

The use of the command/response protocol has thereby transformed a "Collision Detection" (CSMA-CD) protocol that can be implemented with commercially available hardware into a deterministic "Collision Avoidance" protocol.

If switches that use routing between the communicating subscribers are used, virtual separation of an overall network takes place. Such switches are used to increase the bandwidth by means of the simultaneous use of multiple communication paths and to avoid the collisions that occur in Ethernet networks, for example. By means of this virtual separation, however, testability of the overall systems is no longer possible, because it is required, within the scope of testability, that the entire traffic can be observed at one point.

When using a command/response protocol, it is ensured that always precisely one station is transmitting at the planned point in time, for example an avionics component 1000. Therefore the protocol can be operated in loss-free manner on a bus-based architecture 102. The use of hubs that reflect the data to other network segments is also possible. Both in a bus architecture and when using a hub, observation of the entire traffic is possible.

FIG. 11 shows the structure of three message types of a command/response protocol according to an exemplary embodiment example of the present invention.

Data packets have a sequence of bits with which data are transmitted. These bits are converted into a signal sequence, in accordance with the selected physical layers of the network controller 204, 204', which sequence can be transmitted by way of a medium 102.

A command 1100 or a Command 1100 of the command/response protocol used, with which a BC requests a RT to become active, has a bit length of 20 bits in the example. The 3 least significant bits 512 contain an identification of the subsequent 17 bits 507 as a command message. For example, the bit assignment "001" of the first three bits identifies a command. The bits 4 to 20 can correspond, for example, to the bits 4 to 20 according to MIL-STD-1553B for a command.

A user data packet 1101 or data 1101 of the command/response protocol used, with which a RT transmits user data to another RT, has a bit length of 20 bits. The 3 least significant bits 512 contain an identification of the subsequent 17 bits 507 as user data. For example, the bit assignment "010" the first three bits identifies user data. The bits 4 to 20 can correspond, for example, to the bits 4 to 20 according to MIL-STD-1553B for user data.

A status packet 1102 or status 1102 of the command/response protocol used, with which a RT transmits events of a data transmission to a BC, has a bit length of 20 bits. The 3 least significant bits 512 contain an identification of the subsequent 17 bits 507 as status data. For example, the bit assignment "100" of the first three bits identifies status data. The bits 4 to 20 can correspond, for example, to the bits 4 to 20 according to MIL-STD-1553B for status data.

FIG. 11 is correspondingly oriented according to the structure of MIL-STD-1553B. In a further embodiment, however, it can be provided that the processing is simplified, above all in the RT 201*b*, in that a full byte is reserved in the Ethernet frame, in the FPGA, for every field of a packet, according to the MIL-STD-1553B protocol. In other words, even if, for example, the reception address (Destination address) according to MIL-STD-1553B has a width of only five bits, it nevertheless fills a byte in the Ethernet frame. Because the minimal Ethernet length is achieved by means of padding when constructing a command and status word, this form of adaptation would essentially have no effect on the total length. The frame structure of data packets, however, always has the preamble 512 or the type designation 512 with a length of 3 bits and the subsequent user data 507, 507'.

Figure 12:
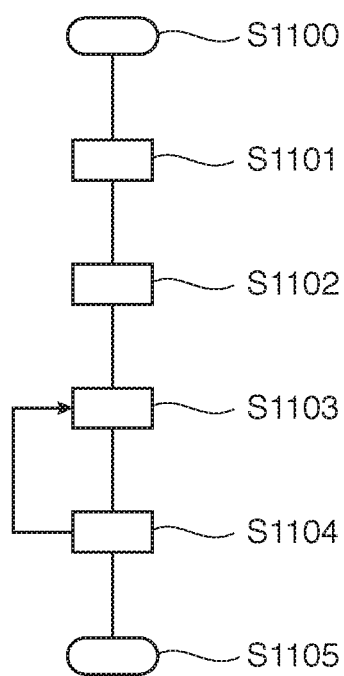

FIG. 12 shows a flow diagram for a method for exchange of user data according to an exemplary embodiment example of the present invention.

The method begins with a start state S 1100.

In step S 1101, a first interface of an interface apparatus is operated with a first clock pulse, and, independent of this, a second interface of the interface apparatus is operated with a second clock pulse that is different from the first clock pulse.

In step S1102, the first interface and the second interface are connected with a temporary memory device, in order to exchange different time-critical user data between the first interface and the second interface by way of the temporary memory device in step S 1103. This exchange of the different time-critical user data between the first interface and the second interface is controlled by means of a resource control device, in such a manner that collisions of the different time-critical user data within the interface apparatus and/or on a divided medium connected with the interface apparatus are avoided, in order to allow deterministic behavior during exchange of the different time-critical user data.

In step S1104, the different time-critical user data are temporarily stored, in such a manner that a clock pulse difference between the first clock pulse and the second clock pulse is balanced out.

If all the user data have not yet been transmitted, steps S1103 and S1104 can be repeated until all the user data have been transmitted.

After that, the method ends in step S1105.

Supplementally, it should be pointed out that "comprising" and "having" does not exclude any other elements or steps and that "a" or "an" does not exclude the plural. Furthermore, it should be pointed out that characteristics or steps that have been described with a reference to one of the above exemplary embodiments can also be used in combination with other characteristics or steps of other exemplary embodiments described above. Reference symbols in the claims should not be viewed as being a restriction.

The invention claimed is:

1. An interface apparatus for exchange of different time-critical user data between a host device and a divided medium, comprising:
    a first interface for exchange of the different time-critical user data with the host device;
    a second interface for exchange of the different time-critical user data with the divided medium;
    a resource management device;
    a temporary memory device;
    wherein the first interface works with a first clock pulse;
    wherein the second interface works with a second clock pulse, which differs from the first clock pulse;
    wherein the first interface and the second interface are connected with the temporary memory device, in order to allow exchange of the different time-critical user data between the first interface and the second interface, by way of the temporary memory device;
    wherein the resource management device is configured to control the exchange of the different time-critical user data between the first interface and the second interface, in such a manner that collisions of the different time-critical user data within the interface apparatus and/or on the divided medium are avoided, in order to allow deterministic behavior during the exchange of the different time-critical user data;
    wherein the resource management device is further configured to control the temporary memory device in such a manner that the different time-critical user data is temporarily storable, using the temporary memory device, in such a manner that a clock pulse difference between the first clock pulse and the second clock pulse is balanced out; and
    wherein the resource management device is configured to control the exchange of the different time-critical user data between the first interface and the second interface by way of management of a pointer to the first interface and/or to the second interface.

2. The interface apparatus according to claim 1, further comprising:
a time monitoring device;
wherein the time monitoring device is configured to monitor the time behavior of a command/response protocol in such a manner that the time behavior of the command/response protocol is adhered to.

3. The interface apparatus according to claim 1, wherein the resource management device is configured to fulfill at least one function of a command/response protocol, wherein the group of functions consists of:
working off a bus list;
recognizing a command message;
recognizing a preamble in a data packet;
evaluating a preamble of a data packet;
generating a preamble of a data packet;
generating a status message;
generating a data message;
generating a type field; and
monitoring the divided medium.

4. The interface apparatus according to claim 1, wherein the resource management device is configured to implement at least one command/response protocol selected from the protocol family MILBUS protocol, MIL-STD-1553B, EFA-BUS (European Fighter Aircraft Bus protocol), and EFEx (European Fighter Aircraft Bus Express protocol).

5. The interface apparatus according to claim 1, wherein the first interface has a user data memory and/or the second interface has a transmission register.

6. The interface apparatus according to claim 1, wherein the resource management device is configured to control at least a part of the temporary memory device as a First In First Out.

7. The interface apparatus according to claim 5, wherein at least two memories from the group of memories consisting of the temporary memory, the user data memory, and the transmission memory are partial regions of a common memory.

8. The interface apparatus according to claim 6, wherein at least two memories from the group of memories consisting of the temporary memory, the user data memory, and the transmission memory are partial regions of a common memory.

9. The interface apparatus according to claim 1, wherein the resource management device has an event evaluation device, which recognizes an event at the first interface and/or an event at the second interface, and assigns at least a part of a resource exclusively for the exchange of different time-critical user data.

10. The interface apparatus according to claim 1, further comprising:
a switch-over device;
wherein the switch-over device is configured to set the resource management device in such a manner that it works as at least one component of a command/response protocol, wherein the group of possible components consists of:
a bus controller;
a remote terminal; and
a bus monitor.

11. The interface apparatus according to claim 2, further comprising:
a switch-over device;
wherein the switch-over device is configured to set the resource management device in such a manner that it works as at least one component of a command/response protocol, wherein the group of possible components consists of:
a bus controller;
a remote terminal; and
a bus monitor.

12. An avionics component, comprising:
a host device;
an interface apparatus according to claim 1;
a media connection device;
wherein the host device is configured to carry out an avionics application;
wherein the avionics application generates and/or evaluates user data;
wherein the host device is connected with the interface apparatus for exchange of the user data; and
wherein the interface apparatus is connected with the media connection device for exchange of the user data.

13. A collision avoidance system, comprising:
at least two interface apparatuses according to claim 1;
at least two media connection devices, which connect the at least two interface apparatuses by way of the divided medium and which work with a collision recognition protocol, in each instance;
wherein the at least two interface apparatuses use a command/response protocol and monitor the time behavior of the command/response protocol, by way of a time monitoring device, in such a manner that the time behavior of the command/response protocol is adhered to, in order to avoid collisions of the collision recognition protocol.

14. A method for exchange of different time-critical user data between a host device and a divided medium, the method comprising the acts of:
operating a first interface of an interface apparatus with a first clock pulse;
operating a second interface of the interface apparatus with a second clock pulse, which can be different from the first clock pulse;
connecting the first interface and the second interface with a temporary memory device;
exchanging the different time-critical user data between the first interface and the second interface by way of the temporary memory device;
controlling the exchange of the different time-critical user data between the first interface and the second interface in such a manner, by way of a resource control device, that collisions of the different time-critical user data within the interface apparatus and/or on a divided medium connected with the interface apparatus are avoided, in order to allow deterministic behavior during the exchange of the different time-critical user data;
controlling the exchange of the different time-critical user data between the first interface and the second interface by way of management of a pointer to the first interface and/or to the second interface; and
temporarily storing in memory the different time-critical user data, in such a manner that a clock pulse difference between the first clock pulse and the second clock pulse is balanced out.

15. A computer product, comprising a non-transitory computer readable medium having stored thereon program code segments that:
operate a first interface of an interface apparatus with a first clock pulse;

operate a second interface of the interface apparatus with a second clock pulse, which can be different from the first clock pulse;

connect the first interface and the second interface with a temporary memory device;

exchange the different time-critical user data between the first interface and the second interface by way of the temporary memory device;

control the exchange of the different time-critical user data between the first interface and the second interface in such a manner, by way of a resource control device, that collisions of the different time-critical user data within the interface apparatus and/or on a divided medium connected with the interface apparatus are avoided, in order to allow deterministic behavior during the exchange of the different time-critical user data;

control the exchange of the different time-critical user data between the first interface and the second interface by way of management of a pointer to the first interface and/or to the second interface; and temporarily store in memory the different time-critical user data, in such a manner that a clock pulse difference between the first clock pulse and the second clock pulse is balanced out.

\* \* \* \* \*